(12) United States Patent
Matsumoto

(10) Patent No.: US 11,560,124 B2
(45) Date of Patent: Jan. 24, 2023

(54) WIPER LEVER ASSEMBLY AND WIPER BLADE

(71) Applicant: DENSO CORPORATION, Kariya (JP)

(72) Inventor: Hiroshi Matsumoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/275,519

(22) PCT Filed: Jun. 6, 2019

(86) PCT No.: PCT/JP2019/022633
§ 371 (c)(1),
(2) Date: Mar. 11, 2021

(87) PCT Pub. No.: WO2020/059221
PCT Pub. Date: Mar. 26, 2020

(65) Prior Publication Data
US 2022/0032877 A1   Feb. 3, 2022

(30) Foreign Application Priority Data

Sep. 18, 2018   (JP) .............................. JP2018-173730
Sep. 20, 2018   (JP) .............................. JP2018-176479
(Continued)

(51) Int. Cl.
*B60S 1/38*   (2006.01)

(52) U.S. Cl.
CPC ........... *B60S 1/3806* (2013.01); *B60S 1/3801* (2013.01); *B60S 2001/3813* (2013.01); *B60S 2001/3815* (2013.01); *B60S 2001/3836* (2013.01)

(58) Field of Classification Search
CPC .................. B60S 1/3801; B60S 1/3806; B60S 2001/3813; B60S 2001/3815
(Continued)

(56) References Cited

U.S. PATENT DOCUMENTS 6,675,432 B1   1/2004   De Block
7,603,742 B2   10/2009   Nakano et al.
(Continued)

FOREIGN PATENT DOCUMENTS

DE   19906288 A1   8/2000
JP   2005-297940   * 10/2005
(Continued)

OTHER PUBLICATIONS

Jul. 30, 2019 International Search Report issued in International Patent Application No. PCT/JP2019/022633.

*Primary Examiner* — Gary K. Graham
(74) *Attorney, Agent, or Firm* — Oliff PLC

(57) ABSTRACT

A wiper blade includes a wiper lever assembly with a tournament structure. The wiper lever assembly includes a main lever and a pair of movable covers. The two length direction sides of the main lever and the movable covers are respectively formed with fin surfaces each having a downward gradient on progression toward a vehicle front side, and main housing compartments and movable housing compartments that are open toward a wiping surface. A pair of yoke levers are respectively housed spanning inside the main housing compartments and inside the movable housing compartments, and are coupled so as to be capable of pivoting to the main lever and to the movable covers. The main housing compartments, the movable housing compartments, and the yoke levers each has a greater height dimension at a rear side than at a front side.

20 Claims, 49 Drawing Sheets

(30) Foreign Application Priority Data

Sep. 20, 2018 (JP) .............................. JP2018-176480
Sep. 25, 2018 (JP) ............................. JP2018-179440
Sep. 27, 2018 (JP) ............................. JP2018-182682

(58) Field of Classification Search
USPC .......... 15/250.201, 250.361, 250.43, 250.44,
15/250.46
See application file for complete search history.

(56) References Cited

U.S. PATENT DOCUMENTS

| | | | |
|---|---|---|---|
| 7,636,980 B2 | 12/2009 | Nakano | |
| 8,347,450 B2 * | 1/2013 | Amano | B60S 1/3806 |
| | | | 15/250.201 |
| 8,510,898 B2 * | 8/2013 | Ku | B60S 1/3801 |
| | | | 15/250.44 |
| 8,959,702 B2 * | 2/2015 | Amano | B60S 1/4006 |
| | | | 15/250.361 |
| 2006/0156529 A1 | 7/2006 | Thomar et al. | |
| 2011/0162161 A1 | 7/2011 | Amado | |
| 2015/0251636 A1 | 9/2015 | Kim et al. | |

FOREIGN PATENT DOCUMENTS

| | | |
|---|---|---|
| JP | 2006-513928 A | 4/2006 |
| JP | 2008-049785 A | 3/2008 |
| JP | 2014-19218 A | 2/2014 |
| JP | 2014-83885 A | 5/2014 |
| WO | 2010/035794 A1 | 4/2010 |

\* cited by examiner

-2369　　PRESSURE　　1622

-2369　　PRESSURE　　1622

-2369    PRESSURE    1622

-2369    PRESSURE    1622

FIG. 33E
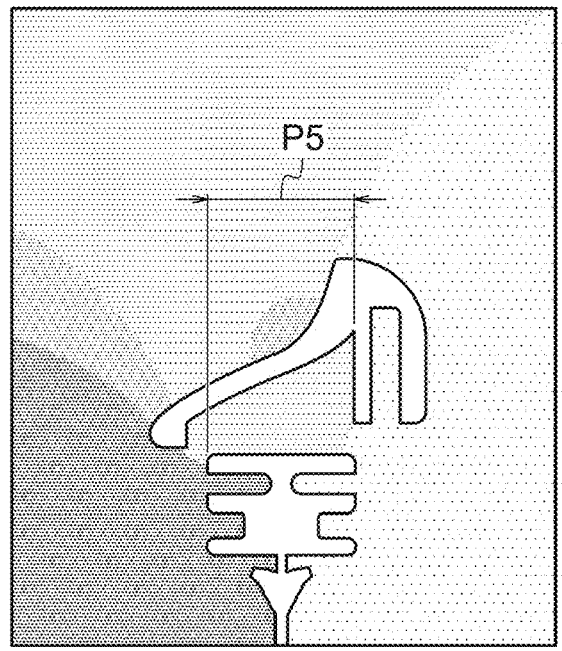
FIG. 33F
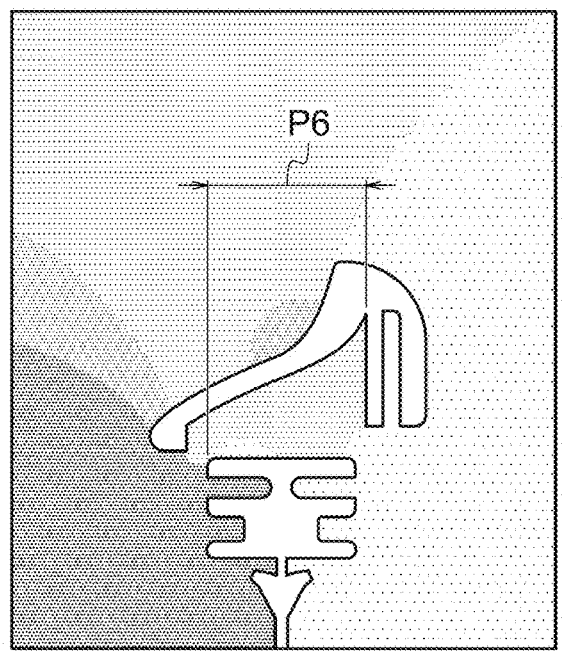

-2369    PRESSURE    1622

-2369    PRESSURE    1622

-2369   PRESSURE   1622

-2369   PRESSURE   1622

-2369　　　PRESSURE　　　1622

-2369　　　PRESSURE　　　1622

-2369  PRESSURE  1622

-2369  PRESSURE  1622

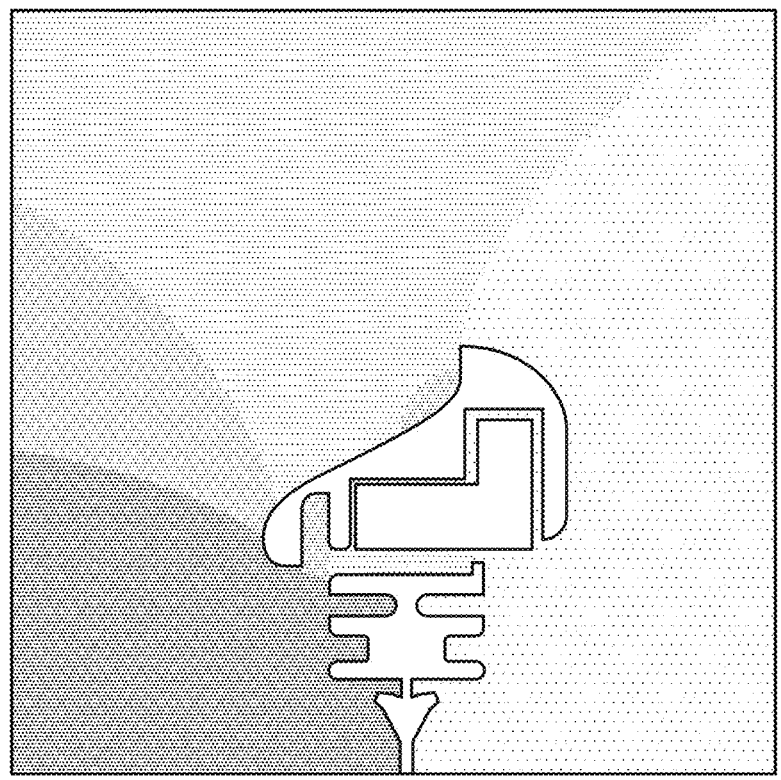

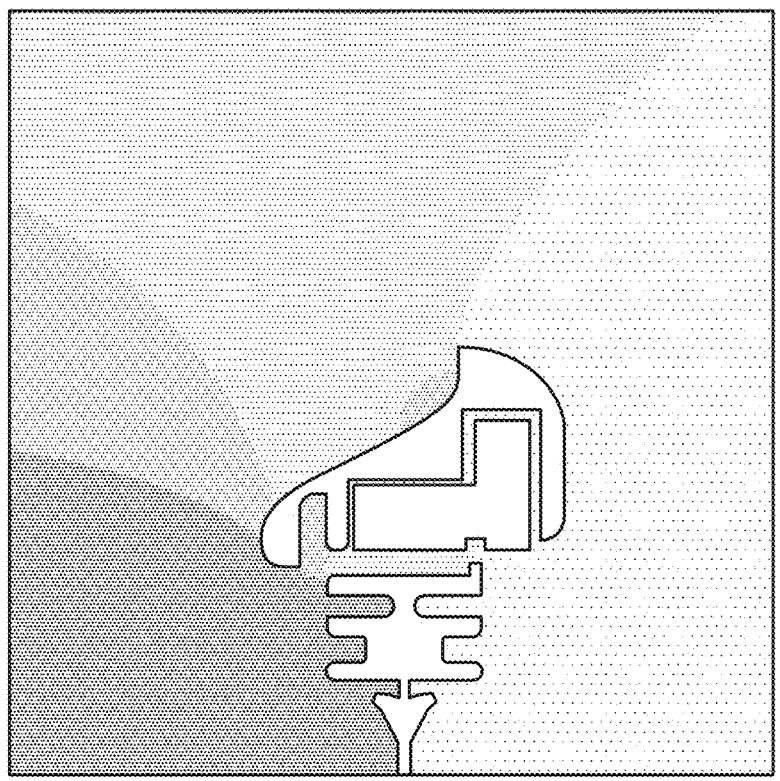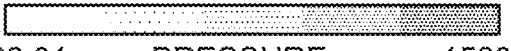

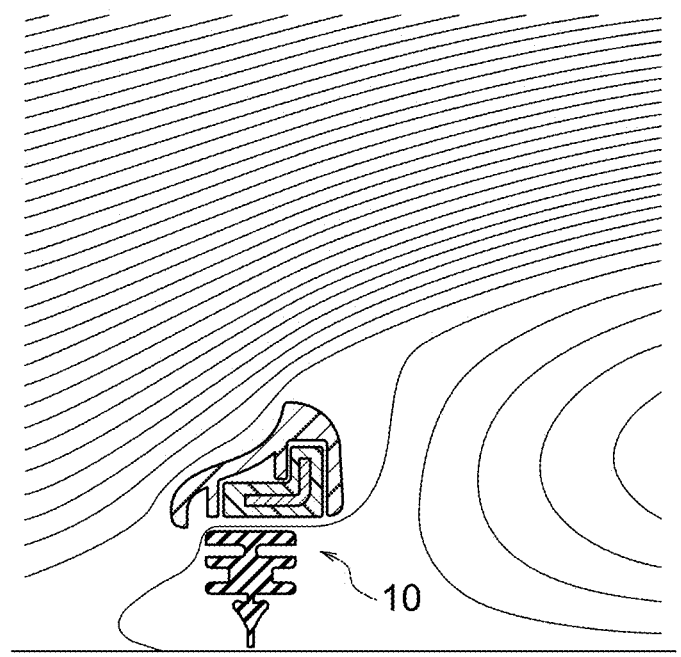
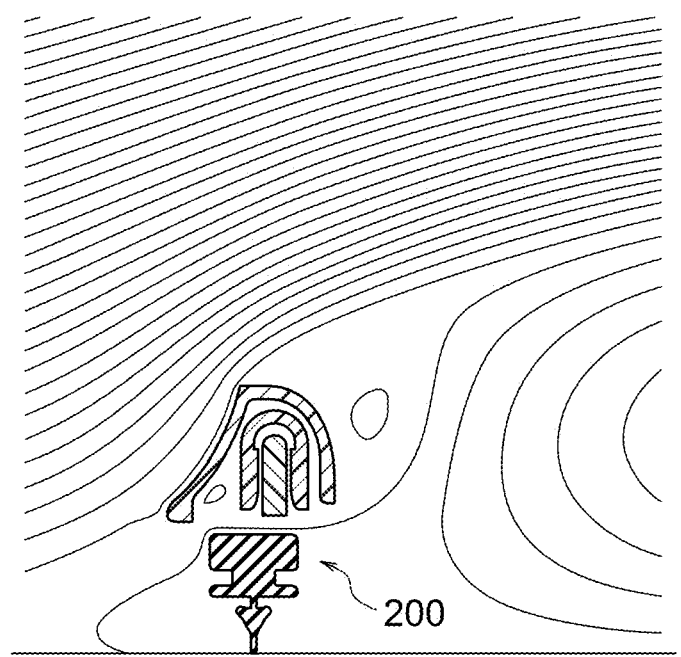
FIG. 48

WIPER LEVER ASSEMBLY AND WIPER BLADE

TECHNICAL FIELD

The present disclosure relates to a wiper lever assembly and a wiper blade.

BACKGROUND ART

Japanese National Phase Publication No. 2006-513928 discloses a flat type wiper blade that does not employ a tournament structure wiper lever assembly of plural levers coupled together in a tournament arrangement. In this wiper blade, a plate spring support element (backing) imparts rigidity and elasticity to a wiper strip (blade rubber). The wiper blade further includes a window deflector strip fixed to the support element using first and second claws. An upper face of the window deflector strip is formed with a fin face to convert travel-induced wind into a pressing force toward a wiping surface.

International Publication (WO) No. 2010/035794 discloses a wiper blade provided with a lever member (wiper lever assembly) with a tournament structure, a blade rubber, and two movable covers. The lever member includes a main lever detachably coupled to a wiper arm at a length direction central portion, and two yoke levers coupled so as to be capable of pivoting to the two length direction end portions of the main lever. The respective movable covers are coupled so as to be capable of pivoting to the respective yoke levers, and the blade rubber is gripped by the respective yoke levers and movable covers. Upper faces of the main lever and the respective movable covers are formed with fin faces to convert travel-induced wind into a pressing force toward a wiping surface.

SUMMARY OF INVENTION

Technical Problem

Higher performance wiper blades are in increasing demand as the wiping environment of wipers changes, for example due to the application of water-repellant coatings to wiping surfaces. In light of this, the wiper blade disclosed in Japanese National Phase Publication No. 2006-513928 is a flat type that enables the projection height of the wiper blade from the wiping surface to be kept low, and has improved aerodynamic characteristics. However, since a uniform pressure distribution against the wiping surface is more difficult to attain than in configurations employing a wiper lever assembly with a tournament structure, the wiping performance of this wiper blade may suffer. On the other hand, in the wiper blade disclosed in WO No. 2010/035794, although the tournament structure of the wiper lever assembly obtains good wiping performance, the projection height from the wiping surface increases, resulting in greater lift and drag during wiping. There is accordingly room for improvement from the perspective of improving the aerodynamic characteristics.

In consideration of the above circumstances, an object of the present disclosure is to provide a wiper lever assembly and a wiper blade provided with this wiper lever assembly that are capable of improving aerodynamic characteristics while also securing good wiping performance.

Solution to Problem

A wiper lever assembly of a first aspect of the present disclosure grips a blade rubber for wiping a wiping surface. The wiper lever assembly includes a main lever, a pair of movable covers, and a pair of yoke levers. The main lever is coupled to a leading end portion of a wiper arm at a length direction central portion of the main lever. The main lever includes a first fin surface having a downward gradient on progression toward a width direction front side and formed on upper surfaces on both length direction sides of the main lever, and main housing compartments formed on two length direction sides of the main lever, each of the main housing compartments being open toward a wiping surface and having a greater height dimension at a width direction rear side than at the width direction front side. The pair of movable covers have their length in a length direction of the main lever and are disposed contiguously to the main lever on the two length direction sides of the main lever. Each of the movable covers includes a grip portion for gripping the blade rubber at an opposite side of the movable cover from the main lever, a second fin surface having a downward gradient on progression toward the width direction front side and formed on an upper surface of the movable cover, and a movable housing compartment open toward the wiping surface and having a greater height dimension at the width direction rear side than at the width direction front side. Each of the yoke levers has its length in the length direction of the main lever and the respective movable covers, is housed spanning inside a corresponding main housing compartment and inside a corresponding movable housing compartment, and is coupled to the main lever and to the corresponding movable cover so as to be capable of pivoting about an axis extending in a width direction. Each of the yoke levers includes a grip portion for gripping the blade rubber at both length direction end portions of the yoke lever, and has a greater height dimension at the width direction rear side than at the width direction front side.

In the wiper lever assembly of the first aspect, the length direction central portion of the main lever is coupled to the leading end portion of the wiper arm, and the pair of movable covers are disposed contiguously at the two length direction sides of the main lever. The upper surfaces on the two length direction sides of the main lever and the upper surfaces of the movable covers are respectively formed with the first and second fin surfaces, each of which has a downward gradient on progression toward the width direction front side. The two length direction sides of the main lever are respectively formed with the main housing compartments that are open toward the wiping surface (lower side) and each have a greater height dimension at the width direction rear side than at the width direction front side. The movable covers are respectively formed with the movable housing compartments that are open toward the wiping surface (lower side) and each have a greater height dimension at the width direction rear side than at the width direction front side. The pair of yoke levers are housed spanning inside the main housing compartments and inside the movable housing compartments, and are coupled to the main lever and to the respective movable covers so as to be capable of pivoting about axes extending in the width direction. The blade rubber is gripped by the grip portions provided on the opposite side of the respective movable covers to the main lever, and the grip portions provided to the two length direction end portions of the respective yoke levers. A pressing force applied to the main lever from the wiper arm is thus distributed along the length direction of the blade rubber by the respective yoke levers, thereby attaining a uniform distribution of pressure against the wiping surface and good wiping performance.

Moreover, the yoke levers that are housed spanning inside the main housing compartments and inside the movable housing compartments each have a greater height dimension at the width direction rear side than at the width direction front side. The greater dimension secures the strength of the yoke levers, while enabling the yoke levers to be housed compactly inside the main housing compartments and inside the movable housing compartments. Moreover, the respective upper surfaces of the main lever and the movable covers are formed with the first and second fin surfaces each having a downward gradient on progression toward the width direction front side. Due to the main lever and the movable covers each having a greater height dimension at the width direction rear side than at the width direction front side, an increase in the height dimension can be suppressed despite forming the main housing compartments and the movable housing compartments, each of which is formed with a greater height dimension at the width direction rear side than at the width direction front side. Thus, the projection height of the wiper lever assembly from the wiping surface can be kept low, enabling aerodynamic characteristics to be improved.

A wiper lever assembly of a second aspect of the present disclosure is the first aspect, wherein each of the yoke levers includes a metal portion that is made from metal and a resin portion that is made from resin and that is provided outside the metal portion.

In the wiper lever assembly of the second aspect, each of the yoke levers is configured including the resin portion provided outside the metal portion, enabling the twin benefits of securing the strength and reducing the size of the yoke levers to be attained more easily than in cases in which the yoke levers are configured solely from resin. Moreover, in cases in which the metal portion is for example embedded in the resin portion, exposure of the metal portion is reduced, and so an anti-rust and anti-dazzle coating is rendered unnecessary.

A wiper lever assembly of a third aspect of the present disclosure is the second aspect, wherein the main lever and the movable covers are made from resin, and the resin portion of each of the yoke levers is coupled so as to be capable of pivoting to the main lever and to the corresponding movable cover.

A wiper lever assembly of a fourth aspect of the present disclosure is the second aspect or the third aspect, wherein the grip portions of the yoke levers are formed at the resin portions.

A wiper lever assembly of a fifth aspect of the present disclosure is any one of the first aspect to the fourth aspect, wherein each of the yoke levers is coupled so as to be capable of pivoting to the main lever and to the corresponding movable cover at a lower side of the yoke lever that has a broader front-rear direction width than an upper side of the yoke lever.

The wiper lever assembly of the fifth aspect of the present disclosure is configured as described above, enabling pivotally coupled portions where the yoke levers are coupled so as to be capable of pivoting to the main levers and to the movable covers to be set with a greater axial length in the width direction. This enables the orientation (namely, the orientation as viewed along the length direction, namely tilting orientation) of the yoke levers to be suppressed from changing with respect to the main lever and to the movable covers.

A wiper lever assembly of a sixth aspect of the present disclosure is any one of the first aspect to the fifth aspect, wherein each of the yoke levers includes a plate-shaped portion configured in a plate shape with a plate thickness direction running in an up-down direction, and an upright wall portion projecting upward from a width direction rear side of the plate-shaped portion.

A wiper lever assembly of a seventh aspect of the present disclosure is the sixth aspect, wherein the main lever and each of the movable covers include a pair of opposing walls that oppose each other at a front and rear of the upright wall portion.

In the wiper lever assembly of the seventh aspect, engagement between the upright wall portion provided to each of the yoke levers and the pair of opposing walls provided to the main lever and to each of the movable covers enables rattling of the yoke levers against the main lever and against the movable covers to be suppressed.

A wiper lever assembly of an eighth aspect of the present disclosure is the sixth aspect when dependent from the second aspect, wherein the metal portion includes a plate-shaped portion configured in a plate shape with a plate thickness direction running in the up-down direction and embedded in the resin portion at a location corresponding to the plate-shaped portion of a corresponding yoke lever; and an upright wall portion projecting upward from a width direction rear side of the plate-shaped portion and embedded in the resin portion at a location corresponding to the upright wall portion of the corresponding yoke lever.

A wiper lever assembly of a ninth aspect of the present disclosure is any one of the first aspect to the eighth aspect, wherein an upper surface of each of the yoke levers is formed with a pair of pressing portions projecting upward so as to respectively contact an upper surface of a corresponding main housing compartment and an upper surface of a corresponding movable housing compartment.

In the wiper lever assembly of the ninth aspect, the pair of pressing portions provided to the upper surface of each of the yoke levers contact the upper surface of the corresponding main housing compartment and the upper surface of the corresponding movable housing compartment. Pressing force from the wiper arm, reaction force from the wiping surface, and so on are transmitted through the pair of pressing portions to between the yoke lever and the main lever and between the yoke lever and the corresponding movable cover, thereby preventing or suppressing these forces from being applied to the respective pivotally coupled portions between the yoke lever and the main lever and between the yoke lever and the corresponding movable cover. This enables the coupling strength of the pivotally coupled portions to be set lower, thereby enabling the yoke levers to be reduced in size in the height direction. This enables the projection height of the wiper lever assembly from the wiping surface to be kept even lower.

A wiper lever assembly of a tenth aspect of the present disclosure is any one of the first aspect to the ninth aspect, wherein respective protrusions formed to both width direction front and rear surfaces of each of the main housing compartments and each of the movable housing compartments are respectively fitted into four recesses formed in both width direction front and rear surfaces of a corresponding yoke lever. Each of the yoke levers is coupled so as to be capable of pivoting to the main lever and to the corresponding movable cover.

The wiper lever assembly of the tenth aspect is configured as described above, thereby simplifying the configuration and assembly of the pivotally coupled portions between each of the yoke levers and the main lever, and between the yoke lever and the corresponding movable cover, in comparison for example to cases in which the yoke lever is coupled so as to be capable of pivoting to the main lever and to the movable cover using shaft members.

A wiper lever assembly of an eleventh aspect of the present disclosure is the sixth aspect or any one of the seventh aspect to the tenth aspect when dependent from the sixth aspect, wherein each of the main housing compartments of the main lever includes a first opening that is open toward the wiping surface, and each of the movable housing compartments of the pair of movable covers includes a second opening that is open toward the wiping surface. The plate-shaped portions of the pair of yoke levers close off the first openings and the second openings.

A wiper lever assembly of a twelfth aspect of the present disclosure is any one of the first aspect to the eleventh aspect, wherein the main lever includes a pair of center side blocking walls that block off the main housing compartments in a length direction at a length direction center side of the main lever.

A wiper lever assembly of a thirteenth aspect of the present disclosure is any one of the first aspect to the twelfth aspect, wherein each of the movable covers includes an outside blocking wall that blocks off a corresponding movable housing compartment in a length direction at an opposite side of the corresponding yoke lever from the main lever.

A wiper lever assembly of a fourteenth aspect of the present disclosure is any one of the first aspect to the thirteenth aspect, wherein the main lever and each of the movable covers includes a front wall and a rear wall opposing each other in the width direction, and an upper wall connecting upper end portions of the front wall and the rear wall together in the width direction. Each of the front walls includes a front-inner wall and includes a front-outer wall extending from the front-inner wall toward one width direction side as to be continuous to the upper wall. Each of the yoke levers is coupled so as to be capable of pivoting to a corresponding front-inner walls and to a corresponding rear walls. The first fin surface and a corresponding second fin surface are formed contiguously to each other, the first fin surface being formed on the upper wall and on an upper surface of the front-outer wall of the main lever. Each of the second fin surfaces is formed on the upper wall and on an upper surface of the front-outer wall of a corresponding movable cover.

A wiper lever assembly of a fifteenth aspect of the present disclosure is the fourteenth aspect, wherein one of a recess or a protrusion formed at each of the front-inner walls and each of the rear walls is fitted together with four of the other out of a recess or a protrusion formed at both width direction front and rear surfaces of a corresponding yoke lever so as to couple the respective yoke levers so as to be capable of pivoting to the main lever and to a corresponding movable cover. Each of the front-inner walls includes a flexible portion formed with the one out of a recess or a protrusion, and a reinforced portion that is reinforced more than the flexible portion. Each of the yoke levers is formed with a front side projection projecting from a location corresponding to a corresponding reinforced portion so as to be capable of abutting the corresponding reinforced portion.

A wiper lever assembly of a sixteenth aspect of the present disclosure is any one of the first aspect to the fifteenth aspect, further including a load transmission section provided as a separate body to respective pivotally coupled portions where the respective yoke lever is coupled, so as to be capable of pivoting to the main lever and a corresponding movable cover. The load transmission section is configured by an engagement portion provided at the main lever and a corresponding movable cover and an engaging portion provided at a corresponding yoke lever, such that load acting along a length direction between the yoke lever and the main lever and between the yoke lever and a corresponding movable cover is borne by engagement between the engagement portion and the engaging portion.

In the wiper lever assembly of the sixteenth aspect, the load transmission section is provided as a separate body to the respective pivotally coupled portions where each of the yoke levers is coupled so as to be capable of pivoting to the main lever and to the corresponding movable cover, and the load transmission section is configured by the engagement portions provided to the main lever and to the corresponding movable cover, and the engaging portions provided to each of the yoke levers. Thus, load acting along the length direction between the yoke lever and the main lever and between the yoke lever and the corresponding movable cover is borne by the engagement between the engagement portions and the engaging portions of the load transmission section. This enables this load to be prevented or suppressed from acting on the respective pivotally coupled portions.

A wiper blade of a seventeenth aspect of the present disclosure includes a blade rubber for wiping a wiping surface of a vehicle, and the wiper lever assembly of any one of the first aspect to the sixteenth aspect, the blade rubber being gripped by the respective grip portions provided at the pair of movable covers and at the pair of yoke levers.

In the wiper blade of the seventeenth aspect, the blade rubber for wiping the wiping surface of a vehicle is gripped by the respective grip portions provided to the pair of movable covers and to the pair of yoke levers included in the wiper lever assembly. This wiper lever assembly is the wiper lever assembly of any one of the first to the sixteenth aspect, thereby enabling the advantageous effects described above to be attained.

A wiper blade of an eighteenth aspect of the present disclosure is the seventeenth aspect, wherein the blade rubber is disposed below the wiper lever assembly, is gripped by the yoke levers and the movable covers, is pressed against the wiping surface, and is disposed such that respective gaps are formed between the blade rubber and the yoke levers and between the blade rubber and the movable covers. The wiper blade further includes an obstruction portion that is formed projecting from at least one out of a lower surface of each of the movable covers, a lower surface of each of the yoke levers, or an upper surface of the blade rubber, that extends along a length direction of the blade rubber in an internal space of the wiper lever assembly, and that obstructs outflow of a travel-induced wind that has flowed into at least one gap out of the respective gaps.

A wiper blade of a nineteenth aspect of the present disclosure is the eighteenth aspect, wherein the obstruction portion is configured by lengthwise ribs projecting downward from lower surfaces of the respective movable covers that are recessed toward an upper side as viewed along a length direction of the blade rubber.

A wiper blade of a twentieth aspect of the present disclosure is the nineteenth aspect, wherein the lengthwise ribs are disposed above a width direction rear end portion of the blade rubber.

BRIEF DESCRIPTION OF DRAWINGS

FIG. 33E is a diagram illustrating aerodynamic analysis for a wiper blade according to the first exemplary embodiment of the present disclosure, for a state in which a lengthwise rib of a movable cover is disposed further toward a rear side than the position illustrated in FIG. 33D.

FIG. 33F is a diagram illustrating aerodynamic analysis for a wiper blade according to the first exemplary embodiment of the present disclosure, for a state in which a lengthwise rib of a movable cover is disposed further toward a rear side than the position illustrated in FIG. 33E.

FIG. 46A is a diagram illustrating aerodynamic analysis for a wiper blade according to the third exemplary embodiment of the present disclosure.

FIG. 46B is a diagram illustrating aerodynamic analysis for a wiper blade according to the third exemplary embodiment of the present disclosure in a case in which a recess is formed in a lower surface of a yoke lever.

FIG. 47 is diagram illustrating aerodynamic analysis for a wiper blade according to the first exemplary embodiment of the present disclosure.

FIG. 48 is a diagram illustrating aerodynamic analysis for a wiper blade according to a first comparative example.

DESCRIPTION OF EMBODIMENTS

First Exemplary Embodiment

Figure 1:
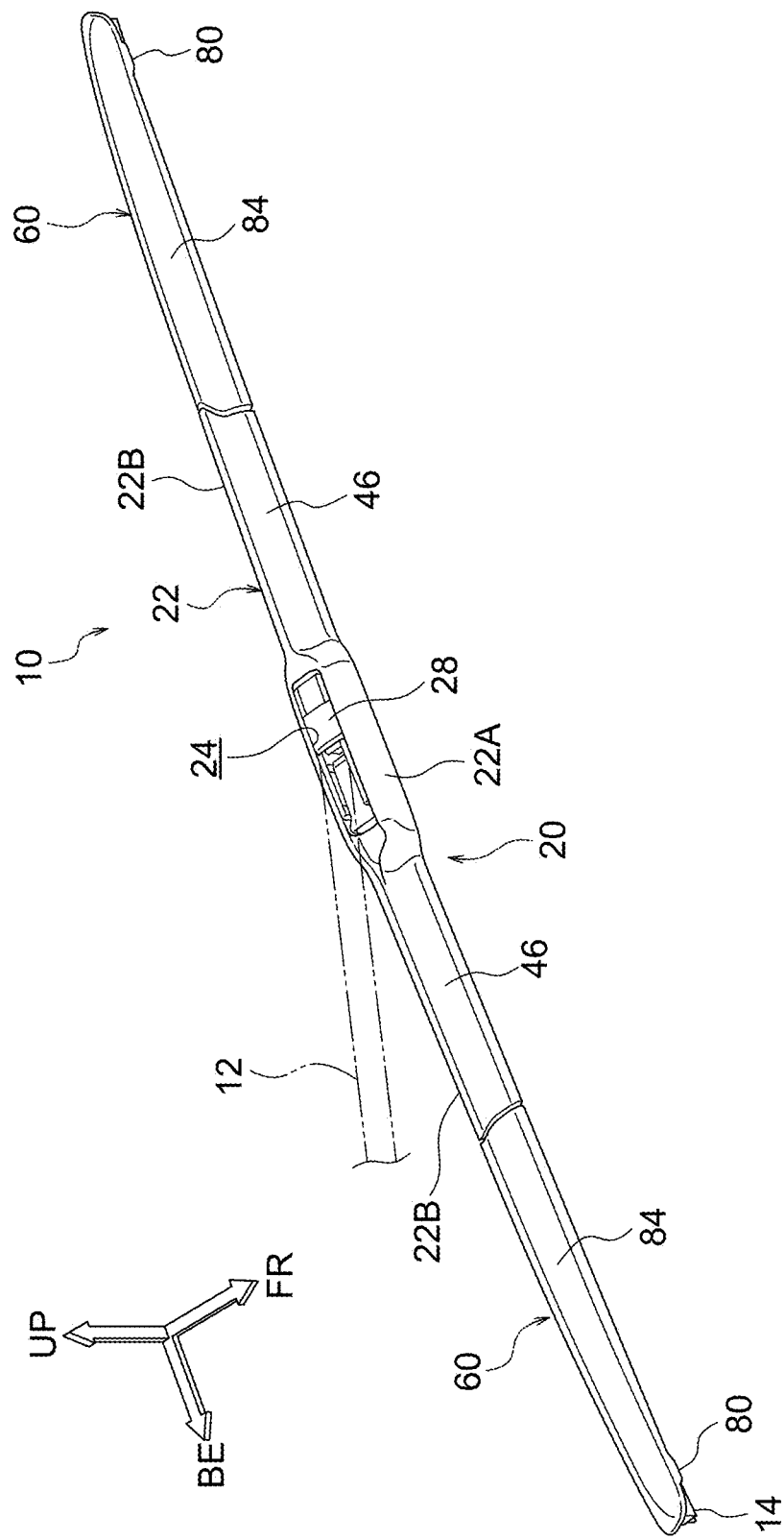
FIG. 1 is a perspective view illustrating a wiper blade according to a first exemplary embodiment of the present disclosure.
Figure 2:
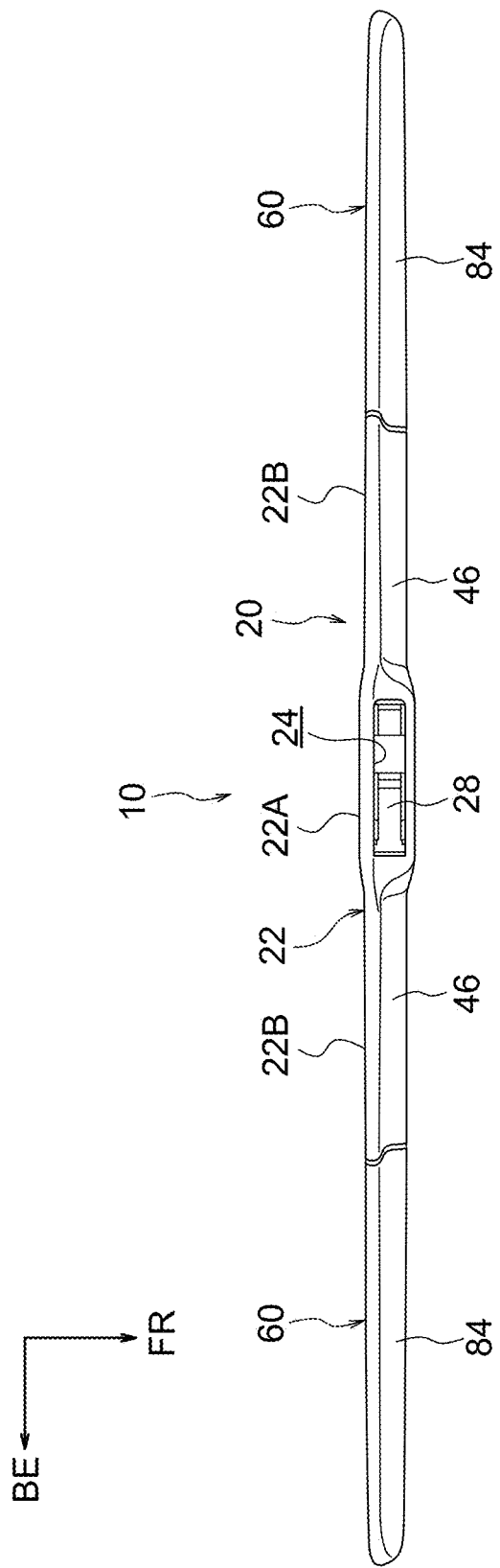
FIG. 2 is a plan view illustrating the wiper blade.
Figure 3:
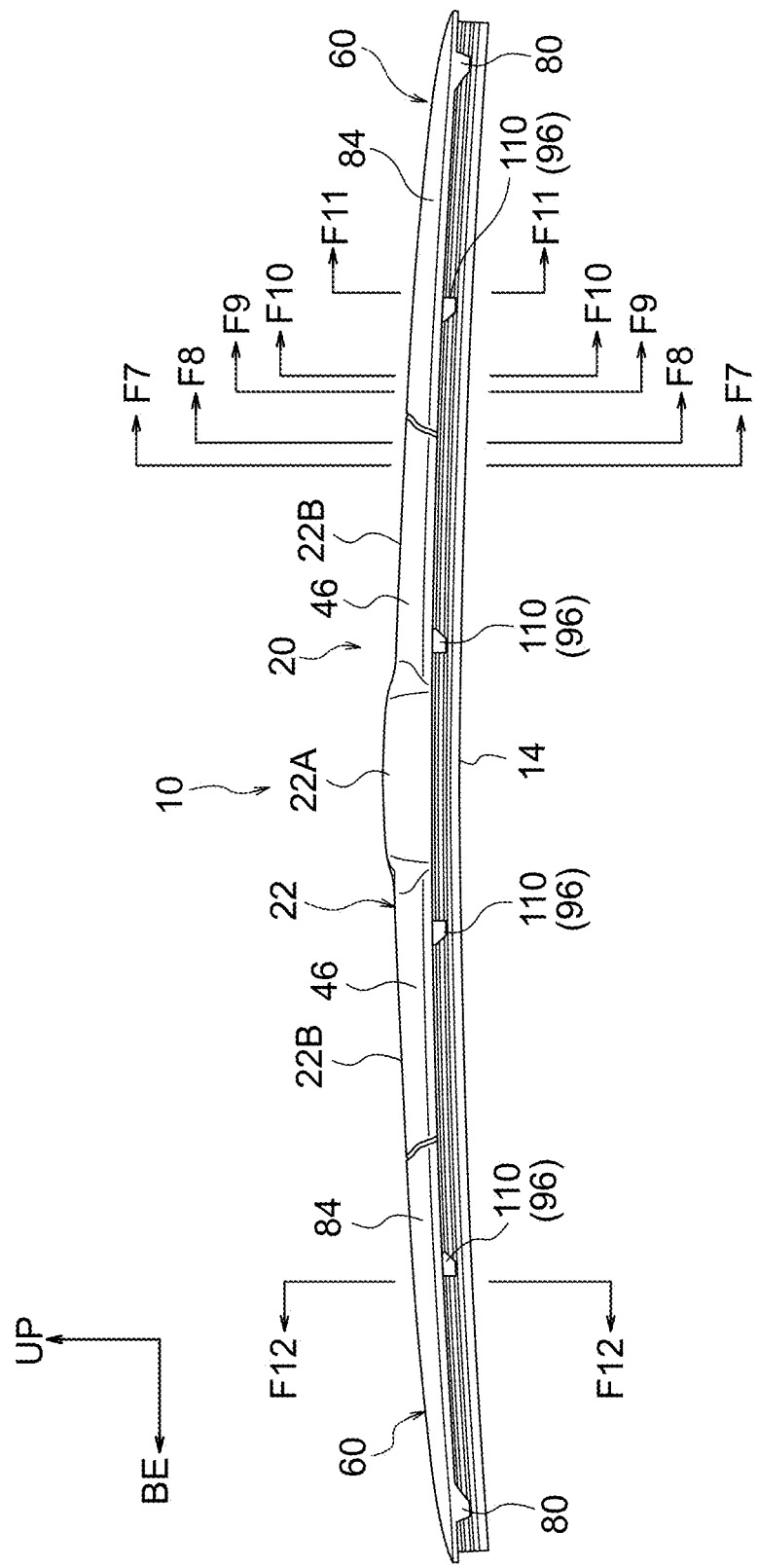
FIG. 3 is a front view illustrating the wiper blade.
Figure 4:
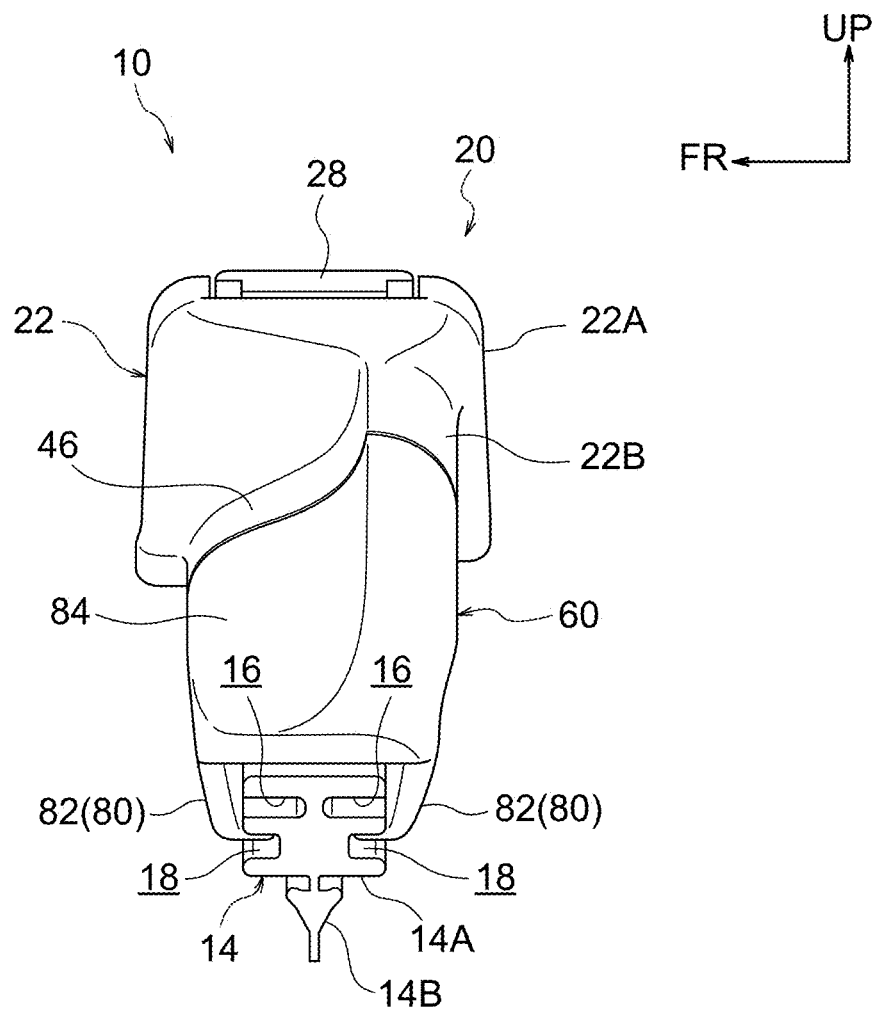
FIG. 4 is a side view illustrating the wiper blade.
Figure 5:
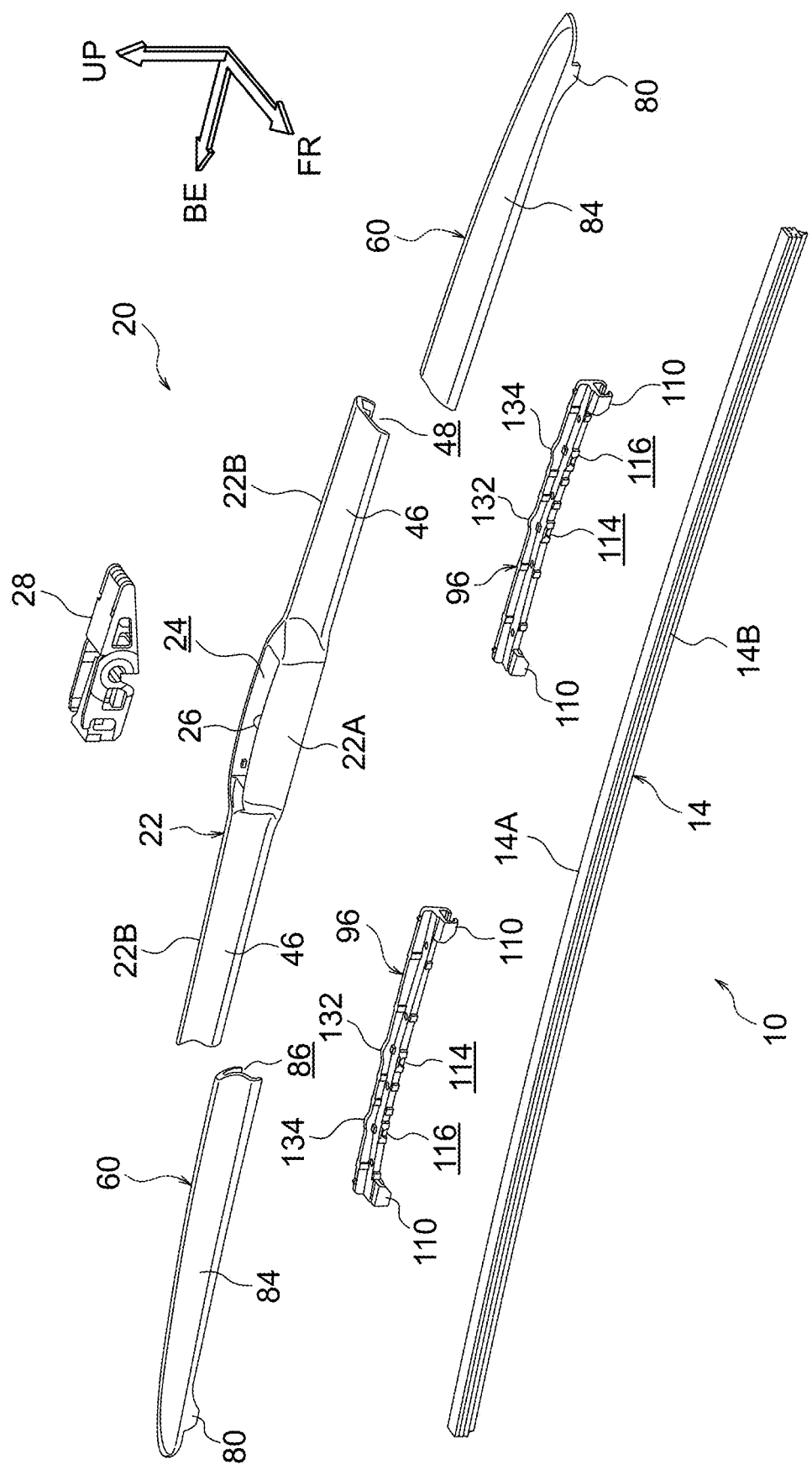
FIG. 5 is an exploded perspective view illustrating the wiper blade.
Figure 6:
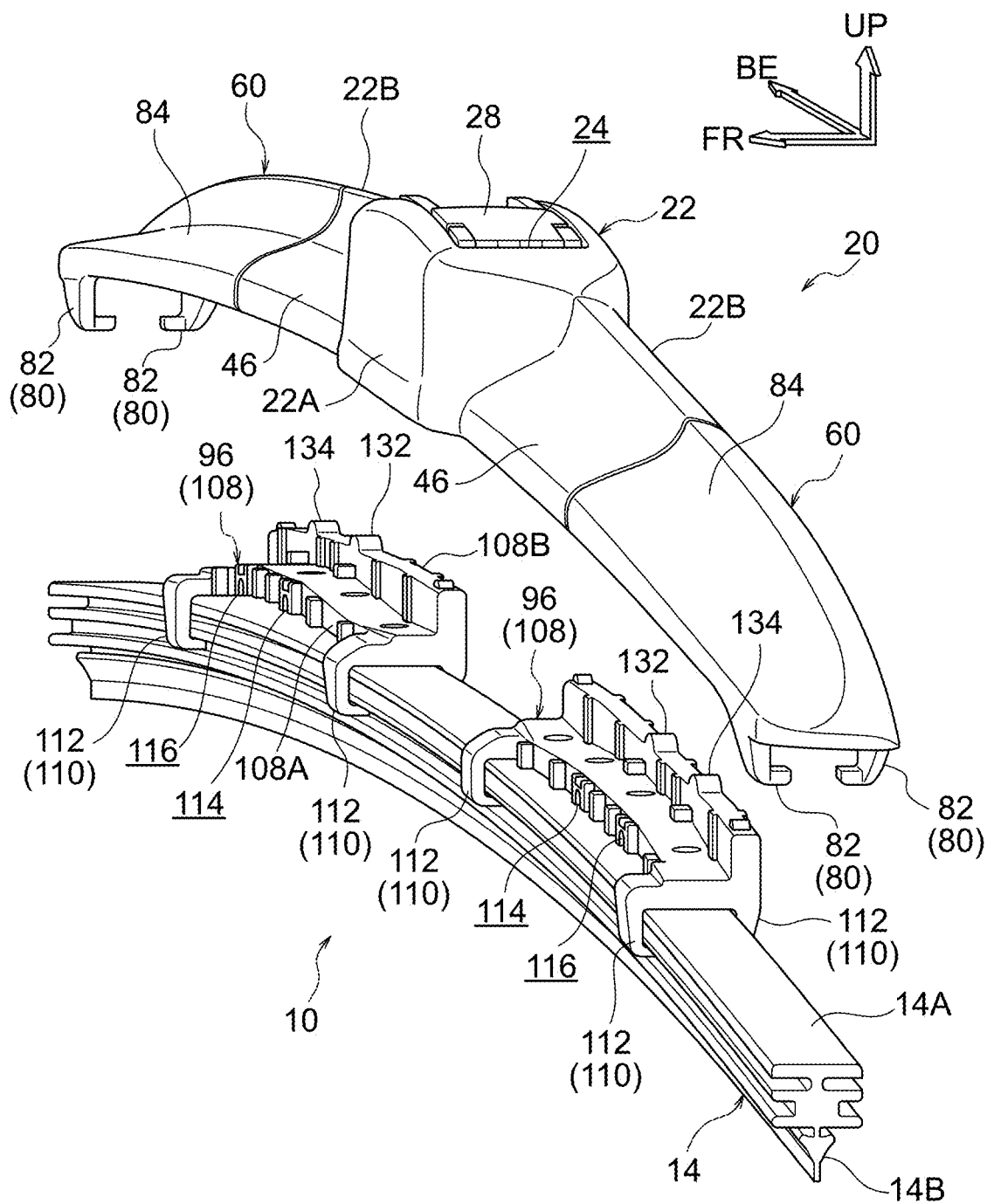
FIG. 6 is an exploded perspective view illustrating the wiper blade.
Figure 7:
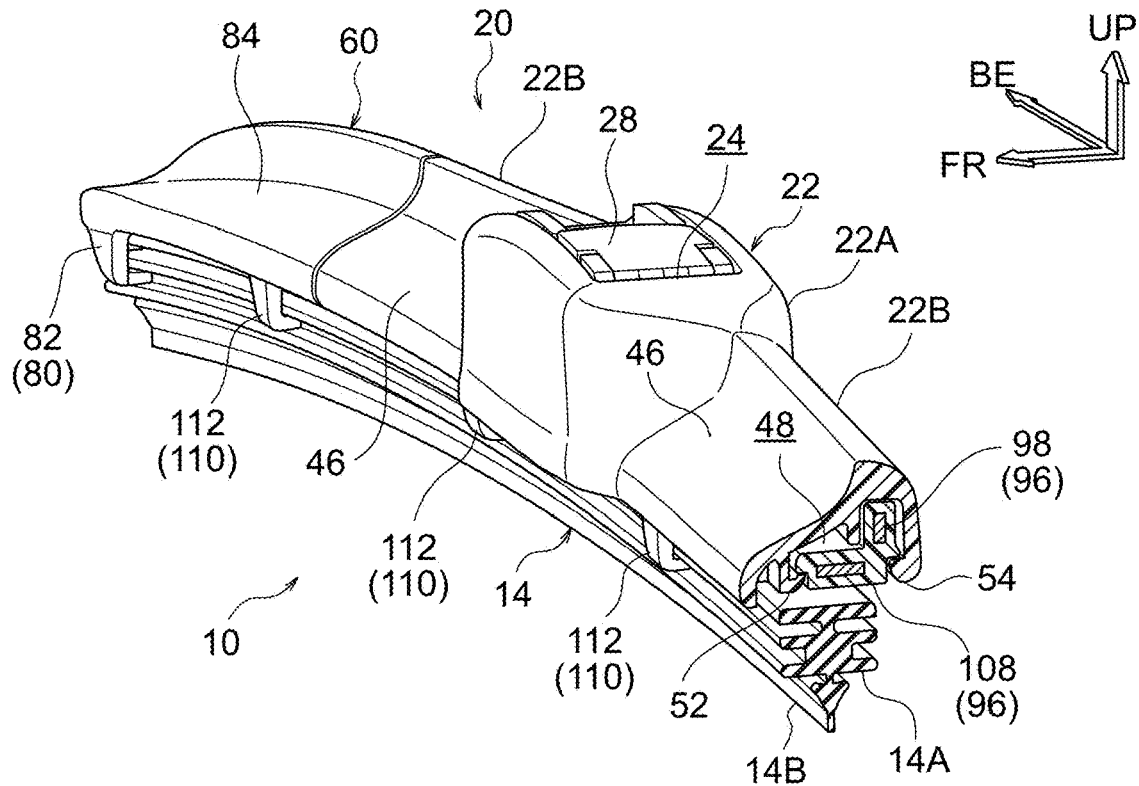
FIG. 7 is a perspective view illustrating part of the wiper blade, illustrating a cross-section sectioned along line F7-F7 in FIG. 3.
Figure 8:
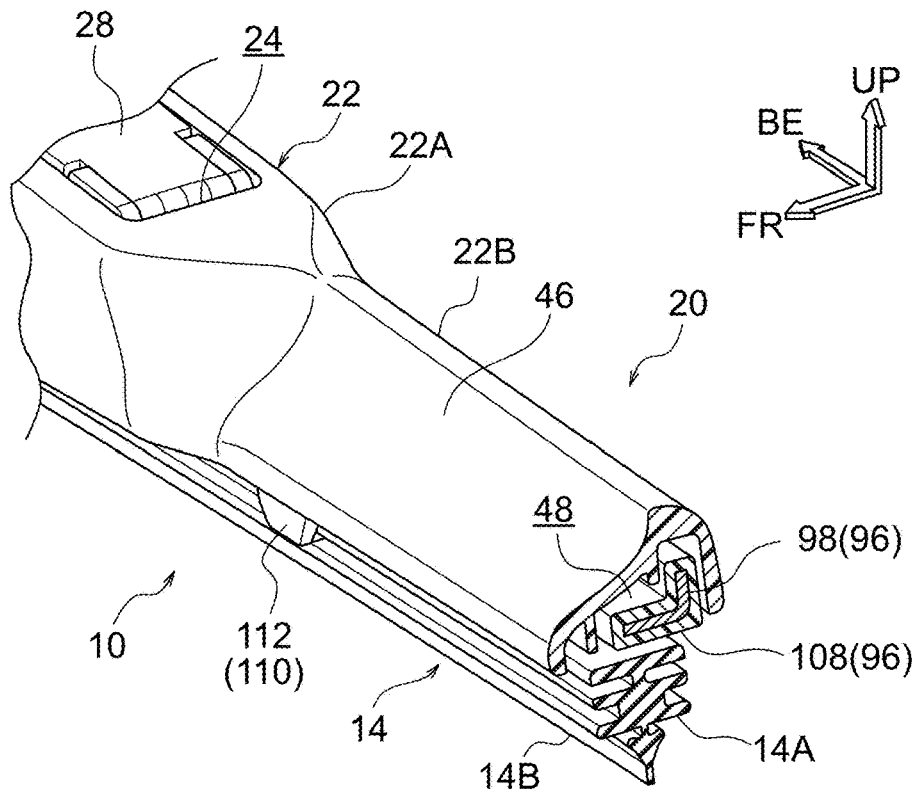
FIG. 8 is a perspective view illustrating part of the wiper blade, illustrating a cross-section sectioned along line F8-F8 in FIG. 3.
Figure 9:
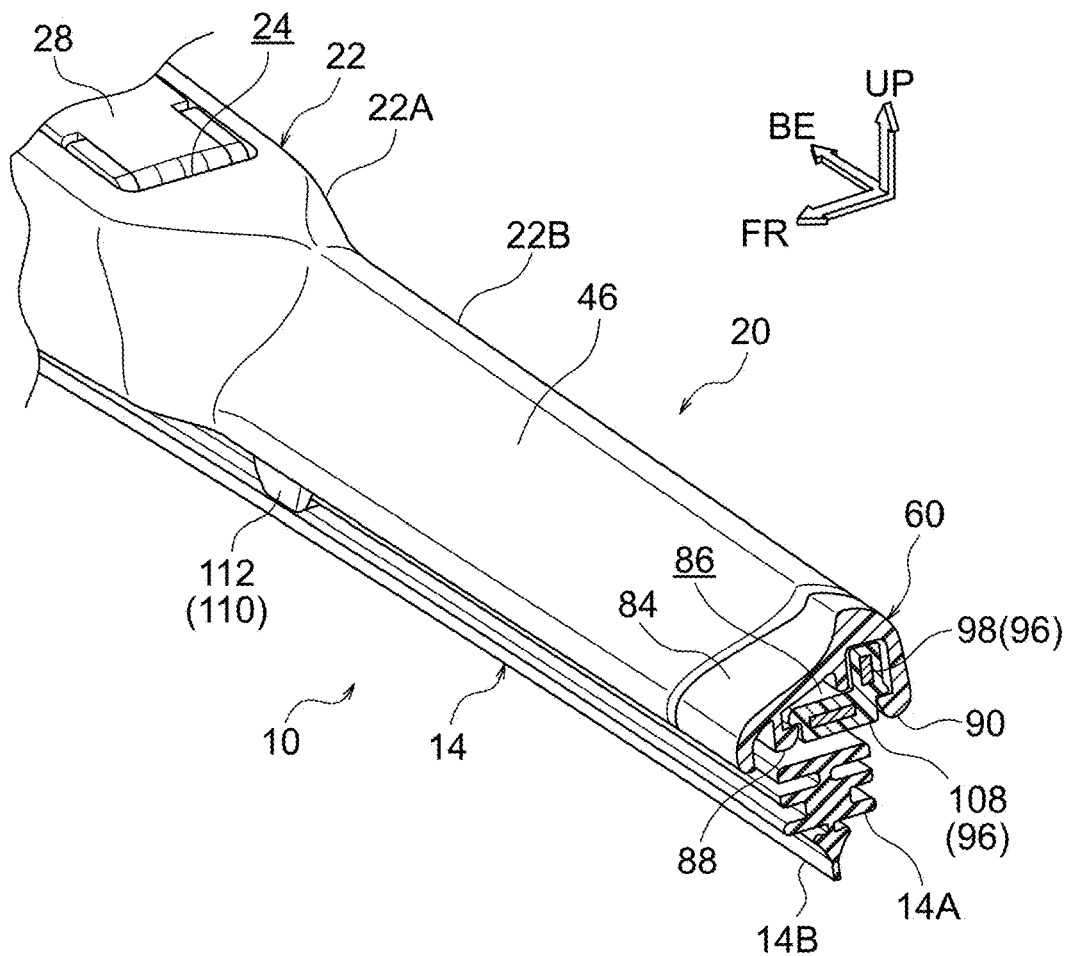
FIG. 9 is a perspective view illustrating part of the wiper blade, illustrating a cross-section sectioned along line F9-F9 in FIG. 3.
Figure 10:
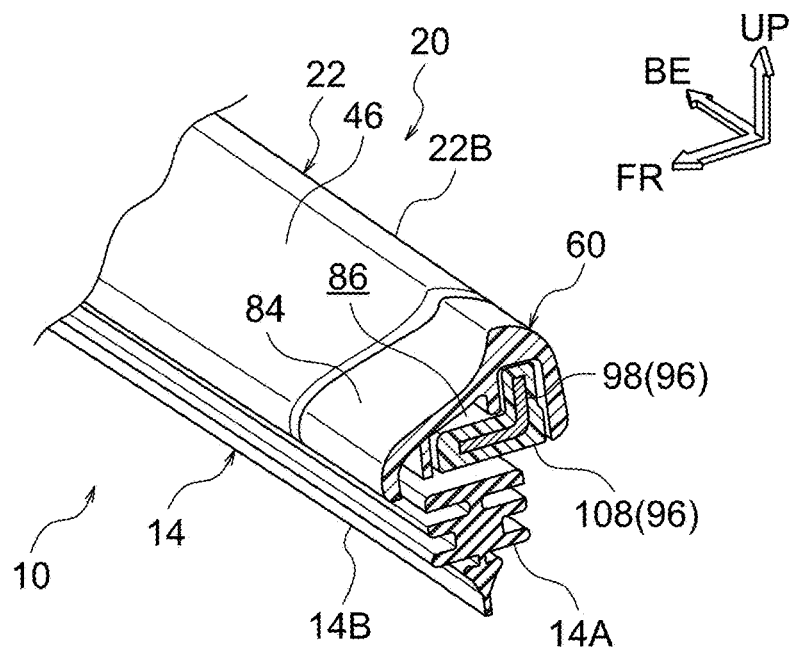
FIG. 10 is a perspective view illustrating part of the wiper blade, illustrating a cross-section sectioned along line F10-F10 in FIG. 3.
Figure 11:
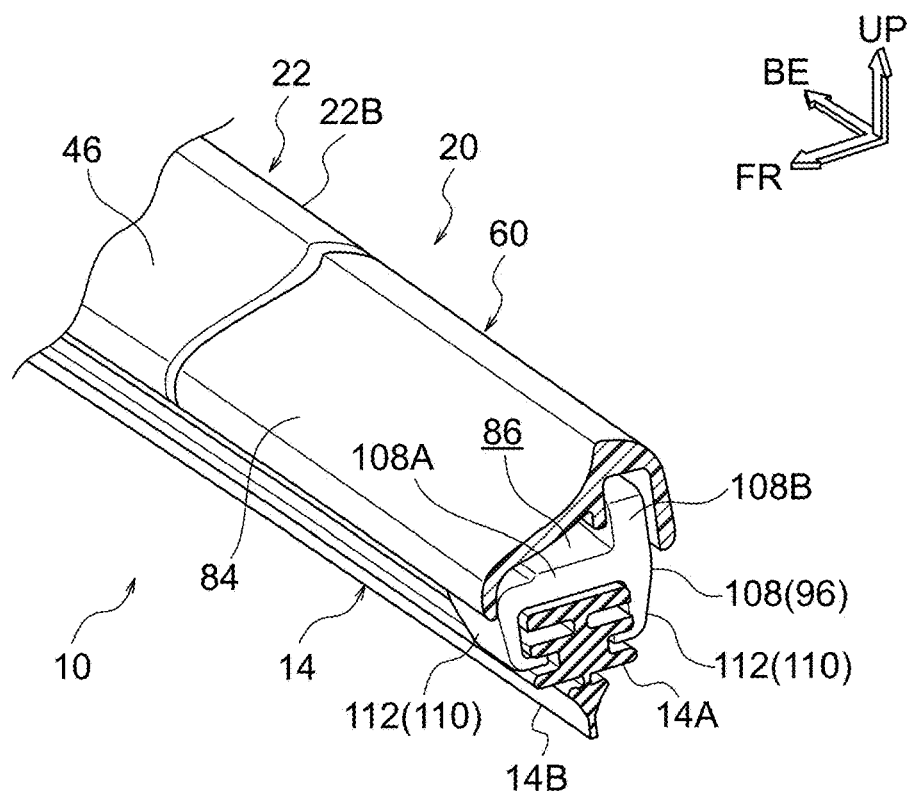
FIG. 11 is a perspective view illustrating part of the wiper blade, illustrating a cross-section sectioned along line F11-F11 in FIG. 3.

Explanation follows regarding a wiper blade 10 according to a first exemplary embodiment of the present disclosure, with reference to FIG. 1 to FIG. 40. Some reference numerals may be omitted from the respective drawings in the interests of simplicity. The dimensions in the drawings may be distorted as appropriate in order to aid explanation.

The wiper blade 10 illustrated in FIG. 1 to FIG. 17 is used to wipe raindrops and the like that have adhered to a wiping surface WS configuring an external surface of a windshield glass G (not illustrated in the drawings with the exception of FIG. 13 to FIG. 17) of a vehicle (automobile). The wiper blade 10 is a wiper blade with what is referred to as a tournament structure. The wiper blade 10 is coupled to a leading end portion of a wiper arm 12 (not illustrated in the drawings with the exception of FIG. 1), and is configured so as to receive pressing force toward the wiping surface WS from the wiper arm 12. Together with the wiper blade 10, the wiper arm 12 configures a vehicle wiper. A base end portion of the wiper arm 12 is fixed to a pivot shaft (not illustrated in the drawings) that is pivoted to-and-fro within a predetermined angle range by drive force of a wiper motor (not illustrated in the drawings). The wiper arm 12 is swung to-and-fro as the pivot shaft pivots to-and-fro. The wiper blade 10 coupled to the leading end portion of the wiper arm 12 thereby swings to-and-fro between a lower return position set at a lower end portion of the windshield glass G and an upper return position set further toward an upper end side of the windshield glass G than the lower return position.

The wiper blade 10 is configured by a blade rubber 14 for wiping the wiping surface WS and a wiper lever assembly 20 that grips the blade rubber 14. As illustrated in FIG. 1 to FIG. 20, the wiper lever assembly 20 is configured by a main lever 22 coupled at a length direction central portion to the leading end portion of the wiper arm 12, a pair of movable covers 60 provided on the two length direction sides of the main lever 22, and a pair of yoke levers 96 coupled so as to be capable of pivoting to the main lever 22 and to the pair of movable covers 60 (in other words, the respective movable covers 60 are coupled so as to be capable of pivoting to the pair of yoke levers 96). The wiper lever assembly 20 is configured such that the pair of movable covers 60 and the pair of yoke levers 96 grip the blade rubber 14.

Detailed explanation follows regarding the respective configuration elements of the wiper blade 10. Note that in the following explanation, the arrows UP and FR appearing in the respective drawings respectively indicate an upward direction and forward direction of the wiper blade 10, and the arrow BE points toward a base end side (swing center side) of the wiper blade 10. An up-down direction of the wiper blade 10 is orthogonal to the wiping surface WS, and a front-rear direction of the wiper blade 10 corresponds to a width direction of the wiper blade 10 and is substantially aligned with a wiping direction. In the following explanation, reference simply to forward, rearward, upward, and downward directions refers to these directions relative to the wiper blade 10.

Blade Rubber

The blade rubber 14 is, for example, formed from rubber and has an elongated profile. The blade rubber 14 includes an upper section 14A that is gripped by the wiper lever assembly 20, and a wiping section 14B that extends toward the lower side (wiping surface WS side) from the upper section 14A and has a lower end portion pressed against the wiping surface WS. The upper section 14A of the blade rubber 14 is formed with a pair of backing grooves 16 that run along the length direction of the blade rubber 14 and are open onto the two front-rear direction (width direction) sides of the blade rubber 14. Backing pieces (not illustrated in the drawings) configured by metal plate springs are slotted into the backing grooves 16. The backing pieces are used to distribute pressing force from the wiper arm 12 against the wiping surface WS along the length direction of the blade rubber 14. The upper section 14A of the blade rubber 14 is further formed with a pair of grippable grooves 18 at the lower side of the pair of backing grooves 16. The grippable grooves 18 run along the length direction of the blade rubber 14 and are open onto both front and rear direction sides. The up-down direction position of the grippable grooves 18 corresponds to grip portions 80, 110, described later, of the wiper lever assembly 20.

Wiper Lever Assembly

The wiper lever assembly 20 is configured by the main lever 22, the pair of movable covers 60, and the pair of yoke levers 96 as described above. Note that a leading end side location of the wiper lever assembly 20 (the opposite side to the swing center of the wiper blade 10) and a base end side location of the wiper lever assembly 20 (the side toward the swing center of the wiper blade 10) are formed with mutually symmetrical or substantially symmetrical profiles.

Main Lever

The main lever 22 is, for example, formed from a resin material, and has an elongated profile along the length direction of the wiper blade 10. The main lever 22 configures a length direction intermediate portion of the wiper lever assembly 20. A length direction central portion of the main lever 22 configures a coupling portion 22A, and a pair of arm portions 22B are configured on the two length direction sides of the coupling portion 22A.

Figure 21:
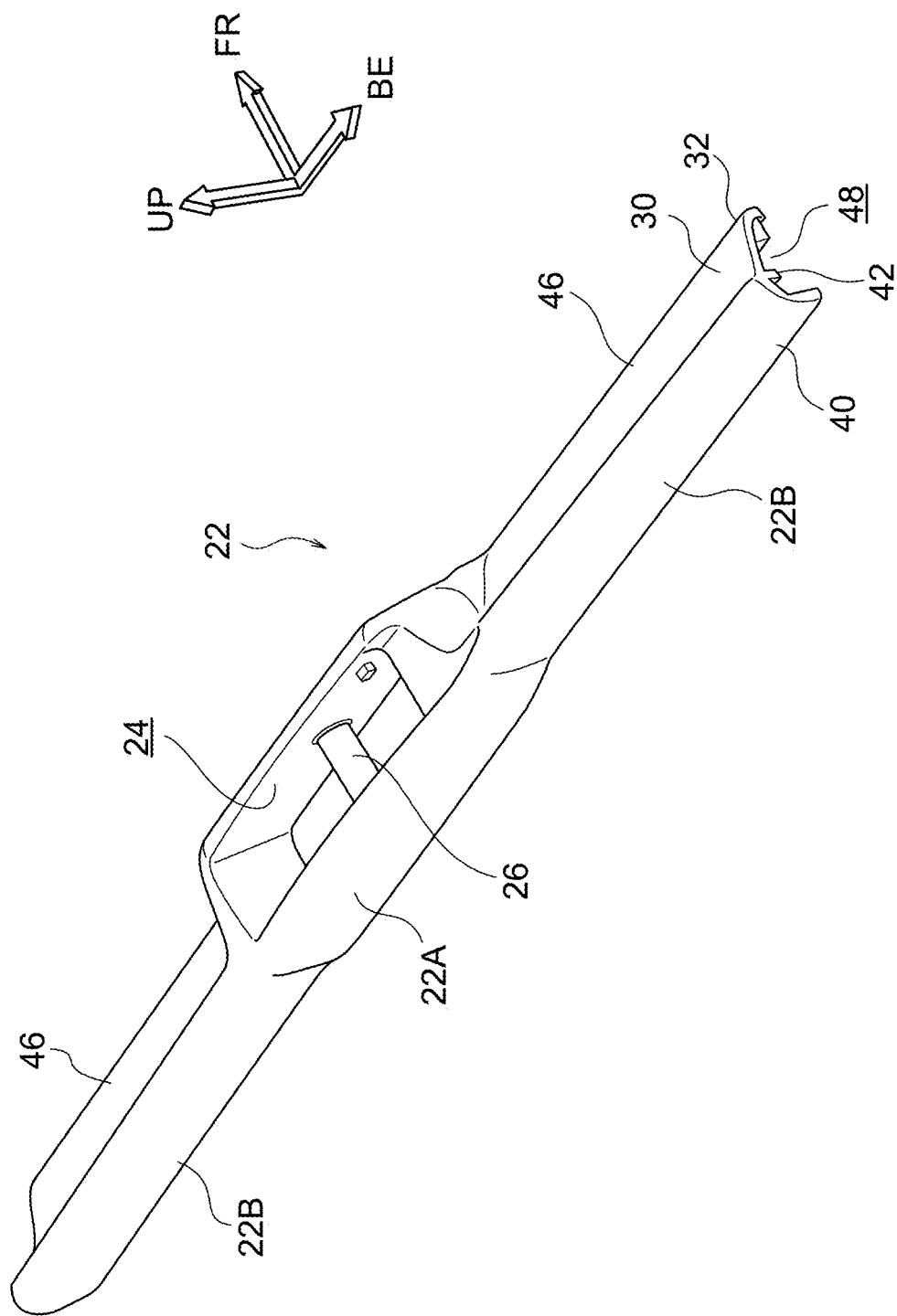
FIG. 21 is a perspective view illustrating a main lever of the wiper lever assembly.
Figure 22:
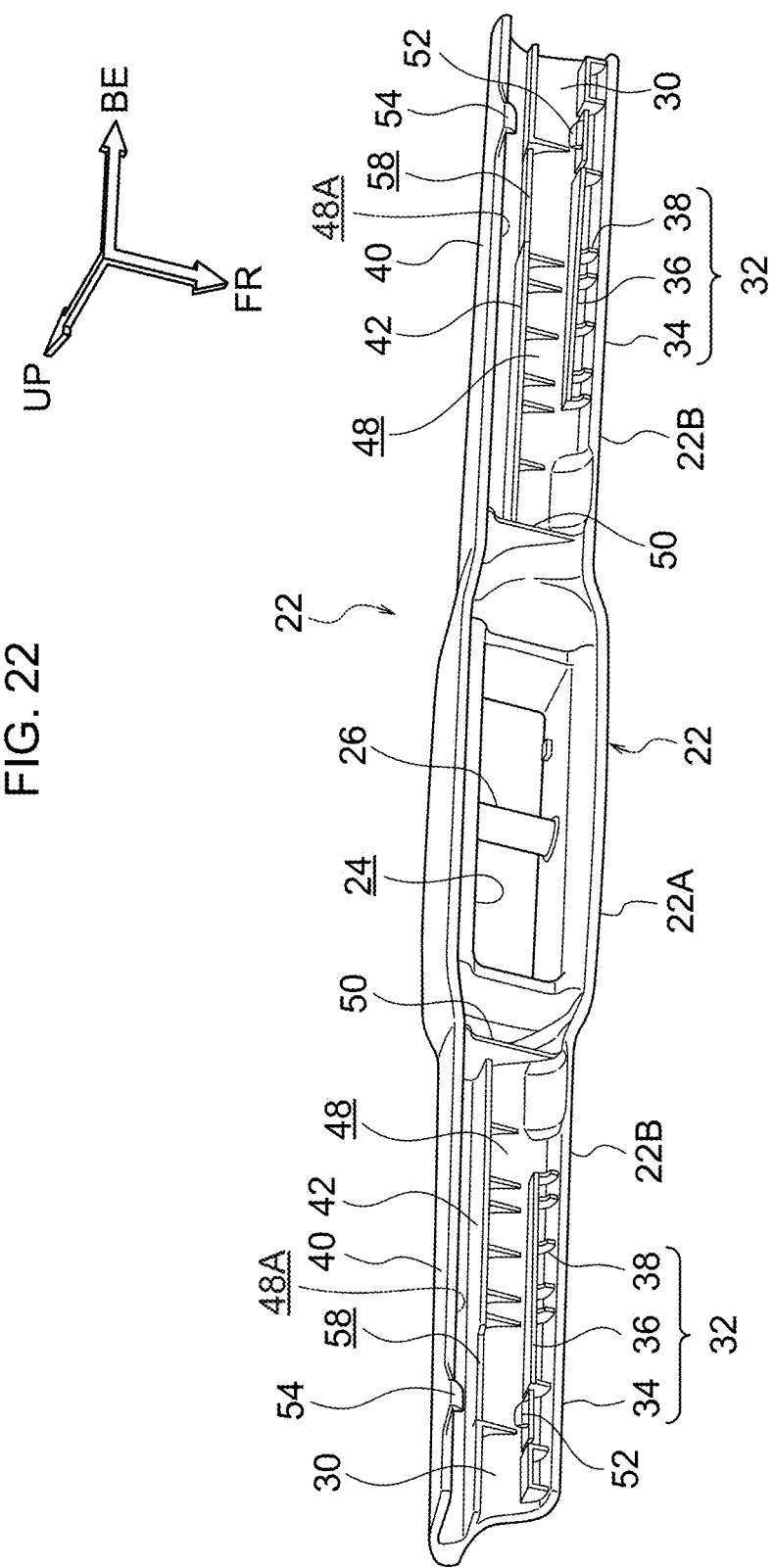
FIG. 22 is a perspective view illustrating a main lever of the wiper lever assembly.

As illustrated in FIG. 21 and FIG. 22, the coupling portion 22A is formed in a rectangular frame shape with its length running along the length direction of the main lever 22 as viewed along the up-down direction. The coupling portion 22A is formed with an opening 24 penetrating the coupling portion 22A in the up-down direction. The opening 24 is formed with an elongated profile with its length running along the length direction of the main lever 22. A metal coupling shaft 26 connected to front and rear walls of the coupling portion 22A is integrally molded to a length direction central portion inside the opening 24. The leading end portion of the wiper arm 12 is coupled to the coupling shaft 26 through a coupling clip 28.

The pair of arm portions 22B extend integrally from the coupling portion 22A toward the two length direction sides of the wiper blade 10. As illustrated in FIG. 7, FIG. 8, FIG. 13, and FIG. 14, each of the arm portions 22B is configured with an open cross-section profile that is open toward the lower side (wiping surface WS side) as viewed along the length direction of the main lever 22. A lower surface of each of the arm portions 22B is recessed toward the upper side as viewed along the length direction of the main lever 22 (as viewed along the length direction of the blade rubber 14). As illustrated in FIG. 13, FIG. 14, and FIG. 21 to FIG. 23, each of the arm portions 22B includes an upper wall 30, a front wall 32 extending downward from a front end portion of the upper wall 30, a rear wall 40 extending downward from a rear end portion of the upper wall 30, a rear-inner wall 42 extending downward from slightly to the rear side of a front-rear direction central portion of the upper wall 30 (in other words between a front-inner wall 36, described later, and the rear wall 40), and plural reinforcing ribs 44 (see FIG. 23) spanning between a front surface of the rear-inner wall 42 and a lower surface of the upper wall 30. The front wall 32 and the rear wall 40 oppose each other in the front-rear direction, and the upper wall 30 connects upper end portions of the front wall 32 and the rear wall 40 in the front-rear direction. The plural reinforcing ribs 44 are arranged along the length direction of the main lever 22, and are integrally joined to the upper wall 30 and to the rear-inner wall 42.

The front wall 32 includes a front-outer wall 34 and the front-inner wall 36 that oppose each other in the front-rear direction. The front wall 32 further includes plural reinforcing ribs 38 connecting the front-outer wall 34 and the front-inner wall 36 together in the front-rear direction. The front-outer wall 34 extends from a front end portion of the upper wall 30 toward the front side (one width direction side) and lower side, and the front-inner wall 36 extends downward from the front end portion of the upper wall 30 slightly to the rear side (slightly toward the other width direction side) of the front-outer wall 34. Namely, the front-outer wall 34 is disposed at the front side of the front-inner wall 36. The front-outer wall 34 is curved so as to form a protrusion toward the front and upper sides. The front-inner wall 36 is set with a smaller dimension than the front-outer wall 34 in the length direction of the main lever 22, and the front-inner wall 36 is not provided on the coupling portion 22A side of the corresponding arm portion 22B. The plural reinforcing ribs 38 are arranged along the length direction of the main lever 22, and are integrally joined to the upper wall 30, the front-outer wall 34, and the front-inner wall 36.

Figure 13:
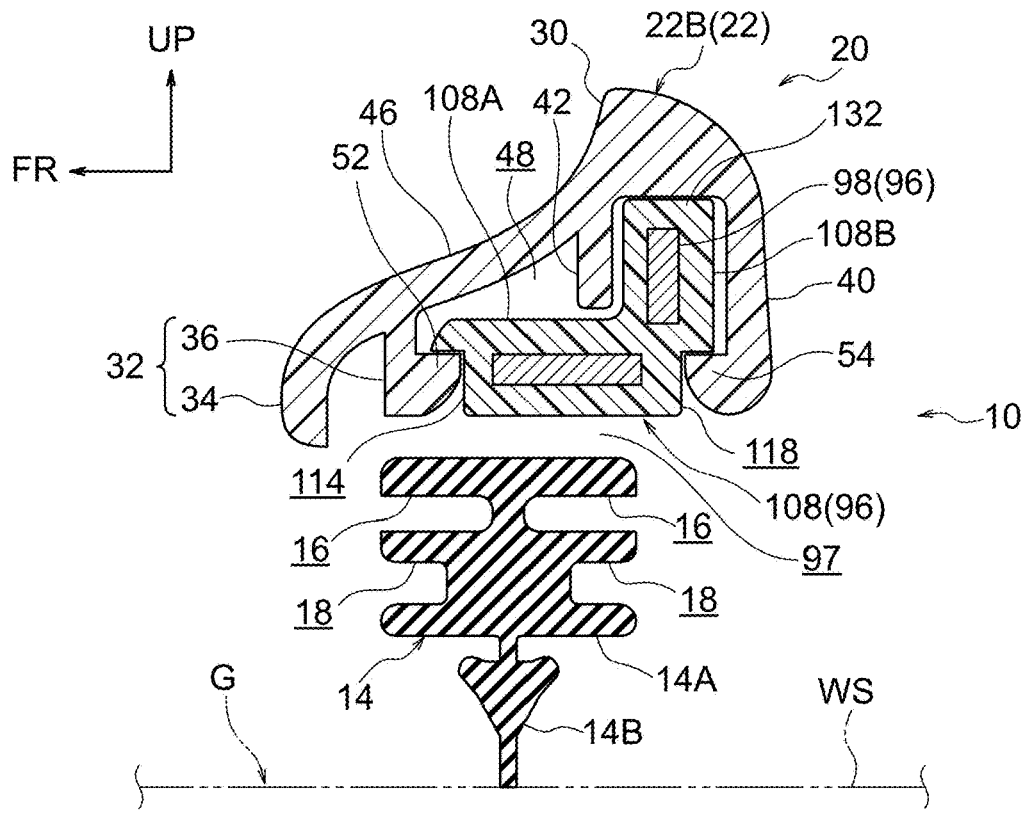
FIG. 13 is a cross-section illustrating the cross-section plane in FIG. 7 as viewed along a wiper blade length direction.
Figure 14:
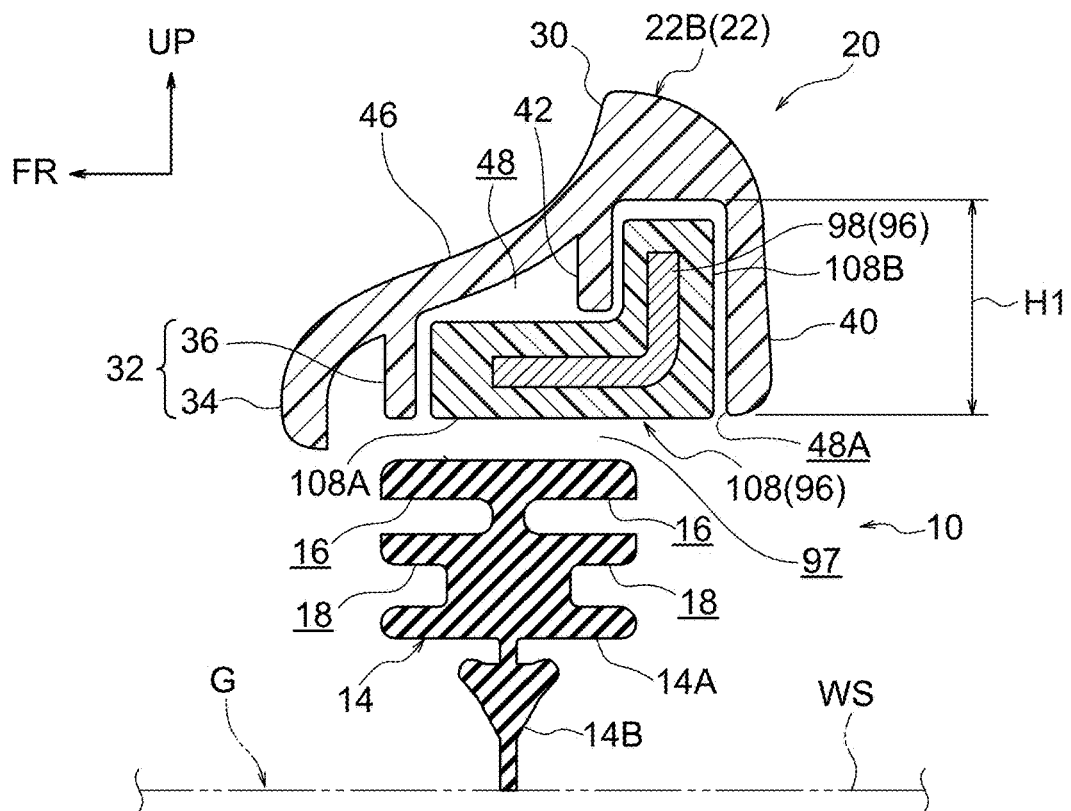
FIG. 14 is a cross-section illustrating the cross-section plane in FIG. 8 as viewed along a wiper blade length direction.

As illustrated in FIG. 13 and FIG. 14, the front-outer wall 34 extends further downward than the front-inner wall 36, such that a lower end portion of the front-outer wall 34 is disposed slightly further downward than a lower end portion of the front-inner wall 36. The lower end portion of the front-inner wall 36 and a lower end portion of the rear wall 40 are disposed at substantially the same position (height) in the up-down direction. A lower end portion of the rear-inner wall 42 is disposed further upward than the respective lower end portions of the front-inner wall 36 and the rear wall 40. The rear wall 40 is formed with a front-rear direction dimension (thickness) that increases on progression from the upper end side where the rear wall 40 is joined to the upper wall 30 toward the lower end side.

An upper surface of each of the arm portions 22B (namely the two length direction sides of the main lever 22) configured as described above is configured by the upper wall 30 and by an upper surface of the front-outer wall 34. The upper surface of each of the arm portions 22B is formed with a fin surface (first fin surface) 46 having a downward gradient on progression toward the vehicle front side (namely the width direction front side, the one width direction side). Each of the fin surfaces 46 is either inclined or curved (curved in this example) away from the wiping surface WS on progression toward a vehicle rear side. Each of the fin surfaces 46 is formed at a vehicle front side location of the upper surface of the corresponding upper wall 30, and extends along the length direction of the main lever 22. Each of the fin surfaces 46 extends as far as slightly rearward of a front-rear direction (width direction) central portion of the corresponding arm portion 22B, and is curved such that the gradient increases on progression rearward. The fin surfaces 46 are subject to travel-induced wind during vehicle travel, thus causing a pressing force toward the wiping surface WS side to act on the blade rubber 14. The respective arm portions 22B formed with the fin surfaces 46 described above have greater height dimensions (up-down direction dimensions) at the rear side than at the front side in the front-rear direction.

As illustrated in FIG. 13, FIG. 14, and FIG. 21 to FIG. 23, each of the arm portions 22B (namely, each of the two length direction sides of the main lever 22) is formed with a main housing compartment 48 for housing part of the corresponding yoke lever 96. The main housing compartment 48 is formed below the upper wall 30 between the front wall 32 and the rear wall 40, and is open toward the lower side (wiping surface WS side) and the length direction outside of the main lever 22. An opening 48A toward the lower side in the main housing compartment 48 (see FIG. 14, FIG. 18 to FIG. 20, FIG. 22, and FIG. 23; also illustrated without reference numerals in FIG. 13) corresponds to a first opening. The opening 48A will be referred to hereafter as the first opening 48A. The main housing compartment 48 has a greater height dimension (up-down direction dimension) at a width direction rear side than at a width direction front side. The rear-inner wall 42 described previously is provided close to a front-rear direction central portion of the main housing compartment 48, such that an upper portion of the main housing compartment 48 is partitioned into front and rear by the rear-inner wall 42. A center side blocking wall (reinforcing rib) 50 (see FIG. 22 and FIG. 23) is provided between the main housing compartment 48 and the coupling portion 22A described previously. The center side blocking wall 50 partitions the main housing compartment 48 from the inside of the coupling portion 22A. As described later, the center side blocking wall 50 has dual functions of blocking off the main housing compartment 48 in the length direction at the length direction center side of the main lever 22, and of reinforcing the main lever 22.

As illustrated in FIG. 13 and FIG. 18 to FIG. 23, at the two length direction end portions of the main lever 22, protrusions (shaft portions) 52, 54 are formed on both width direction front and rear surfaces (both width direction surfaces) of each of the main housing compartments 48. More specifically, the protrusion 52 is formed projecting rearward from a lower end portion of the front-inner wall 36 forming a front surface of the main housing compartment 48, and the protrusion 54 is formed projecting forward from a lower end portion of the rear wall 40 forming a rear surface of the main housing compartment 48. The protrusions 52, 54 are disposed opposing each other (coaxially) in the front-rear direction of the main lever 22, and project in mutually approaching directions. The protrusions 52, 54 are each formed with a substantially semicircular profile as viewed along the front-rear direction, and are disposed orientated such that circular arc shaped curved surfaces thereof protrude upward. Opposing surfaces of the protrusions 52, 54 (surfaces directed toward the front-rear direction center side of the main housing compartment 48) are inclined or curved toward the front-rear direction outside on progression downward.

Figure 20:
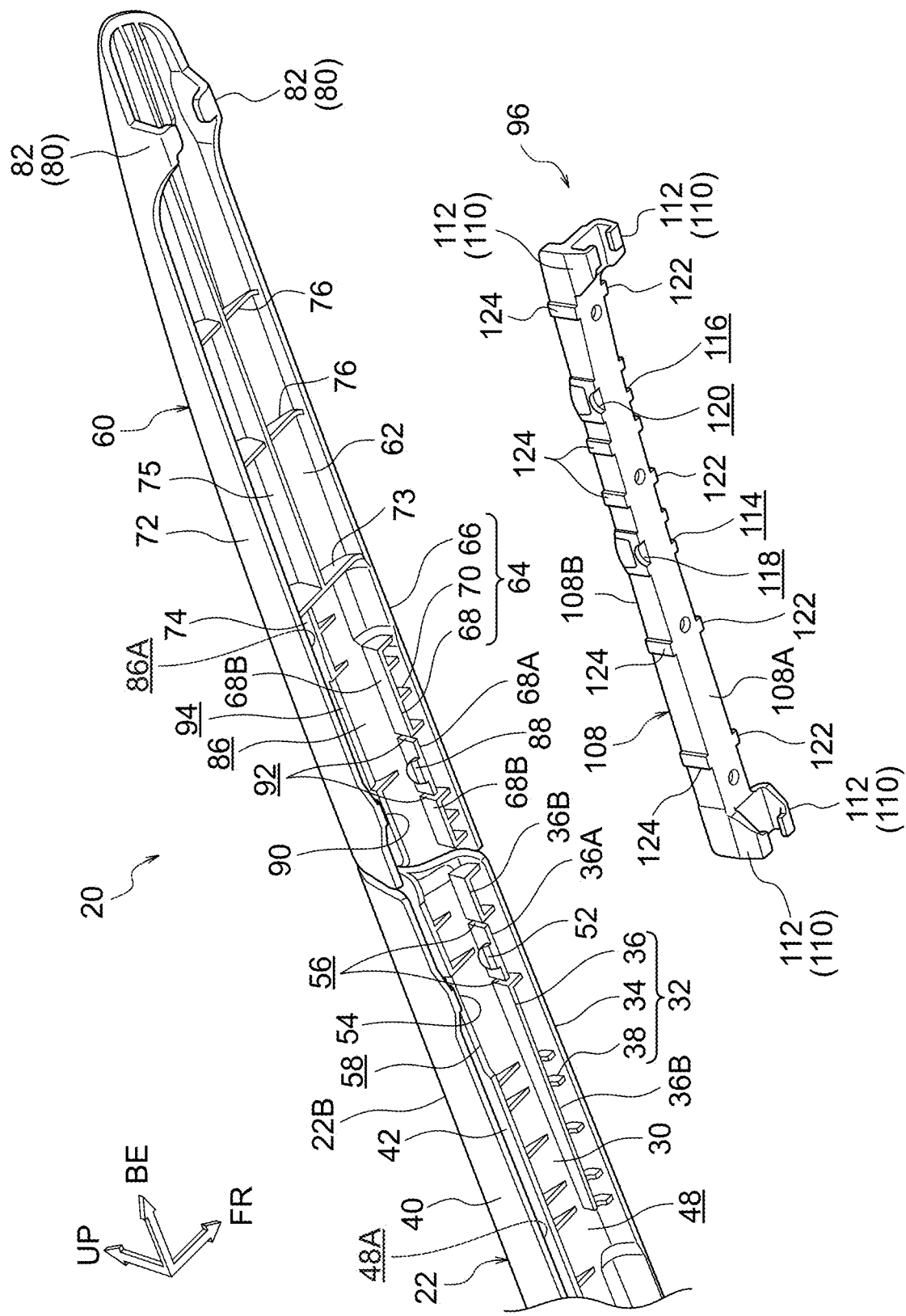
FIG. 20 is an exploded perspective view illustrating part of the wiper lever assembly.
Figure 23:
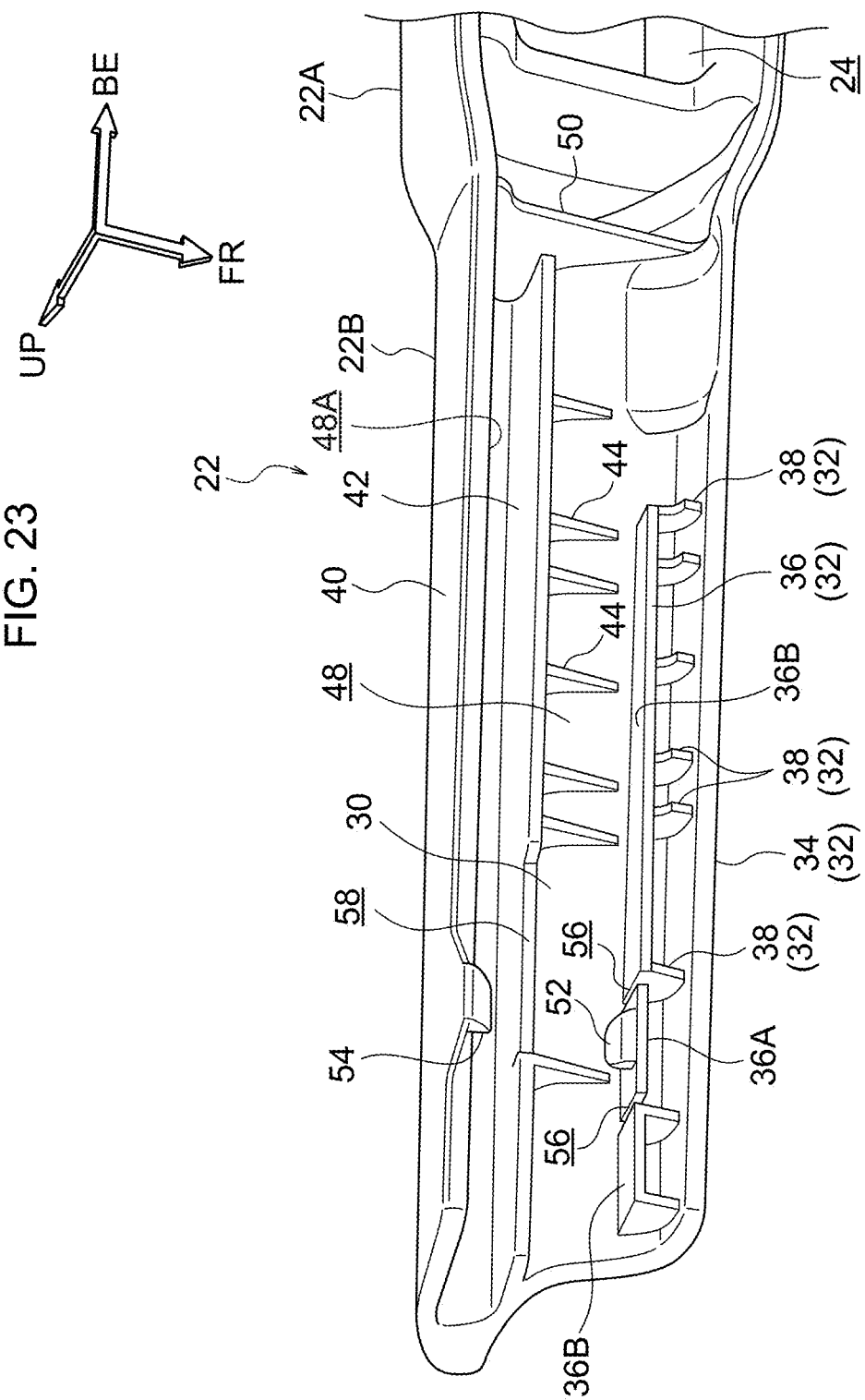
FIG. 23 is an enlarged perspective view corresponding to part of FIG. 22.

As illustrated in FIG. 20 and FIG. 23, the front-inner wall 36 is formed with a pair of vertically-extending slits 56 on the two sides of the protrusion 52 in the length direction of the main lever 22. A location of the front-inner wall 36 between the pair of slits 56 (namely a location formed with the protrusion 52) configures a flexible portion 36A, and locations positioned on the two sides of the flexible portion 36A in the length direction of the main lever 22 configure reinforced portions 36B. The flexible portion 36A is not reinforced by the reinforcing ribs 38 described previously, whereas the reinforced portions 36B are reinforced by the reinforcing ribs 38 described previously. The flexible portion 36A thus flexes more readily toward the width direction front and rear than the reinforced portions 36B.

As illustrated in FIG. 22 and FIG. 23, a lower end portion of the rear-inner wall 42 is formed with a notch 58 that has been cut away from the lower side. The notch 58 is formed close to the protrusions 52, 54. The notch 58 configures an engagement portion.

Movable Covers

The pair of movable covers 60 are, for example, formed from a resin material and have elongated profiles. As illustrated in FIG. 1 to FIG. 3, FIG. 5, and FIG. 6, the movable covers 60 are disposed on the two length direction sides of the main lever 22 with their lengths running along the length direction of the main lever 22. As illustrated in FIG. 9 to FIG. 12, FIG. 15 to FIG. 19, and FIG. 24, each of the movable covers 60 has an open cross-section profile that is open toward the lower side (wiping surface WS side) as viewed along the length direction of the corresponding movable cover 60, and a lower surface of each of the movable covers 60 is recessed toward the upper side as viewed along the length direction of the movable cover 60 (as viewed along the length direction of the blade rubber 14). Each of the movable covers 60 includes an upper wall 62, a front wall 64 extending downward from a front end portion of the upper wall 62, a rear wall 72 extending downward from a rear end portion of the upper wall 62, a lengthwise rib (inner wall) 75 extending (projecting) toward the lower side (wiping surface WS side) from a lower surface of the upper wall 62 between the front wall 64 and the rear wall 72, an outside blocking wall 73 connecting the front wall 64, the lengthwise rib 75, and the rear wall 72 together in the front-rear direction slightly further to the main lever 22 side than a length direction central portion of the corresponding movable cover 60, and plural (two in the present example) partitioning walls (reinforcing walls, reinforcing ribs) 76 connecting the front wall 64, a rear-inner wall 74, and the rear wall 72 together in the front-rear direction on the opposite side of the outside blocking wall 73 to the main lever 22.

The front wall 64 and the rear wall 72 oppose each other in the front-rear direction, and the upper wall 62 connects upper end portions of the front wall 64 and the rear wall 72 together in the front-rear direction. The lengthwise rib 75 extends along the length direction of the movable cover 60. The outside blocking wall 73 and the plural partitioning walls 76 are arranged at intervals in the length direction of the movable cover 60 at a length direction intermediate portion of the movable cover 60. The outside blocking wall 73 and the plural partitioning walls 76 are integrally joined to the upper wall 62, the front wall 64, the rear wall 72, and the lengthwise rib 75. The outside blocking wall 73 has dual functions of blocking off a movable housing compartment 86, described later, in the length direction on the opposite side to the main lever 22, and of reinforcing the movable cover 60. The plural partitioning walls 76 have dual functions of partitioning a location of the movable cover 60 on the opposite side of the outside blocking wall 73 to the main lever 22, in other words an internal space further toward the base end side than the movable housing compartment 86 in the length direction of the movable cover 60, and of reinforcing this location. Note that each of the movable covers 60 may be configured including just a single partitioning wall 76.

Each of the movable covers 60 is provided with the rear-inner wall 74 but is not provided with the lengthwise rib 75 further toward the main lever 22 side than the outside blocking wall 73. The rear-inner wall 74 extends (projects) downward from the lower surface of the upper wall 62 slightly rearward of the front-rear direction central portion thereof. Each of the movable covers 60 is further provided with plural reinforcing ribs 78 (see FIG. 24) spanning between a front surface of the rear-inner wall 74 and a lower surface of the upper wall 62 further toward the main lever 22 side than the outside blocking wall 73. The reinforcing ribs 78 are arranged at intervals in the length direction of the movable cover 60, and are integrally joined to the upper wall 62 and the rear-inner wall 74.

Figure 24:
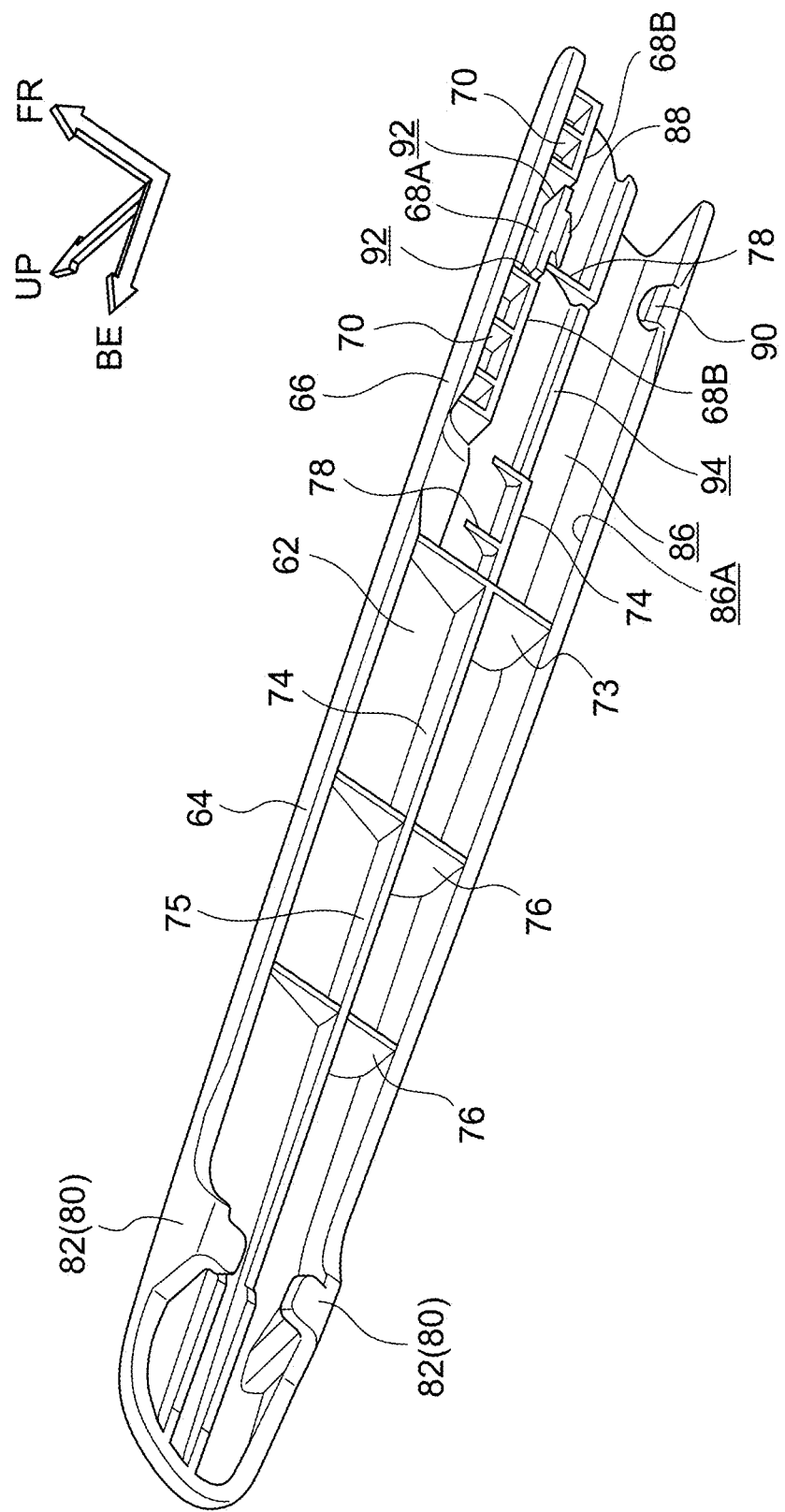
FIG. 24 is a perspective view illustrating a movable cover of the wiper lever assembly.
Figure 25:
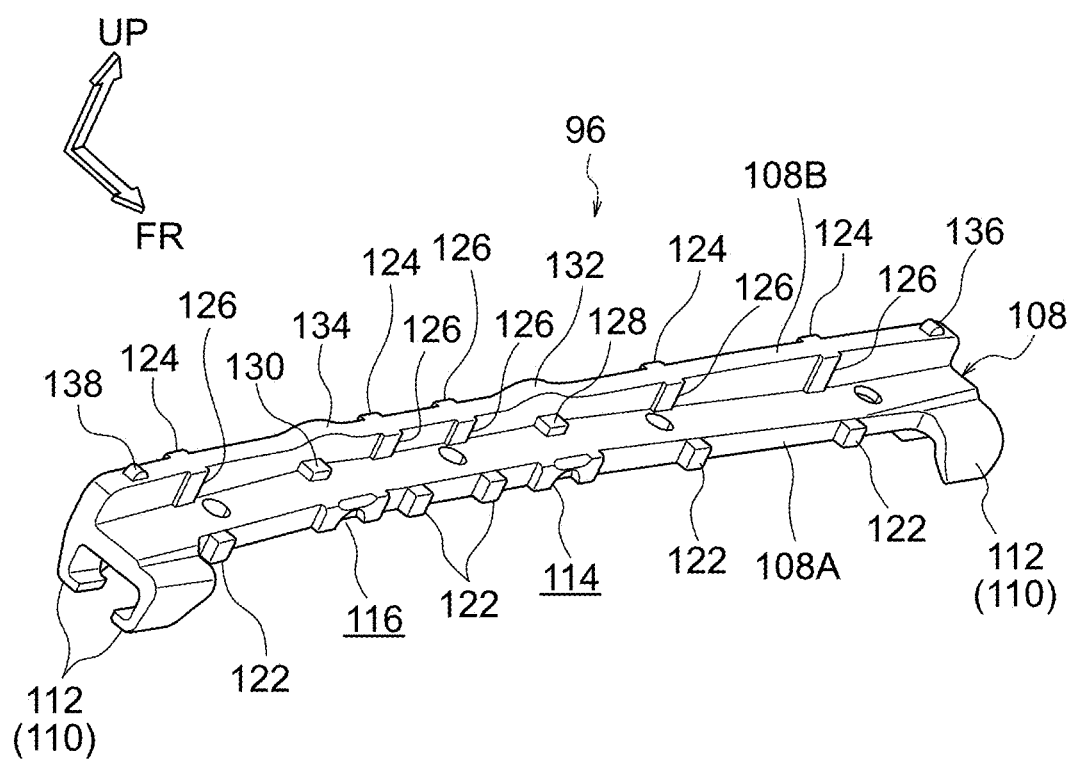
FIG. 25 is a perspective view illustrating a yoke lever of the wiper lever assembly.
Figure 26:
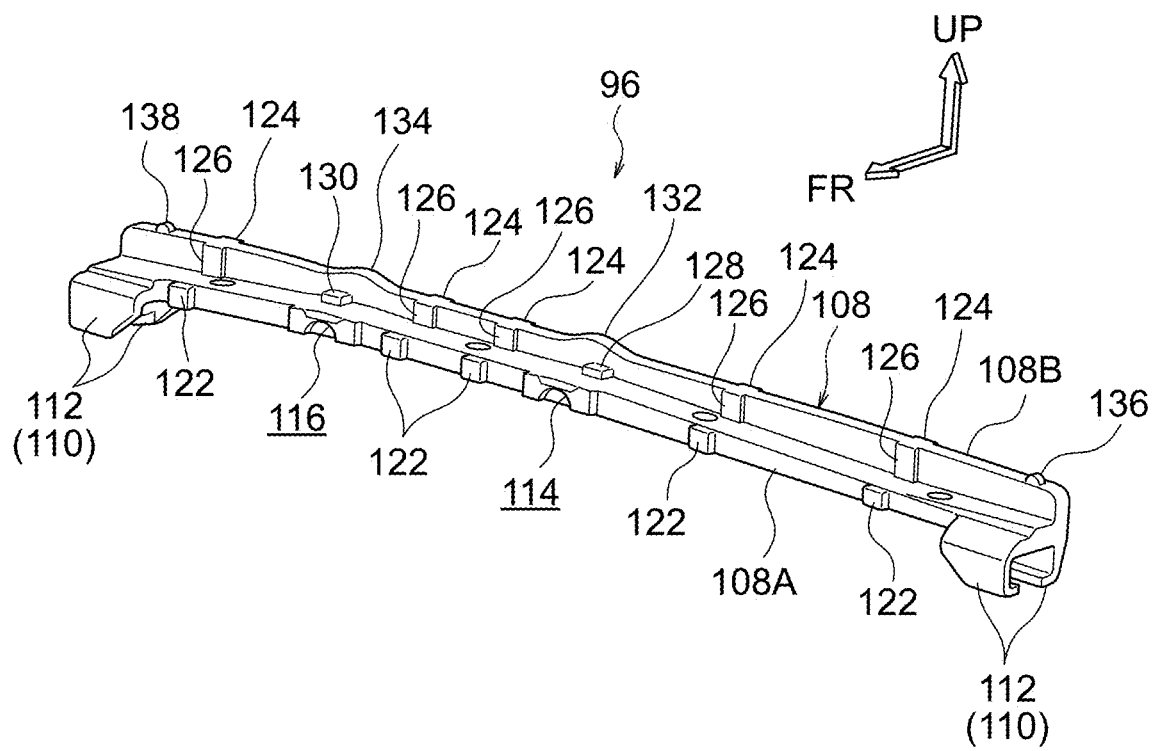
FIG. 26 is a perspective view illustrating a yoke lever of the wiper lever assembly.
Figure 27:
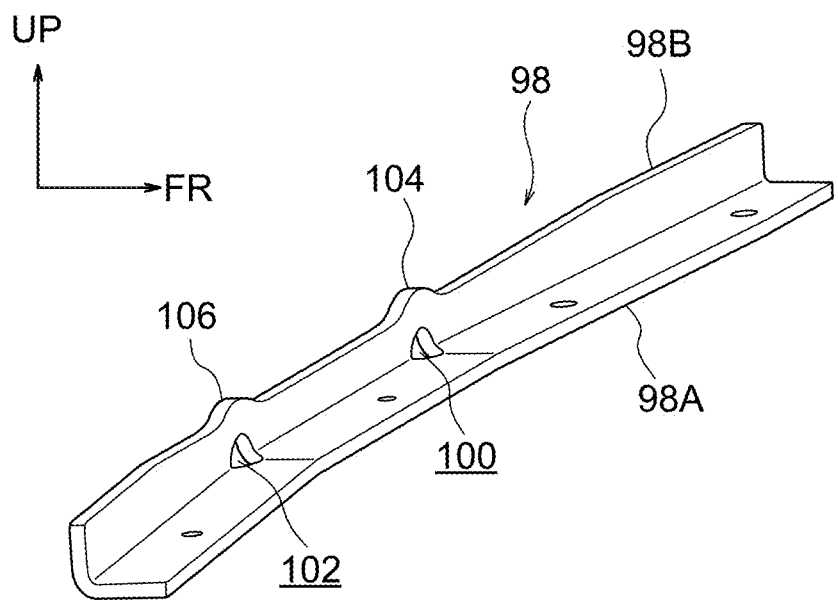
FIG. 27 is a perspective view illustrating a metal portion of the yoke lever.
Figure 28:
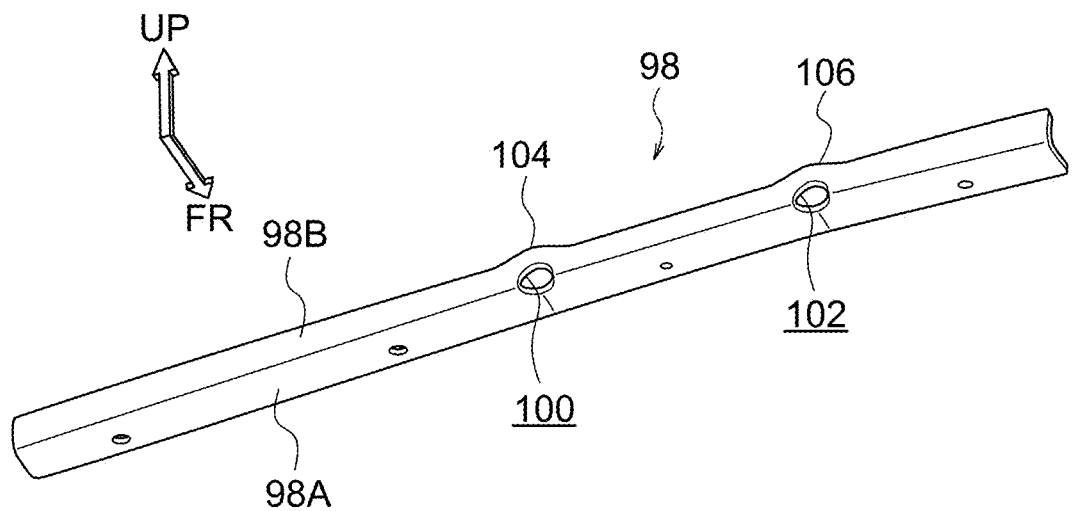
FIG. 28 is a perspective view illustrating the metal portion.
Figure 29:
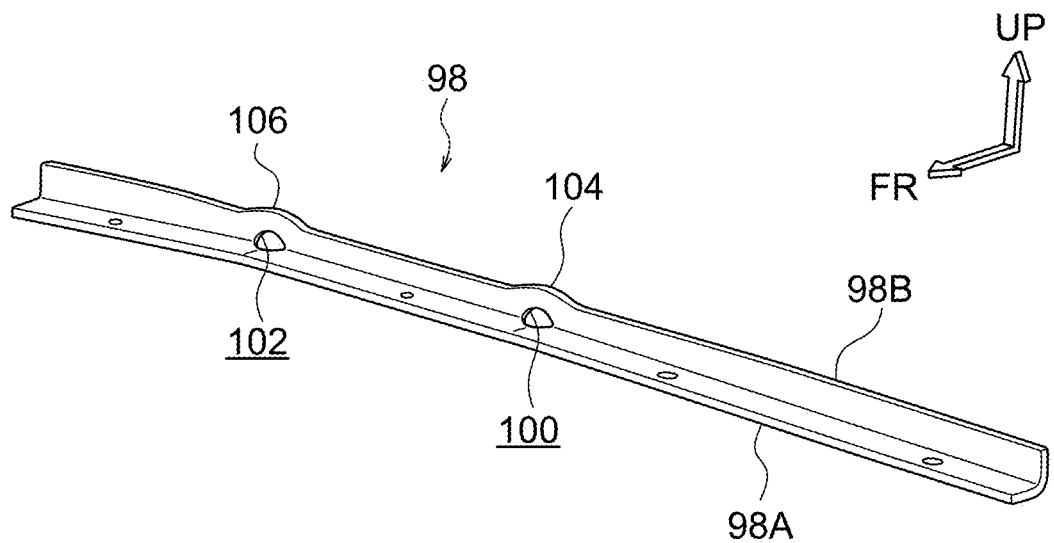
FIG. 29 is a perspective view illustrating the metal portion.

As illustrated in FIG. 24, a location of the front wall 64 further toward the main lever 22 side than the outside blocking wall 73 is configured by a front-outer wall 66 and a front-inner wall 68 opposing each other in the front-rear direction, and plural reinforcing ribs 70 connecting the front-outer wall 66 and the front-inner wall 68 together in the front-rear direction. The front-outer wall 66 extends forward and downward from a front end portion of the upper wall 62, and the front-inner wall 68 extends downward from a front end portion of the upper wall 62 slightly to the rear (slightly toward the other width direction side) of the front-outer wall 66. Namely, the front-outer wall 66 is disposed at the front side of the front-inner wall 68. The front-outer wall 66 is curved so as to form a protrusion toward the front and upper sides. The front-inner wall 68 is set with a smaller dimension than the front-outer wall 66 in the length direction of the corresponding movable cover 60, and the front-inner wall 68 is not provided on the side corresponding to the outside blocking wall 73. The plural reinforcing ribs 70 are arranged along the length direction of the movable cover 60, and are integrally joined to the upper wall 62, the front-outer wall 66, and the front-inner wall 68.

Figure 15:
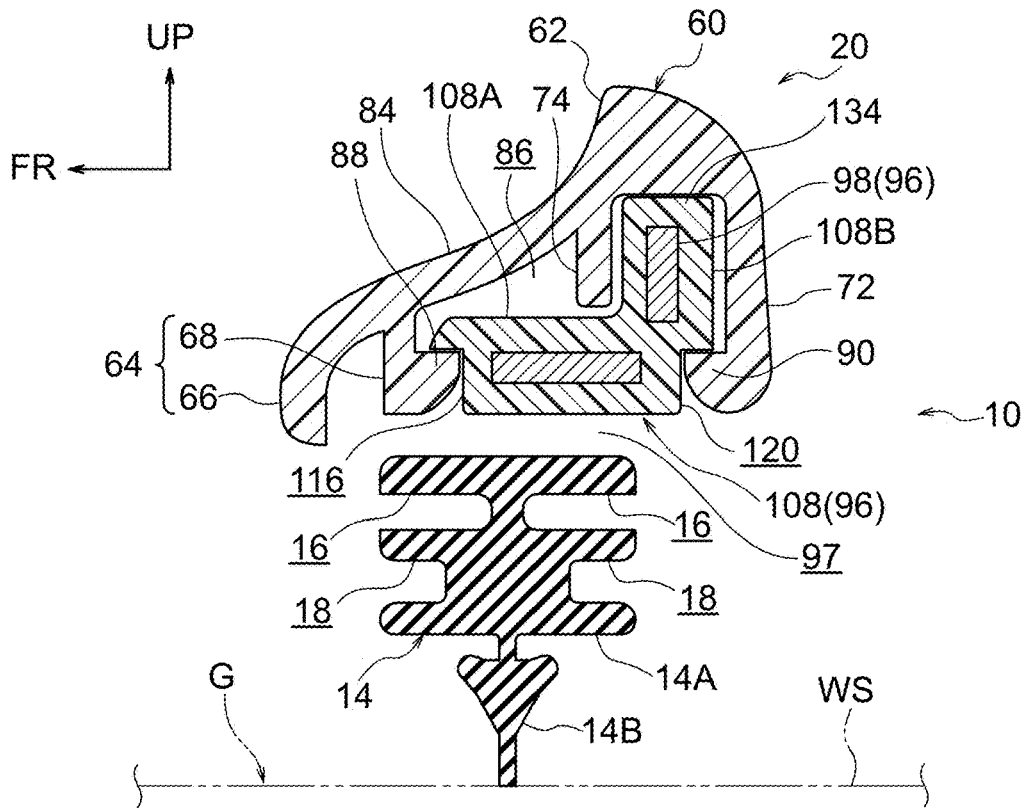
FIG. 15 is a cross-section illustrating the cross-section plane in FIG. 9 as viewed along a wiper blade length direction.
Figure 16:
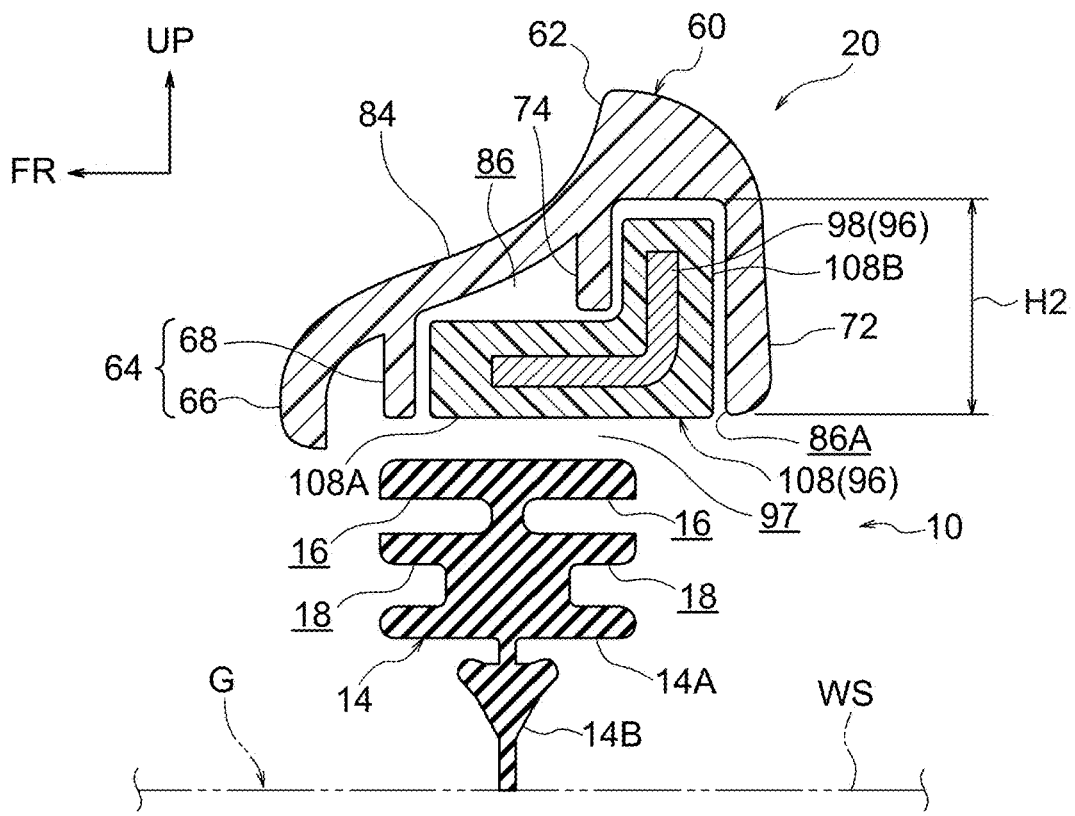
FIG. 16 is a cross-section illustrating the cross-section plane in FIG. 10 as viewed along a wiper blade length direction.

As illustrated in FIG. 15 and FIG. 16, the front-outer wall 66 extends further downward than the front-inner wall 68, such that a lower end portion of the front-outer wall 66 is disposed further downward than a lower end portion of the front-inner wall 68. The lower end portion of the front-inner wall 68 and a lower end portion of the rear wall 72 are disposed at substantially the same position (height) in the up-down direction. A lower end portion of the rear-inner wall 74 is disposed further upward than the respective lower end portions of the front-inner wall 68 and the rear wall 72. Note that the front-rear placement and the up-down length of the lengthwise rib 75 will be described in detail later.

One length direction end portion of each of the movable covers 60 (the end portion on the opposite side to the main lever 22) is formed with the grip portion 80 that grips a corresponding length direction end portion of the blade rubber 14. Each of the grip portions 80 includes a pair of front and rear grip tabs 82 extending downward from the front wall 64 and the rear wall 72. Leading end portions (lower end portions) of the front and rear grip tabs 82 in the width direction are bent toward one another, and are respectively fitted into the pair of grippable grooves 18 described previously. The corresponding length direction end portion of the blade rubber 14 is thus gripped by the grip portion 80.

An upper surface of each of the movable covers 60 configured as described above is configured by upper surfaces of the upper wall 62 and the front-outer wall 66. The upper surface of each of the movable covers 60 is formed with a fin surface (second fin surface) 84 having a downward gradient on progression toward the vehicle front side (namely the width direction front side, the one width direction side). Each of the fin surfaces 84 is either inclined or curved (curved in this example) away from the wiping surface WS on progression toward the vehicle rear side. Each of the fin surfaces 84 is formed at a vehicle front side location of the upper surface of the upper wall 62 and extends along the length direction of the corresponding movable cover 60. Each of the fin surfaces 84 extends as far as slightly rearward of a front-rear direction central portion of the corresponding movable cover 60, and is curved such that the gradient increases on progression rearward. The fin surfaces 84 are subject to travel-induced wind during vehicle travel, thus causing a pressing force toward the wiping surface WS side to act on the blade rubber 14. The respective movable covers 60 formed with the fin surfaces 84 described above have greater height dimensions (up-down direction dimensions) at the rear side than at the front side in the front-rear direction.

Each of the movable covers 60 is formed with the movable housing compartment 86 for housing part of the corresponding yoke lever 96 on the main lever 22 side of the outside blocking wall 73 described above. As illustrated in FIG. 15, FIG. 16, FIG. 20, and FIG. 24, each of the movable housing compartments 86 is formed below the upper wall 62 between the front wall 64 and the rear wall 72, and is open at the lower side (wiping surface WS side) and the main lever 22 side. An opening 86A toward the lower side of the movable housing compartment 86 (see FIG. 16, FIG. 18 to FIG. 20, and FIG. 24; illustrated without reference numerals in FIG. 15) corresponds to a second opening. The opening 86A will be referred to hereafter as the second opening 86A. The movable housing compartment 86 has a greater height dimension (up-down direction dimension) at a front-rear direction rear side than at a front-rear direction front side. The rear-inner wall 74 described above is provided close to a front-rear direction central portion of the movable housing compartment 86, such that an upper portion of the movable housing compartment 86 is partitioned into front and rear by the rear-inner wall 74.

As illustrated in FIG. 15, FIG. 18 to FIG. 20, and FIG. 24, at another length direction end portion (main lever 22-side end portion) of each of the movable covers 60, protrusions 88, 90 are formed on both width direction front and rear surfaces of the corresponding movable housing compartment 86. More specifically, the protrusion 88 is formed projecting rearward from a lower end portion of the front-inner wall 68 forming a front surface of the movable housing compartment 86, and the protrusion 90 is formed projecting forward from a lower end portion of the rear wall 72 forming a rear surface of the movable housing compartment 86. The protrusions 88, 90 are disposed opposing each other in the front-rear direction of the corresponding movable cover 60, and project in mutually approaching directions. The protrusions 88, 90 are each formed with a substantially semicircular profile as viewed along the front-rear direction, and are disposed orientated such that circular arc shaped curved surfaces thereof protrude upward. Opposing surfaces of the protrusions 88, 90 (surfaces directed toward the front-rear direction center side of the movable housing compartment 86) are inclined or curved toward the front-rear direction outside on progression downward.

As illustrated in FIG. 20 and FIG. 24, the front-inner wall 68 is formed with a pair of vertically-extending slits 92 on the two sides of the protrusion 88 in the length direction of corresponding movable cover 60. A location of the front-inner wall 68 between the pair of slits 92, namely a location formed with the protrusion 88, configures a flexible portion 68A, and locations positioned on either side of the flexible portion 68A in the length direction of the movable cover 60 configure reinforced portions 68B. The flexible portion 68A is not reinforced by the reinforcing ribs 70 described previously, whereas the reinforced portions 68B are reinforced by the reinforcing ribs 70 described previously. The flexible portion 68A thus flexes more readily than the reinforced portions 68B toward the front and rear in the width direction.

As illustrated in FIG. 20 and FIG. 24, a lower end portion of the rear-inner wall 74 in the movable housing compartment 86 is formed with a notch 94 that has been cut away from the lower side. The notch 94 is formed close to the protrusions 88, 90. The notch 94 configures an engagement portion.

Yoke Levers

As illustrated in FIG. 5, FIG. 6, FIG. 18 to FIG. 20, FIG. 25, and FIG. 26, the pair of yoke levers 96 are formed with elongated profiles with lengths running along the length directions of the main lever 22 and the movable covers 60. Each of the yoke levers 96 is configured by a metal portion 98 made of metal (see FIG. 27 to FIG. 29), and a yoke lever body 108, serving as a resin portion made from resin, provided at the outside of the metal portion 98. The metal portion 98 is for example embedded in the yoke lever body 108 by insert molding. Note that there is no limitation to configurations in which the metal portion 98 is embedded in the yoke lever body 108 serving as the resin portion, and alternatively configuration may be made such that the resin portion is attached to part of the metal portion (for example peripherally to the grip portion 110 and recesses 114, 116, 118, 120, described later) by outsert molding or the like. Note that the respective yoke levers 96 are not limited to a configuration including the metal portion 98 and the yoke lever body 108 (resin portion), and the yoke levers 96 may alternatively be configured by just one out of a metal portion or a resin portion.

The metal portion 98 is manufactured by pressing sheet metal such as stainless steel, and has an elongated profile with its length running along the length direction of the corresponding yoke lever 96. The metal portion 98 is configured by a plate-shaped portion 98A with its plate thickness direction running in the up-down direction, and an upright wall portion (reinforcing flange) 98B extending upward from a width direction rear end portion (other width direction end portion) of the plate-shaped portion 98A, such that the metal portion 98 has an L-shaped cross-section profile as viewed along its length direction.

A pair of through holes 100, 102 are formed through a length direction intermediate portion of the metal portion 98 so as to be aligned with each other in the length direction of the metal portion 98. The through holes 100, 102 are formed through a bent portion between the plate-shaped portion 98A and the upright wall portion 98B. A pair of projections 104, 106 are formed aligned with each other in the length direction of the metal portion 98 at an upper end portion of the upright wall portion 98B so as to project upward. The respective projections 104, 106 are disposed above the pair of through holes 100, 102, and each of the projections 104, 106 is formed with a substantially semicircular profile so as to form a protrusion toward the upper side as viewed along the front-rear direction.

The yoke lever body 108 in which the metal portion 98 is embedded is molded with a similar profile to the metal portion 98, and has an L-shaped cross-section profile as viewed along its length direction. Specifically, the yoke lever body 108 is configured by a plate-shaped portion 108A with its plate thickness direction running in the up-down direction, and an upright wall portion 108B extending upward from a width direction rear end portion of the plate-shaped portion 108A, such that the yoke lever body 108 has an L-shaped cross-section profile as viewed along its length direction.

The plate-shaped portion 98A of the metal portion 98 is embedded in the plate-shaped portion 108A, and the upright wall portion 98B of the metal portion 98 is embedded in the upright wall portion 108B. The plate-shaped portion 108A that configures a lower portion of the yoke lever body 108 is set with a smaller width direction dimension than the upright wall portion 108B that configures an upper portion of the yoke lever body 108. A height dimension of the yoke lever body 108 (yoke lever 96) provided with the upright wall portion 108B increases incrementally in the width direction such that the yoke lever body 108 has a greater height dimension at the width direction rear side than at the width direction front side, and is formed with an L-shaped cross-section profile as viewed along the length direction.

The two length direction end portions of the plate-shaped portion 108A are formed with the grip portions 110 that grip a length direction intermediate portion of the blade rubber 14. Each of the grip portions 110 includes a pair of front and rear grip tabs 112 respectively extending downward from a front end portion and a rear end portion of the plate-shaped portion 108A. Leading end portions (lower end portions) of the front and rear grip tabs 112 are bent toward one another, and are respectively fitted into the pair of grippable grooves 18 described previously. The corresponding length direction intermediate portion of the blade rubber 14 is thus gripped by the grip portions 110. Note that the front side grip tab 112 projects forward from the plate-shaped portion 108A, then extends downward, so as to be disposed further toward the front side than the plate-shaped portion. In other words, the plate-shaped portion 108A is cut away toward the rear side between the respective front grip tabs 112 provided at the two length direction end portions of the plate-shaped portion 108A. At a location between the respective grip portions 110, a gap 97 (see FIG. 13 to FIG. 16) is formed between a lower surface of the plate-shaped portion 108A (lower surface of the yoke lever 96) and the upper surface of the blade rubber 14.

A front surface of a length direction intermediate portion of the plate-shaped portion 108A is formed with the pair of recesses 114, 116 arranged along the length direction of the yoke lever body 108, and a rear surface of the length direction intermediate portion of the plate-shaped portion is formed with the pair of recesses 118, 120 arranged along the length direction of the yoke lever body 108. The pair of recesses 114, 116 and the pair of recesses 118, 120 are disposed at positions aligned in both the length direction of the yoke lever body 108 and the up-down direction, so as to oppose one another in the front-rear direction. Each of the recesses 114, 116, 118, 120 is open toward the front-rear direction outside and the lower side (has an opening at the front-rear direction outside and lower side), and has a substantially semicircular profile as viewed along the front-rear direction. The recesses 114, 116, 118, 120 are disposed orientated such that circular arc shaped curved surfaces thereof protrude upward. The recesses 118, 120 formed to the rear surface of the plate-shaped portion 108A are formed at positions corresponding to the pair of through holes 100, 102 described previously (positions opposing the pair of through holes 100, 102 in the width direction). The thickness of the yoke lever body 108 peripheral to the recesses 118, 120 is thus secured, while the front-rear direction dimension and up-down direction dimension of the yoke lever body 108 are kept small. Note that instead of the pair of through holes 100, 102 described above, configuration may be made in which indentations recessed toward the opposite side to the recesses 118, 120 are formed in the metal portion 98 at positions corresponding to the recesses 118, 120. Alternatively, configuration may be made in which notches recessed toward the opposite side to the recesses 114, 116 are formed in the metal portion 98 at positions corresponding to the recesses 114, 116. Portions of the yoke lever body 108 peripheral to the recesses 114, 116 configure front projection portions (not allocated reference numerals) projecting forward, and portions of the yoke lever body 108 peripheral to the recesses 118, 120 configure rear projection portions (not allocated reference numerals) projecting rearward.

A width direction front surface of the length direction intermediate portion of the plate-shaped portion 108A is formed with plural front side projections 122 arranged along the length direction of the yoke lever body 108 so as to project forward. A width direction rear surface of length direction intermediate portions of the plate-shaped portion 108A and the upright wall portion 108B (a width direction rear surface of the length direction intermediate portion of the yoke lever body 108) is formed with plural rear side projections 124 arranged along the length direction of the yoke lever body 108 so as to project rearward. The front side projections 122 are set with a greater projection length from the front surface of the plate-shaped portion 108A than the front projection portions described above (portions peripheral to the recesses 114, 116), and the rear side projections 124 are set with a greater projection length from the rear surface of the yoke lever body 108 than the rear projection portions described above (portions peripheral to the recesses 118, 120).

A width direction front surface of the length direction intermediate portion of the upright wall portion 108B is formed with plural inner side projections 126 arranged along the length direction of the yoke lever body 108 so as to project forward. An up-down direction dimension of each of the inner side projections 126 is set to be the same as an up-down direction dimension of the upright wall portion 108B. The width direction front surface of the length direction intermediate portion of the upright wall portion 108B is further formed with a pair of engaging protrusions 128, 130 arranged along the length direction of the yoke lever body 108 so as to project forward. The pair of engaging protrusions 128, 130 correspond to engaging portions. The pair of engaging protrusions 128, 130 project further to the front side from the upright wall portion 108B than the plural inner side projections 126 described above, and are integrally joined to an upper surface of the plate-shaped portion 108A. Namely, the pair of engaging protrusions 128, 130 are provided straddling a boundary between the upright wall portion 108B and the plate-shaped portion 108A. The pair of engaging protrusions 128, 130 are, moreover, set with a smaller up-down direction dimension than the plural inner side projections 126. The pair of engaging protrusions 128, 130 are formed close to the pair of recesses 114, 116 and the pair of recesses 118, 120 described above.

The upper surface of the length direction intermediate portion of the upright wall portion 108B is formed with a pair of rear side pressing portions 132, 134 arranged along the length direction of the yoke lever body 108 so as to project upward. The rear side pressing portions 132, 134 correspond to pressing portions. The rear side pressing portions 132, 134 are disposed above the pair of recesses 118, 120 described above, and each have a substantially semicircular profile forming a protrusion toward the upper side as viewed along the front-rear direction. The pair of projections 104, 106 described previously are embedded inside the rear side pressing portions 132, 134. Furthermore, upper surfaces of the two length direction end portions of the upright wall portion 108B are formed with a pair of contact portions 136, 138 projecting upward.

Each of the yoke levers 96 configured as described above is housed spanning inside the corresponding main housing compartment 48 of the main lever 22 and inside the movable housing compartment 86 of the corresponding movable cover 60 in the length direction, and is coupled to the main lever 22 and the movable cover 60 so as to be capable of pivoting about axes extending along the width direction. Specifically, the coaxially-disposed protrusions 52, 54 of the main lever 22 fit together with the recesses 114, 118 in the corresponding yoke lever 96 so as to couple the main lever 22 and the yoke lever 96 together so as to be capable of pivoting with respect to each other. Moreover, the coaxially-disposed protrusions 88, 90 of the movable cover 60 fit together with the recesses 116, 120 in the corresponding yoke lever 96 so as to couple the movable cover 60 and the yoke lever 96 together so as to be capable of pivoting with respect to each other. Namely, each of the yoke levers 96 is coupled so as to be capable of pivoting to the main lever 22 and to the corresponding movable cover 60 at the plate-shaped portion 108A on the lower side that has a greater front-rear width than the upright wall portion 108B on the upper side. Moreover, each of the yoke levers 96 is coupled so as to be capable of pivoting to the front-inner wall 36 and to the rear wall 40 of the main lever 22, and is coupled so as to be capable of pivoting to the front-inner wall 68 and to the rear wall 72 of the corresponding movable cover 60.

As illustrated in FIG. 13 to FIG. 16, the plate-shaped portion 108A of each of the yoke levers 96 is housed between the front-inner wall 36 and the rear wall 40 of the main lever 22, and between the front-inner wall 68 and the rear wall 72 of the corresponding movable cover 60. The upright wall portion 108B of the yoke lever 96 is housed between the rear-inner wall 42 and the rear wall 40 of the main lever 22, and between the rear-inner wall 74 and the rear wall 72 of the corresponding movable cover 60. Namely, the main lever 22 and the movable covers 60 have pairs of opposing walls (the rear wall 40 and the rear-inner wall 42, and the rear wall 72 and the rear-inner wall 74) that respectively oppose each other at the front and rear of the upright wall portion 108B.

Of the grip portions 110 provided at the two length direction end portions of each of the yoke levers 96, the grip portion 110 on the main lever 22 side is retractably housed inside the corresponding main housing compartment 48 between the front-inner wall 36 and the center side blocking wall 50 of the main lever 22 (see FIG. 22 and FIG. 23). The grip portion 110 on the opposite side to the main lever 22 is housed inside the movable housing compartment 86 between the front-inner wall 68 and the outside blocking wall 73 of the corresponding movable cover 60.

Of the rear side pressing portions 132, 134 projecting from the upper surface of the upright wall portion 108B provided at a rear portion of each of the yoke levers 96, the rear side pressing portion 132 contacts an upper surface of the corresponding main housing compartment 48 (lower surface of the upper wall 30), and the rear side pressing portion 134 contacts an upper surface of the corresponding movable housing compartment 86 (lower surface of the upper wall 62). Note that the rear side pressing portions 132, 134 (upright wall portion 108B) are disposed further rearward than the fin surfaces 46, 84, and are disposed toward the upper and rear sides of the blade rubber 14.

The plural front side projections 122 formed to each of the yoke levers 96 project toward the reinforced portions 36B provided to the front wall 32 of the main lever 22 and toward the reinforced portions 68B provided to the front wall 64 of the corresponding movable cover 60, such that the plural front side projections 122 contact or oppose the reinforced portions 36B, 68B from close proximity. The plural inner side projections 126 formed to each of the yoke levers 96 project toward the rear-inner wall 42 of the main lever 22 and toward the rear-inner wall 74 of the movable cover 60, such that the inner side projections 126 contact or oppose the rear-inner walls 42, 74 from close proximity. The plural rear side projections 124 formed to each of the yoke levers 96 project toward the rear wall 40 of the main lever 22 and toward the rear wall 72 of the movable cover 60, such that the plural rear side projections 124 contact or oppose the rear walls 40, 72 from close proximity. Note that in the present exemplary embodiment, the plural rear side projections 124 contact or oppose the rear walls 40, 72 from close proximity from an upper portion to a lower portion of the respective rear walls 40, 72. However, there is no limitation thereto, and it is sufficient that the plural rear side projections 124 contact or oppose the rear walls 40, 72 from close proximity at least on an upper side thereof.

Of the pair of engaging protrusions 128, 130 formed to each of the yoke levers 96, the engaging protrusion 128 is disposed inside the notch 58 (see FIG. 23) formed in the rear-inner wall 42 of the main lever 22, and the engaging protrusion 130 is disposed inside the notch 94 (see FIG. 24) formed in the rear-inner wall 74 of the corresponding movable cover 60. The engaging protrusions 128, 130 and the notches 58, 94 configure a load transmission section (not allocated a reference numeral). The load transmission section is configured such that engagement between the engaging protrusion 128 and an edge of the notch 58 and engagement between the engaging protrusion 130 and an edge of the notch 94 bears load acting in the respective length directions between the yoke lever 96 and the main lever 22 and between the yoke lever 96 and the movable cover 60.

Moreover, in the present exemplary embodiment, the first opening 48A in each of the main housing compartments 48 and the second opening 86A in each of the movable housing compartments 86 are closed off by the plate-shaped portion 108A of the corresponding yoke lever 96. Moreover, each of the main housing compartments 48 is blocked off in the length direction at the length direction center side of the main lever 22 by the corresponding center side blocking wall 50 and each of the movable housing compartments 86 is blocked off in the length direction on the opposite side to the main lever 22 by the corresponding outside blocking wall 73.

Figure 18:
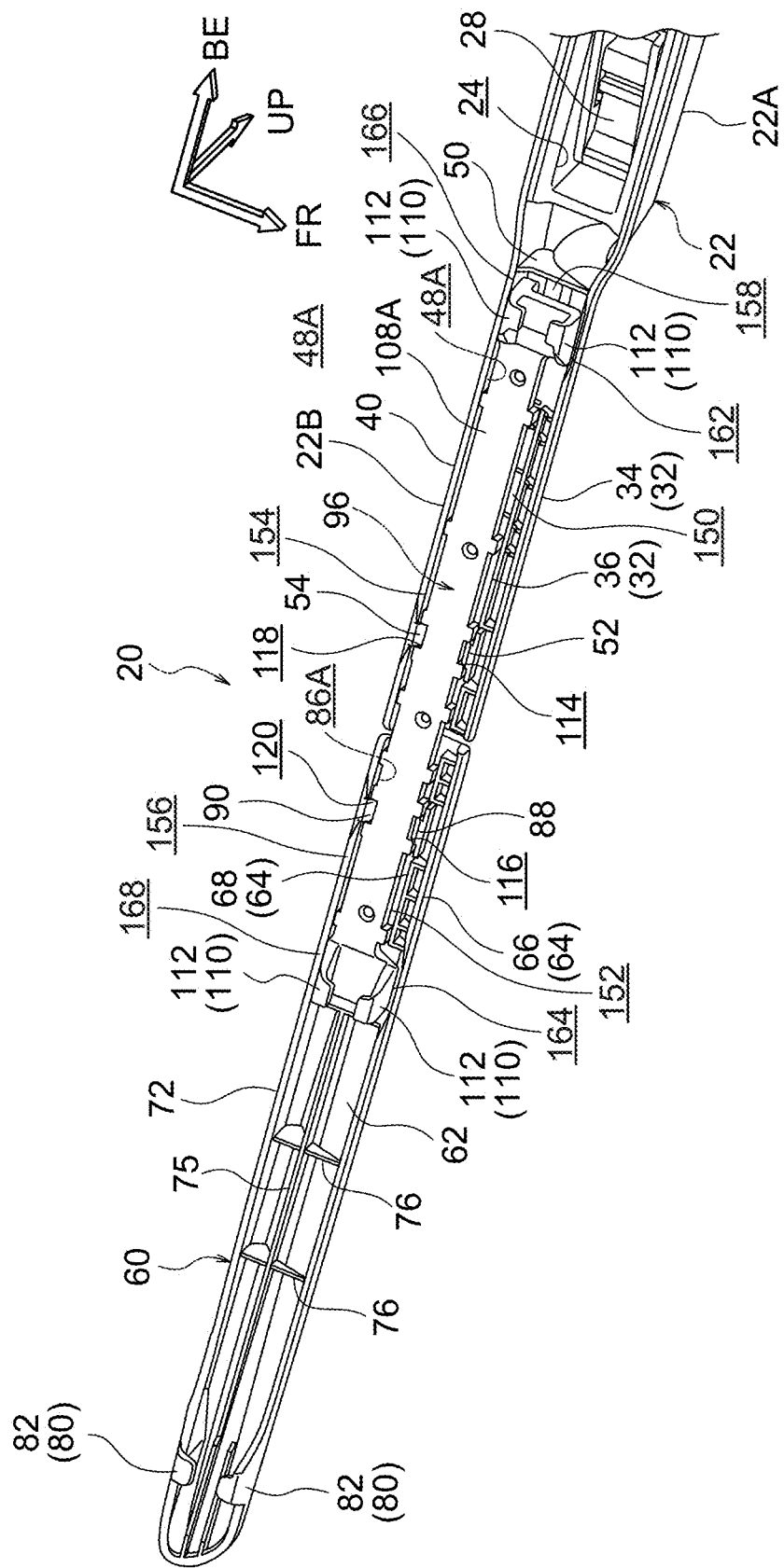
FIG. 18 is a perspective view illustrating a leading end side portion of a wiper lever assembly according to the first exemplary embodiment of the present disclosure, as viewed from a lower side.
Figure 19:
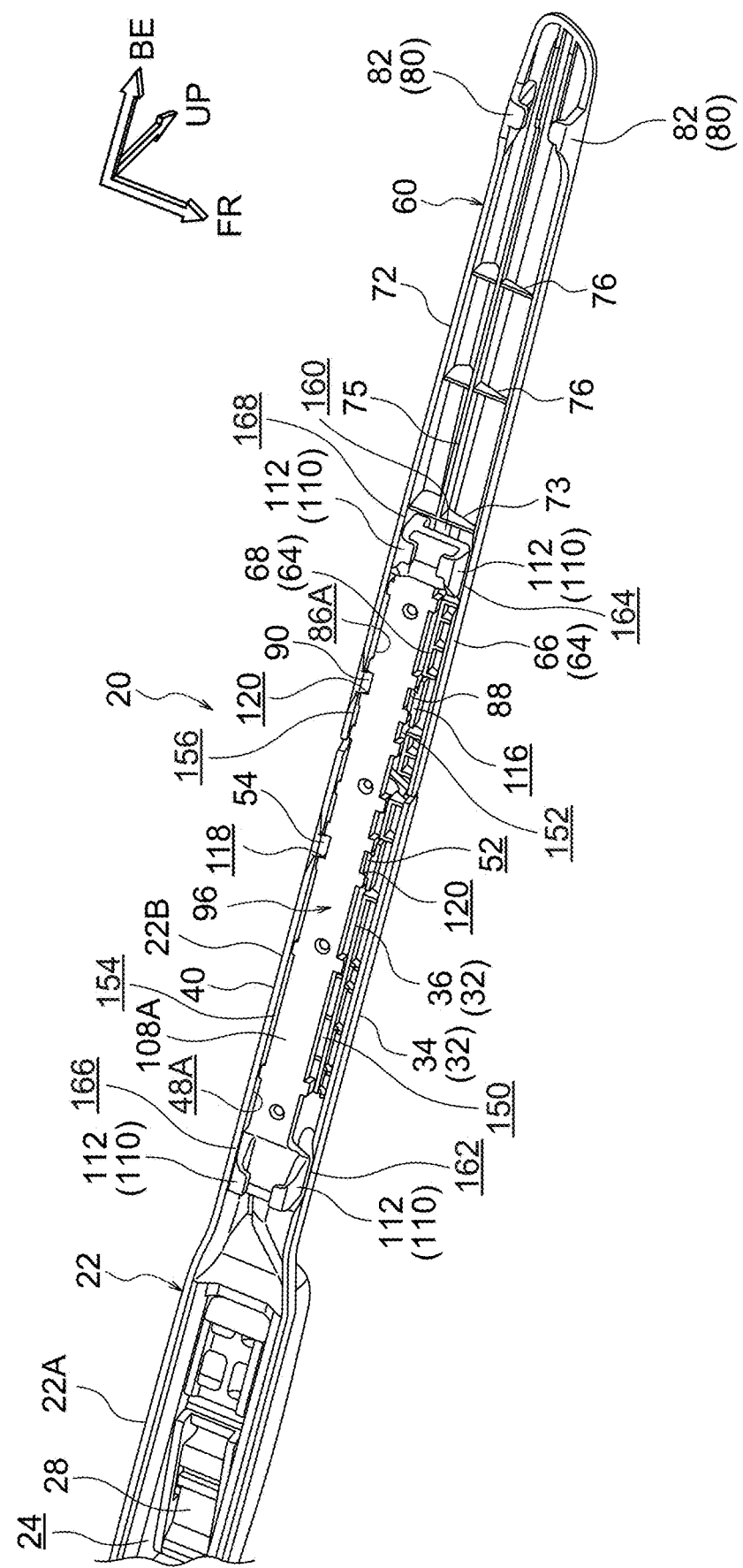
FIG. 19 is a perspective view illustrating a base end side portion of the wiper lever assembly as viewed from the lower side.

Note that narrow gaps are formed between respective edge portions of the first opening 48A and the second opening 86A and the corresponding yoke lever 96, so as to permit smooth pivoting of the yoke lever 96 with respect to the main lever 22 and to the corresponding movable cover 60. Specifically, as illustrated in FIG. 18 and FIG. 19, between each of the yoke levers 96 and the front-inner walls 36, 68 that form front edge portions of the corresponding first opening 48A and second opening 86A, narrow gaps 150, 152 with front-rear direction dimensions equivalent to those of the plural front side projections 122 are secured at sites where the front side projections 122 are not present. This permits smooth pivoting, as mentioned above. Furthermore, between each of the yoke levers 96 and the rear walls 40, 72 that form rear edge portions of the corresponding first opening 48A and second opening 86A, narrow gaps 154, 156 with front-rear direction dimensions equivalent to those of the rear side projections 124 are formed at sites where the plural rear side projections 124 are not present. Narrow gaps 158, 160 are also formed between each of the yoke levers 96 and the corresponding center side blocking wall 50 and between each of the yoke levers 96 and the corresponding outside blocking wall 73. Further narrow gaps 162, 164, 166, and 168 are also formed between the respective grip portions 110 of the yoke lever 96 and the front walls 32, 64, and the rear walls 40, 72. Sites other than these respective gaps in the first opening 48A and the second opening 86A are blocked by the corresponding yoke lever 96.

In the present exemplary embodiment, each of the movable covers 60 is open toward the lower side at a location on the opposite side of the movable housing compartment 86 to the main lever 22 (specifically, a location further toward the length direction end side than the movable housing compartment 86), and this location is provided with the plural partitioning walls 76 that partition this location in the length direction of the movable cover 60.

Figure 12:
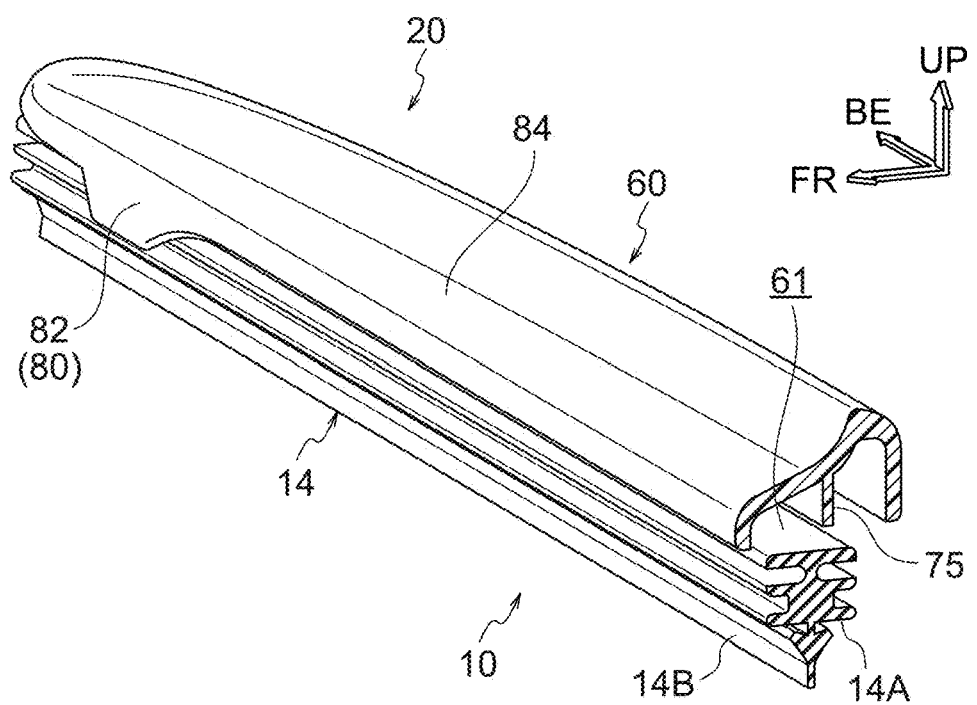
FIG. 12 is a perspective view illustrating part of the wiper blade, illustrating a cross-section sectioned along line F12-F12 in FIG. 3.
Figure 17:
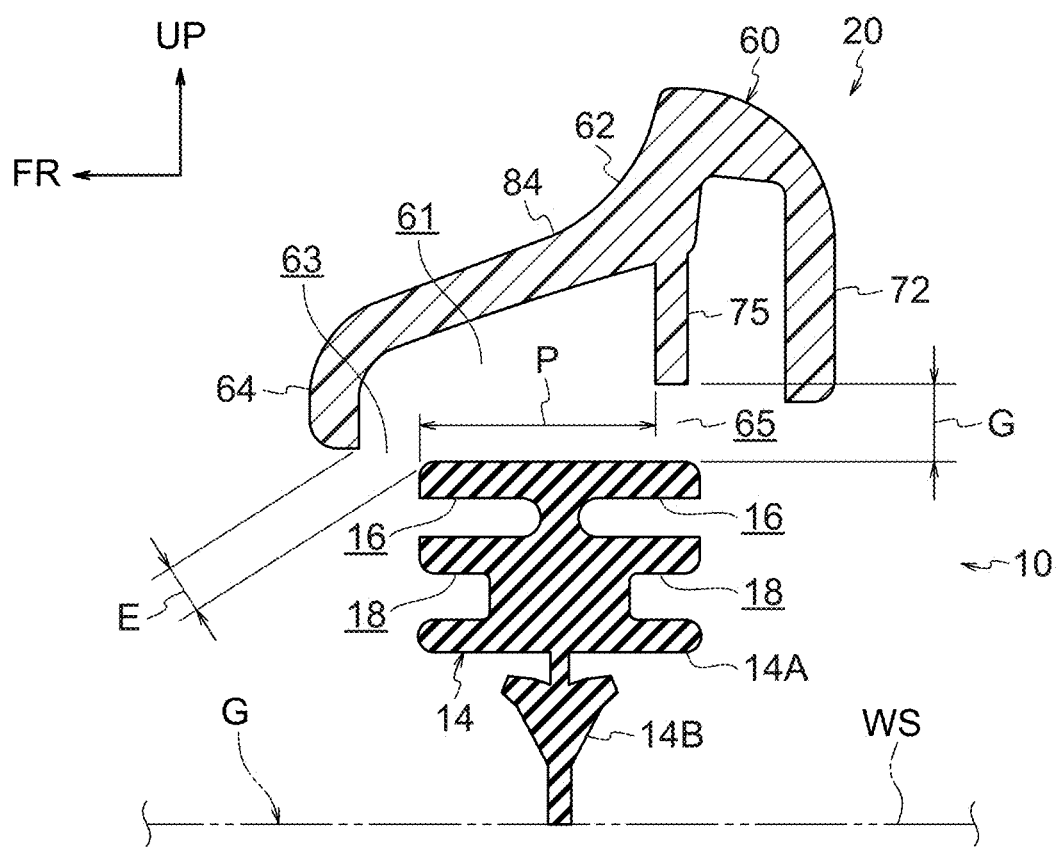
FIG. 17 is a cross-section illustrating the cross-section plane in FIG. 12 as viewed along a wiper blade length direction.

As illustrated in FIG. 12 and FIG. 17, further to the length direction outside of the wiper blade 10 than the yoke lever 96, a space 61 extending along the length direction of the wiper blade 10 is formed between the lower surface of the upwardly recessed movable cover 60 and the blade rubber 14. Wind induced by vehicle travel enters the space 61 that configures an internal space of the wiper lever assembly 20 through a gap 63 between the front wall 64 of the movable cover 60 and the blade rubber 14 (see FIG. 17; referred to hereafter as the front side opening 63). The travel-induced wind that has entered the space 61 then flows out toward the width direction rear side of the wiper blade 10 through a gap (not allocated a reference numeral) between the rear wall 72 of the movable cover 60 and the blade rubber 14.

However, in the present exemplary embodiment, each of the lengthwise ribs 75 is formed projecting from the lower surface of the movable cover 60 further to the length direction outside of the wiper blade 10 than the corresponding yoke lever 96. The lengthwise rib 75 projects downward from the lower surface of the movable cover 60, so as to be disposed inside the space 61. The lengthwise rib 75 is disposed above a width direction rear end portion of the blade rubber 14, and extends along the length direction of the movable cover 60. The lengthwise rib 75 corresponds to an obstruction portion, and is configured to obstruct the travel-induced wind flowing into the space 61 inside the space 61.

Note that the term "obstruct" does not necessarily require completely blocking outflow of the travel-induced wind from the space 61, and may simply limit (suppress) such outflow. In FIG. 17, the front-rear direction distance of the lengthwise rib 75 from a front end surface of the blade rubber 14 is labeled P (referred to hereafter as the lengthwise rib position P), a width of a gap 65 between the lengthwise rib 75 and the blade rubber 14 is labeled G (referred to hereafter as the rib-rubber gap G), and a width of the front side opening 63 is labeled E (referred to hereafter as the opening width E). In the wiper blade 10 according to the present exemplary embodiment, adjusting the lengthwise rib position P, the rib-rubber G, gap and the opening width E enables the pressure in the internal space (space 61) in each of the movable covers 60 during high-speed vehicle travel to be regulated.

Operation and Advantageous Effects

Next, explanation follows regarding operation and advantageous effects of the present exemplary embodiment.

In the wiper blade 10 configured as described above, the blade rubber 14 is gripped by the wiper lever assembly 20 that has a tournament structure. In the wiper lever assembly 20, the leading end portion of the wiper arm 12 is coupled to the length direction central portion of the main lever 22, and the pair of movable covers 60 are disposed contiguously to the two length direction sides of the main lever 22. The upper surfaces on the two length direction sides of the main lever 22 and the upper surfaces of the respective movable covers 60, are formed with the fin surfaces 46, 84, each of which has a downward gradient on progression toward the width direction front side (vehicle front side). The two length direction sides of the main lever 22 are formed with the main housing compartments 48 that are open toward the wiping surface WS side and each have a greater height dimension at the width direction front rear side than at the width direction front side. The movable covers 60 are formed with the respective movable housing compartments 86 that are open toward the wiping surface WS side and each have a greater height dimension at the width direction rear side than at the width direction front side.

The pair of yoke levers 96 are housed spanning inside the main housing compartments 48 and inside the movable housing compartments 86, and are coupled to the main lever 22 and to the respective movable covers 60 so as to be capable of pivoting about respective axes extending along the width direction. The blade rubber 14 is gripped by the grip portions 80 provided on the opposite side of the respective movable covers 60 to the main lever 22, and by the grip portions 110 provided to the two length direction end portions of the respective yoke levers 96. A pressing force applied to the main lever 22 from the wiper arm 12 is thus distributed and dispersed along the length direction of the blade rubber 14 by the yoke levers 96 and the backing pieces configured by metal plate springs, thereby attaining a uniform distribution of pressure against the wiping surface WS and good wiping performance.

Moreover, the yoke levers 96 housed spanning inside the main housing compartments 48 and inside the movable housing compartments 86 each have a greater height dimension at the width direction rear side than at the width direction front side. The greater dimension secures the strength of the yoke levers 96, while enabling the yoke levers 96 to be housed compactly inside the main housing compartments 48 and inside the movable housing compartments 86. Moreover, as described above, the respective upper surfaces of the main lever 22 and the movable covers 60 are formed with the fin surfaces 46, 84 each having a downward gradient on progression toward the width direction front side (vehicle front side). Due to the main lever 22 and the movable covers 60 each having a greater height dimension at the width direction rear side than at the width direction front side, an increase in the height dimension can be suppressed despite forming the main housing compartments 48 and the movable housing compartments 86, each of which is formed with a greater height dimension at the width direction rear side than at the width direction front side. Accordingly, the projection height of the wiper blade 10 (wiper lever assembly 20) from the wiping surface WS can be kept low, even though the yoke levers 96 are housed in the main housing compartment 48 and the movable housing compartment 86. This thereby enables drag to be reduced and aerodynamic characteristics to be improved.

The fin surfaces 84 of the movable covers 60 are subject to the travel-induced wind such that pressing force arises in the movable covers 60 themselves, and this pressing force is imparted to the blade rubber 14, and in particular to leading end portions of the blade rubber 14 that are retained by the grip portions 80 of the movable covers 60. These leading end portions that wipe a portion of the wiping surface WS with a high degree of curvature during high-speed travel can accordingly be biased by the pressing force, while still maintaining a low projection height from the wiping surface WS.

Moreover, in the wiper lever assembly 20, the main lever 22 and the movable covers 60 are each made from resin, while each of the yoke levers 96 includes the metal portion 98 that is made from metal and the yoke lever body 108 that is made from resin. This enables the height dimensions (up-down direction dimensions) of the respective yoke levers 96 to be reduced (kept low), while securing the strength of the respective yoke levers 96 in comparison to cases in which the yoke levers 96 are configured solely from resin. The respective height dimensions H1, H2 (see FIG. 14 and FIG. 16; illustrated without reference numerals in FIG. 13 and FIG. 15) of the main housing compartments 48 and the movable housing compartments 86 that house the yoke levers 96 can be kept low as a result, thereby enabling the height dimensions of the main lever 22 and the movable covers 60 in which the main housing compartments 48 and the movable housing compartments 86 are formed to be kept low. The wiper lever assembly 20 is thus capable of keeping the height from the wiping surface WS low, and also capable of reducing drag and improving aerodynamic characteristics.

In the present exemplary embodiment, the upper surfaces on the two length direction sides of the main lever 22 and the upper surfaces of the respective movable covers 60 are formed with the respective fin surfaces 46, 84 each having a downward gradient on progression toward the width direction front side. Accordingly, the main housing compartments 48 and the movable housing compartments 86 formed at the two length direction sides of the main lever 22 and at the movable covers 60 respectively so as to open toward the wiping surface WS each have a lower height dimension at the width direction front side than at the width direction rear side.

Regarding this point, in the present exemplary embodiment, each of the yoke levers 96 that are housed spanning inside the main housing compartment 48 and inside the movable housing compartment 86 is configured including the metal portion 98 and the yoke lever body 108 (referred to hereafter as the resin portion 108). The metal portion 98 and the resin portion 108 respectively include the plate-shaped portions 98A, 108A that have plate shapes with their plate thickness directions running in the up-down direction, and the upright wall portions 98B, 108B that project upward from width direction rear end sides of the plate-shaped portions 98A, 108A. The yoke levers 96 configured in this manner each have a lower height dimension at the width direction front side than at the width direction rear side, thus enabling the yoke levers 96 to be compactly housed inside the main housing compartment 48 and inside the movable housing compartment 86 that also have a lower height dimension at the width direction front side than at the width direction rear side as described previously, while the upright wall portions 98B, 108B of the metal portion 98 and the resin portion 108 enable the strength of the yoke levers 96 to be secured.

In other words, the main lever 22 and the movable covers 60 that have upper surfaces formed with the fin surfaces 46, 84 each having a downward gradient on progression toward the width direction front side as described previously each have a greater height dimension at the width direction rear side than at the width direction front side, thus enabling the main housing compartments 48 and the movable housing compartments 86 to be formed such that the respective height dimensions H1, H2 are greater at the width direction rear side than at the width direction front side. Moreover, the main housing compartments 48 and the movable housing compartments 86 are formed in internal spaces of the wiper lever assembly 20, and the yoke levers 96 that include the plate-shaped portions 98A, 108A and the upright wall portions 98B, 108B are housed spanning the insides of the respective housing compartments 48, 86. An increase in the height dimension can accordingly be suppressed. This enables the height of the wiper blade 10 (wiper lever assembly 20) from the wiping surface WS to be kept low, thus preventing obstruction of the field of view whilst driving, while also reducing drag and improving aerodynamic characteristics.

Supplementary explanation follows regarding the aerodynamic characteristics referred to above. In order to improve the aerodynamic characteristics of the wiper blade 10 (wiper lever assembly 20), in addition to setting the main lever 22 and the movable covers 60 with small height dimensions, the fin surfaces 46, 84 of the main lever 22 and the movable covers 60 are preferably also gently inclined or curved (to configure a gentle gradient) on progression from the upwind side to the downwind side of the travel-induced wind. In order to achieve this, it is necessary to set the height dimensions of the arm portions 22B of the main lever 22 and the movable covers 60 so as to become lower on progression toward the width direction front side. Regarding this point, in the present exemplary embodiment, each of the yoke levers 96 has a greater height dimension at the width direction rear side than at the width direction front side, and the height dimension is set lower at the width direction front side, thereby increasing the degrees of freedom for setting the shapes of the respective arm portions 22B and the movable covers 60. This makes it easier to set the fin surfaces 46, 84 with desirable profiles. Moreover, in the main lever 22 and the movable covers 60 of the present exemplary embodiment, the front-outer walls 34, 66 extending forward and downward from the front end portions of the upper walls 30, 62 enable the fin surfaces 46, 84 to be extended forward, thus enabling the fin surfaces 46, 84 to be set with gentler gradients at the front side. This enables a marked improvement in aerodynamic characteristics (in particular the suppression of lift) as a result.

Each of the yoke levers 96 is formed with an L-shaped profile as viewed along the length direction, with an incremental (stepped) increase in the height dimension at the rear side in comparison to the front side. This enables the yoke levers 96 to be housed compactly inside the main housing compartments 48 and inside the movable housing compartments 86 while also efficiently securing the strength of the yoke levers 96. This thereby enables the projection height of the wiper lever assembly 20 from the wiping surface WS to be kept low, thus reducing drag and further improving the aerodynamic characteristics.

Moreover, each of the yoke levers 96 of the present exemplary embodiment is provided with the resin portion 108 at the outside of the metal portion 98. The resin portion 108 enables the degrees of freedom for setting the shape to be improved while the metal portion 98 secures the strength of the yoke lever 96. Namely, the resin portion 108 enables the complex shape including the pair of grip portions 110, the plural front side projections 122, the plural inner side projections 126, and the plural rear side projections 124 to be molded with ease.

In each of the yoke levers 96, the metal portion 98 that is made from metal is embedded in the yoke lever body 108 that is made from resin, thereby rendering an anti-rust and anti-dazzle coating (typically black paint) unnecessary since exposed portions of the metal portion 98 are reduced. This contributes to a reduction in manufacturing costs.

Moreover, in each of the yoke levers 96, the metal portion 98 made from metal is embedded in the yoke lever body 108 made from resin, enabling the twin benefits of securing the strength and reducing the size of the yoke levers to be attained more easily than in cases in which the yoke levers 96 are configured solely from resin portions.

In the present exemplary embodiment, the protrusions 52, 54, 88, 90 respectively formed to both the width direction front and rear surfaces of each of the main housing compartments 48 and movable housing compartments 86 (namely, the front-inner walls 36, 68 and the rear walls 40, 72) are respectively fitted into the four recesses 114, 118, 116, 120 formed on the two width direction surfaces of the resin portion 108 of each of the yoke levers 96 in order to couple the yoke lever 96 so as to be capable of pivoting to the main lever 22 and to the corresponding movable cover 60. This simplifies the configuration and assembly of pivotally coupled portions between the yoke lever 96 and the main lever 22 and between the yoke lever 96 and the corresponding movable cover 60, in comparison to cases in which the yoke lever 96 is coupled so as to be capable of pivoting to the main lever 22 and to the movable cover 60 using metal shaft members.

Moreover, in the present exemplary embodiment, the four recesses 114, 116, 118, 120 formed in both the front and rear width direction surfaces of each of the yoke levers 96 are open toward the front-rear direction outside and the lower side, and are each formed with a substantially semicircular profile as viewed along the front-rear direction. This enables the height dimension of the yoke levers 96 to be set smaller than in cases in which the respective recesses 114, 116, 118, 120 are formed with circular profiles as viewed along the front-rear direction. This thereby enables the projection height of the wiper lever assembly 20 from the wiping surface WS to be kept even lower as a result.

Moreover, in the present exemplary embodiment, each of the yoke levers 96 is coupled so as to be capable of pivoting to the main lever 22 and to the corresponding movable cover 60 at the plate-shaped portion 108A on the lower side, this being broader in the front-rear direction than the upright wall portion 108B on the upper side. This enables the respective pivotally coupled portions where the yoke levers 96 are coupled so as to be capable of pivoting to the main lever 22 and to the movable covers 60 to be set with a greater axial length in the width direction, thereby enabling the orientation of the yoke levers 96 (namely, the orientation as viewed along the length direction, namely tilting orientation) to be suppressed from changing with respect to the main lever 22 and the movable covers 60.

Specifically, in the present exemplary embodiment, the four recesses (114, 116, 118, 120) formed in the resin portion 108 of each of the yoke levers 96 and configuring movable coupling portions between the yoke lever 96 and the main lever 22 and between the yoke lever 96 and the corresponding movable cover 60 are formed in the two width direction surfaces of the plate-shaped portion 108A of the resin portion 108. The plate-shaped portion 108A is set with a greater dimension in the width direction than the upright wall portion 108B. Accordingly, forming the four recesses 114, 116, 118, 120 in the two width direction surfaces of the plate-shaped portion 108A as described above enable the respective pivotally coupled portions of the yoke levers 96 with the main lever 22 and with the movable covers 60 to be set with a greater axial length in the width direction, thereby enabling the orientation of the yoke levers 96 (tilting orientation) to be suppressed from changing with respect to the main lever 22 and to the movable covers 60.

Moreover, in the present exemplary embodiment, the metal portion 98 of each of the yoke levers 96 includes the through holes 100, 102 formed at positions opposing the recesses 118, 120 in the width direction. This secures the thickness of the resin portion 108 at the periphery of the recesses 118, 120 such that the recess depth and radial dimension are not limited by the upright wall portion 98B of the metal portion 98, and enables the width direction dimension and the up-down direction dimension of the resin portion 108 to be reduced.

Moreover, in the present exemplary embodiment, the upright wall portion 108B is formed projecting upward at the rear side of each of the yoke levers 96. The main lever 22 and each of the movable covers 60 include the pairs of opposing walls (the rear wall 40 and the rear-inner wall 42, and the rear wall 72 and the rear-inner wall 74) opposing each other at the front and rear of the upright wall portion 108B. The pairs of opposing walls and the upright wall portion 108B accordingly engage with each other, thereby enabling rattling of the yoke levers 96 against the main lever 22 and against the movable covers 60 to be suppressed.

Moreover, in the present exemplary embodiment, the pair of rear side pressing portions 132, 134 are provided to the upper surface of the upright wall portion 108B provided at the rear side of each of the yoke levers 96 so as to contact an upper surface at the rear side of the corresponding main housing compartment 48 and an upper surface at the rear side of the corresponding movable housing compartment 86. Pressing force from the wiper arm 12, reaction force from the wiping surface WS, pressing force from converted travel-induced wind, and the like are transmitted through the pair of rear side pressing portions 132, 134 to between the yoke lever 96 and the main lever 22 and between the yoke lever 96 and the movable cover 60, thereby preventing or suppressing these forces from being applied to the respective pivotally coupled portions between the yoke levers 96 and the main lever 22. This enables the coupling strength of these pivotally coupled portions to be set lower (for example enabling the recesses 114, 118 in the yoke lever 96 to each be set with a semicircular profile or a substantially semicircular profile as viewed along the front-rear direction), thereby enabling the yoke lever 96 to be reduced in size in the height direction and thus also enabling the projection height of the wiper lever assembly 20 (wiper blade 10) from the wiping surface WS to be kept even lower. Moreover, due to disposing the rear side pressing portions 132, 134 (upright wall portion 108B) further rearward than the fin surfaces 46, 84, the rear side pressing portions 132, 134 can be prevented or suppressed from imparting constraints to the shape of the fin surfaces 46, 84. The degrees of freedom for setting the shape of the fin surfaces 46, 84 is therefore improved. Furthermore, the metal portion 98 of each of the yoke levers 96 includes the pair of projections 104, 106 embedded in the pair of rear side pressing portions 132, 134. This makes it easier to secure the strength of the pair of rear side pressing portions 134, 132.

Moreover, in the present exemplary embodiment, the main lever 22 and the movable covers 60 respectively include the front walls 32, 64 that respectively form front surfaces of the main housing compartments 48 and the movable housing compartments 86. The front walls 32, 64 respectively include the flexible portions 36A, 68A formed with the protrusions 52, 88, and the reinforced portions 36B, 68B that are more reinforced than the flexible portions 36A, 68A. Accordingly, when the protrusions 52, 54, 88, 90 respectively formed on both width direction front and rear surfaces of the main housing compartments 48 and the movable housing compartments 86 are being fitted into the respective recesses 114, 116, 118, 120 formed on both width direction front and rear surfaces of the yoke levers 96, the flexible portions 36A, 68A flex, enabling the protrusions 52, 88 formed to the flexible portions 36A, 68A to be easily fitted into the recesses 114, 116 in the yoke levers 96.

Moreover, when load in the width direction front or rear direction (wiping direction) acts between the yoke levers 96 and the main lever 22 and between the yoke levers 96 and the movable covers 60, the plural front side projections 122 that project out from the yoke levers 96 so as to be capable of abutting the corresponding reinforced portions 36B, 68B abut the reinforced portions 36B, 68B provided to the front walls 32, 64 of the main lever 22 and the movable covers 60. This enables such load to be prevented or suppressed from being imparted to the flexible portions 36A, 68A, thus enabling the protrusions 52, 88 formed to the flexible portions 36A, 68A to be prevented from unintentionally coming out from the recesses 114, 116 in the yoke levers 96.

Moreover, in the present exemplary embodiment, the reinforced portions 36B, 68B provided to the front-inner walls 36, 68 of the main lever 22 and the movable covers 60 are connected in the front-rear direction to the respective front-outer walls 34, 66 by the reinforcing ribs 38, 70. This enables the respective reinforced portions 36B, 68B to be reinforced with a simple configuration.

In the present exemplary embodiment, the main lever 22 and the movable covers 60 respectively include the rear walls 40, 72 respectively forming the rear surfaces of the main housing compartments 48 and the movable housing compartments 86, and the upper walls 30, 62 with rear end portions from which the rear walls 40, 72 extend downward. The protrusions 54, 90 are formed to the lower end portions of the respective rear walls 40, 72. Accordingly, when the protrusions 52, 54, 88, 90 formed to both width direction front and rear surfaces of the main housing compartments 48 and the movable housing compartments 86 are being fitted into the four recesses 114, 116, 118, 120 formed in both width direction front and rear surfaces of the yoke levers 96, the rear walls 40, 72 flex, enabling the protrusions 54, 90 formed at the lower end portions of the respective rear walls 40, 72 to be easily fitted into the recesses 114, 116 in the yoke levers 96.

Moreover, when load toward the width direction front or rear direction acts between the yoke levers 96 and the main lever 22 and between the yoke levers 96 and the movable covers 60, the plural rear side projections 124 that project out from the yoke levers 96 abut upper side portions of the rear walls 40, 72 (namely, locations that flex less readily toward the front and rear than lower side portions of the rear walls 40, 72). Accordingly, the distance from the flexing point is shorter, enabling flexing of the rear walls 40, 72 to be suppressed. This enables the protrusions 54, 90 formed to the rear walls 40, 72 to be prevented from unintentionally coming out from the recesses 114, 116 in the yoke levers 96.

Moreover, in the present exemplary embodiment, the respective front-outer walls 34, 66 of the main lever 22 and the movable covers 60 are each curved so as to form a protrusion toward the front and upper sides. A flow of air that interacts with the front-outer walls 34, 66 from the one width direction side thus flows more smoothly toward the upper surface side of the upper walls 30, 62. Moreover, the front-outer walls 34, 66 extend further downward than the front-inner walls 36, 68. The front-outer walls 34, 66 are thus reinforced by the front-inner walls 36, 68, while also being capable of preventing ingress of snow or the like into internal spaces of the wiper lever assembly 20 (the spaces 61, the main housing compartments 48, and the movable housing compartments 86) when such snow or the like that has accumulated in the vicinity of the lower return position on the wiping surface WS makes impact with the wiper lever assembly 20.

Moreover, in the present exemplary embodiment, the plural front side projections 122, the plural rear side projections 124, and the plural inner side projections 126 respectively projecting from the yoke levers 96 make point contact with the front-inner walls 36, 68, the rear walls 40, 72, and the rear-inner walls 42, 74 of the main lever 22 and the movable covers 60. Dimensional control is thus easier to achieve than in configurations in which the yoke levers 96 make planar contact with these respective walls over a broad surface area.

The present exemplary embodiment includes the load transmission section configured by the notches 58, 94 respectively formed in the rear-inner walls 42, 74 of the main lever 22 and the movable covers 60 and the engaging protrusions 128, 130 provided to the yoke levers 96. In the load transmission section, load acting along the length direction between the yoke levers 96 and the main lever 22 and between the yoke levers 96 and the movable covers 60 is borne by the engagement between the edges of the notches 58, 94 and the engaging protrusions 128, 130. This enables such load to be prevented or suppressed from acting on the pivotally coupled portions between the yoke levers 96 and the main lever 22 and between the yoke levers 96 and the movable covers 60.

Moreover, in the wiper blade 10 (wiper lever assembly 20), the first openings 48A in the main housing compartments 48 and the second openings 86A in the movable housing compartments 86 are closed off (shut off) by the plate-shaped portions 108A of the respective yoke levers 96. A flow of air interacting with the wiper blade 10 can thus be actively suppressed from flowing into the main housing compartments 48 and the movable housing compartments 86. Turbulent airflow caused by such an inflow into the internal spaces of the wiper lever assembly can be prevented or suppressed as a result, thus enabling the aerodynamic characteristics to be improved.

The plate-shaped portion 108A of each of the yoke levers 96 is formed in a plate shape with a plate thickness direction running in the up-down direction. This enables the downward-opening first openings 48A and second openings 86A to be closed off efficiently.

Moreover, in the present exemplary embodiment, the upper surfaces on the two length direction sides of the main lever 22 and the upper surfaces of the respective movable covers 60 are respectively formed with the fin surfaces 46, 84 each having a downward gradient on progression toward the front side (one width direction side). The main housing compartments 48 and the movable housing compartments 86 formed to the two length direction sides of the main lever 22 and to the movable covers 60 accordingly each have a lower height dimension at the front side than at the rear side.

Regarding this point, in the present exemplary embodiment, the respective yoke levers 96 housed inside the main housing compartments 48 and inside the movable housing compartments 86 each include the plate-shaped portions 98A, 108A that are each plate-shaped with a plate thickness direction running in the up-down direction, and the upright wall portions 98B, 108B projecting upward from the other width direction end sides of the plate-shaped portions 98A, 108A. The yoke levers 96 configured in this manner have a lower height dimension at the front side than at the rear side, thereby enabling the strength of the yoke levers 96 to be secured by the upright wall portions 98B, 108B while also enabling the yoke levers 96 to be compactly housed inside the main housing compartments 48 and inside the movable housing compartments 86. Moreover, as described above, the main lever 22 and the movable covers 60 with their upper surfaces formed with the fin surfaces 46, 84 each having a downward gradient on progression toward the one width direction side have a greater height dimension at the width direction rear side than at the width direction front side, thereby enabling an increase in the height dimension to be suppressed, despite forming the main housing compartments 48 and the movable housing compartments 86 that each have a greater height dimension at the width direction rear side than at the width direction front side. Accordingly, the projection height of the wiper blade 10 (wiper lever assembly 20) from the wiping surface WS can be kept low, enabling drag to be reduced and the aerodynamic characteristics to be improved.

Moreover, in the present exemplary embodiment, the main lever 22 includes the pair of center side blocking walls 50 that block off the respective main housing compartments 48 in the length direction at the length direction center side of the main lever 22, such that a flow of air toward the inside of the respective main housing compartments 48 from the length direction center side of the main lever 22 can be prevented or suppressed by the pair of center side blocking walls 50. This enables a phenomenon in which raindrops or the like flow in and collect before spurting out suddenly accompanying such a flow of air to be prevented or suppressed in the main housing compartments 48, and even in the movable housing compartments 86 in some cases.

In the present exemplary embodiment, each of the movable covers 60 includes the outside blocking wall 73 that blocks the corresponding movable housing compartment 86 in the length direction on the opposite side to the main lever 22. Accordingly, a flow of air attempting to flow from inside the movable housing compartment 86 toward a length direction end portion side can be prevented or suppressed by the outside blocking wall 73. Such a flow of air toward the length direction end portion inside the internal spaces of the wiper lever assembly is suppressed as a result, thereby enabling a flow of air passing through the wiper lever assembly from the width direction front side to the width direction rear side to be promoted.

Moreover, in the present exemplary embodiment, each of the movable covers 60 is open toward the lower side at a location on the opposite side of the movable housing compartment 86 to the main lever 22. This location is provided with the plural partitioning walls 76 that partition the movable cover 60 in the length direction. This enables a flow of air from the movable housing compartment 86 side of the movable cover 60 toward the opposite side to the main lever 22 to be prevented or suppressed by the plural partitioning walls 76. This enables the flow of air toward the length direction end portions inside the internal spaces of the wiper lever assembly, and in particular inside the movable covers 60, to be further prevented or suppressed.

In the wiper blade 10, the lengthwise ribs 75 project downward from the lower surfaces of the respective movable covers 60 that are recessed toward the upper side as viewed along the length direction of the blade rubber 14. Each of the lengthwise ribs 75 extends along the length direction of the blade rubber 14, and is disposed in the internal space (space 61) of the corresponding movable cover 60, configuring an internal space of the wiper lever assembly 20 between the movable cover 60 and the blade rubber 14. The lengthwise rib 75 obstructs travel-induced wind flowing into the space 61 inside the space 61. Accordingly, during high-speed vehicle travel, the internal pressure in the space 61 increases, and this increase in pressure is regulated by the obstruction portion so as to appropriately reduce the amount of lift generated in the blade rubber 14. The blade rubber 14 is suppressed from lifting up below the movable cover 60 as a result, thus improving the wiping performance.

Figure 30:
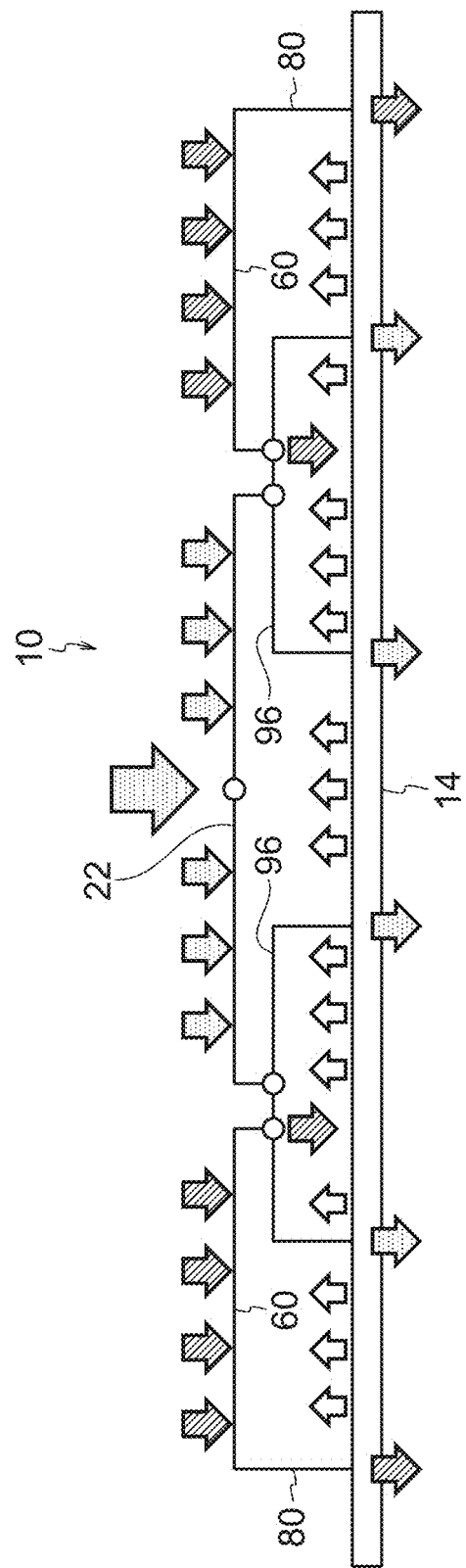
FIG. 30 is a schematic diagram to explain forces acting on a wiper blade according to the first exemplary embodiment of the present disclosure.

Supplementary explanation follows regarding the lift reduction effect described above, with reference to FIG. 30 to FIG. 32. During high-speed vehicle travel, force acts on the wiper blade 10 according to the present exemplary embodiment as is schematically illustrated in FIG. 30. In FIG. 30, the downward-pointing arrows indicate negative lift (a pressing force toward the wiping surface WS), and the upward-pointing arrows indicate positive lift (force in a direction up and away from the wiping surface).

The negative lift generated in the wiper arm 12 and the main lever 22 is distributed to the grip portions 110 (support points) of the yoke levers 96 that grip the blade rubber 14 (see the dotted arrows in FIG. 30). Regarding the negative lift generated in the movable covers 60, during high-speed vehicle travel or the like, the fin surfaces 84 of the movable covers 60 receive travel-induced wind such that a pressing force arises in the movable covers 60 themselves, and this pressing force acts on the grip portions 110 (support points) of the yoke levers 96 that grip the blade rubber 14 and the grip portions 80 (support points) of the movable covers 60 that grip the blade rubber 14 (see the hatched arrows in FIG. 30). On the other hand, the positive lift generated in the blade rubber 14 is generated over the entire length direction of the blade rubber 14 (see the clear arrows in FIG. 30).

Figure 31:
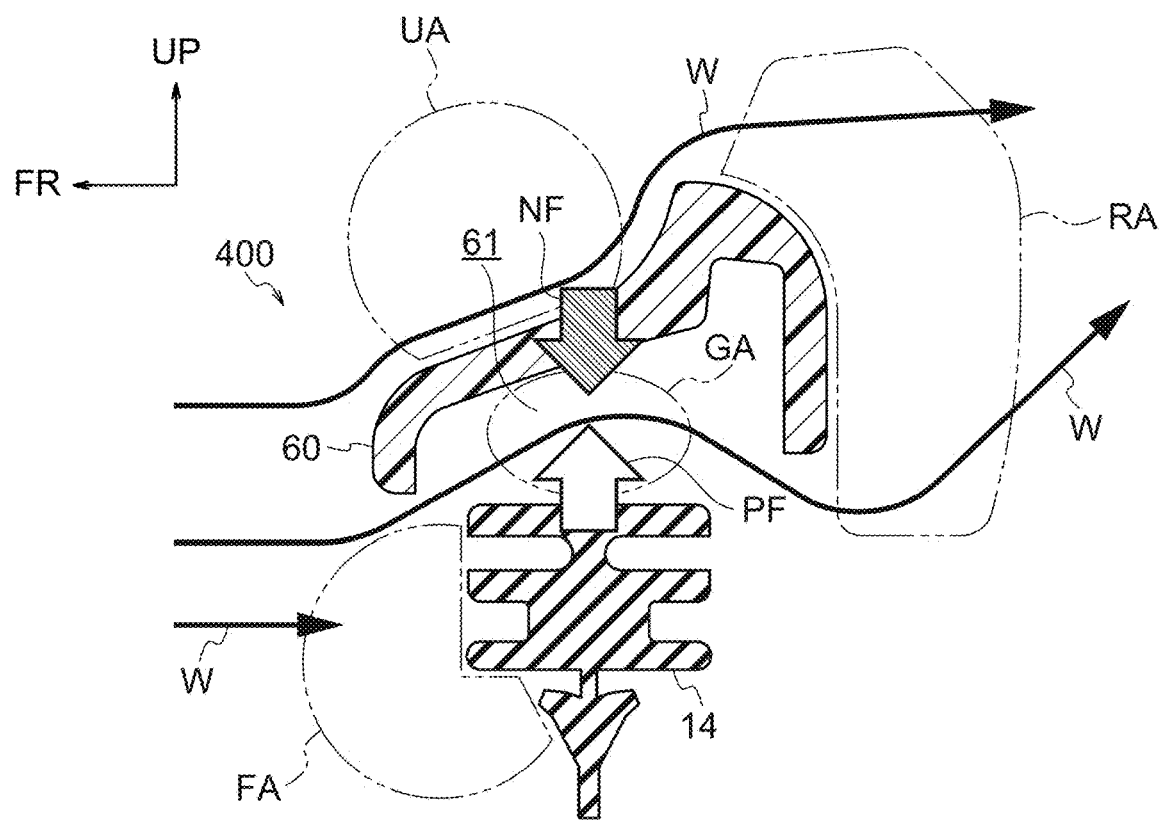
FIG. 31 is a cross-section corresponding to FIG. 17 to explain lift generated in a wiper blade according to a comparative example.

Accordingly, in a configuration in which the movable covers 60 are not provided with the lengthwise ribs 75, as illustrated in a comparative example 400 in FIG. 31, a travel-induced wind W passing through a gap between the wiper lever assembly 20 and the blade rubber 14 creates a relatively low pressure state in the internal spaces of the wiper lever assembly 20. In particular, lift may be generated in the blade rubber 14 between the grip portions 80 of the movable covers 60 and the yoke levers 96 (a length direction range in which the yoke levers 96 are not present in the internal spaces of the movable covers 60). More specifically, in the comparative example 400, the travel-induced wind W during high-speed travel creates higher pressure in a frontal area FA in front of the blade rubber 14 and in an upper area UA above the movable cover 60, while also creating relatively low pressure in a rear area RA to the rear of the wiper blade 10 and in an area GA inside the space 61. This generates negative lift on the movable covers 60 while generating positive lift on the blade rubber 14. This positive lift causes the blade rubber 14 to lift up.

Figure 32:
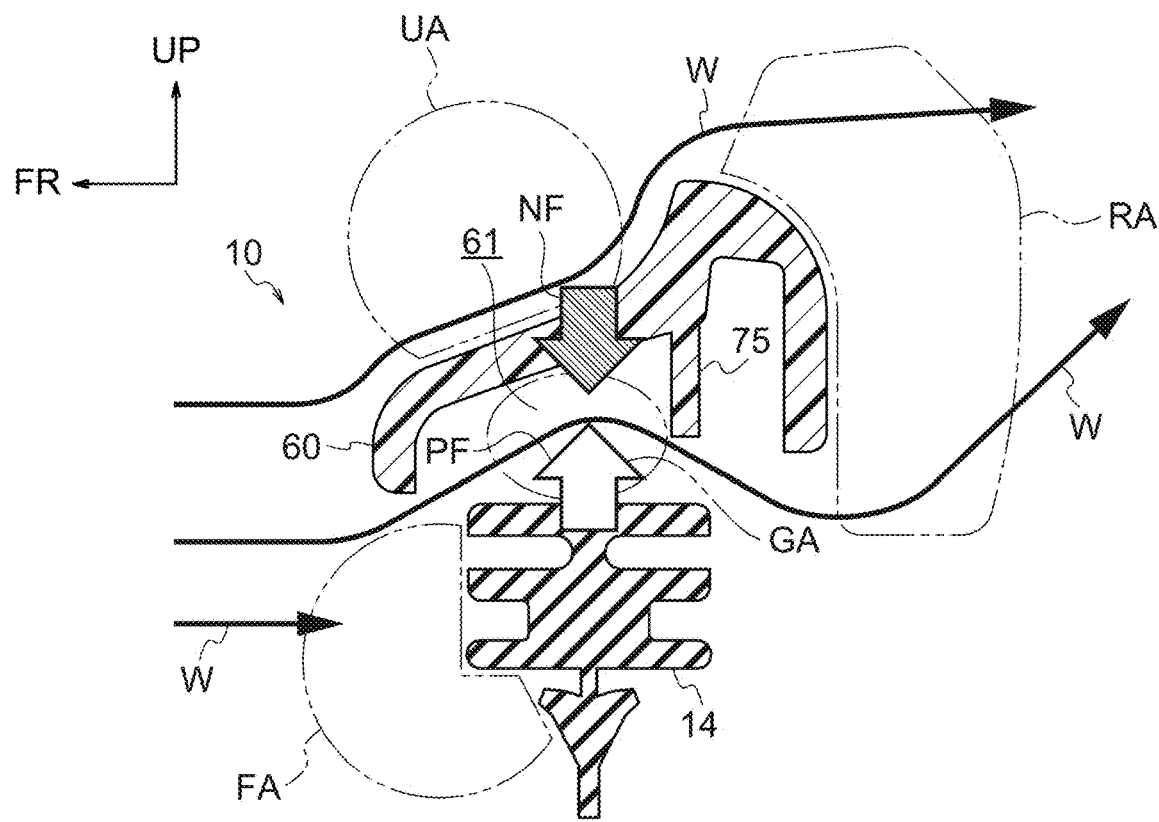
FIG. 32 is a cross-section corresponding to FIG. 17 to explain lift generated in a wiper blade according to the first exemplary embodiment of the present disclosure.

By contrast, in the present exemplary embodiment as illustrated in FIG. 32, due to providing the lengthwise ribs 75 continuously along the length direction in the internal spaces (spaces 61) of the movable covers 60, the travel-induced wind W is obstructed inside the spaces 61 in a manner adjusted and set in advance based on the anticipated travel-induced wind at a predetermined speed. So doing enables the pressure in the area GA inside the spaces 61 to be raised in an appropriate manner. The pressure in the area GA enables the lift generated in the blade rubber 14 to be reduced.

Moreover, in the present exemplary embodiment, the lengthwise ribs 75 projecting downward from the lower surfaces of the movable covers 60 that are recessed toward the upper side as viewed along the length direction of the blade rubber 14 are disposed above the width direction rear end portion of the blade rubber 14. Since the pressure of the travel-induced wind obstructed by the lengthwise ribs 75 is greater at the width direction front side of the lengthwise ribs 75, namely further toward the width direction front side than the width direction rear end portion of the blade rubber 14, this heightened pressure can be made to act on the upper surface of the blade rubber 14 over a wider range than in cases in which the lengthwise ribs 75 are disposed above a width direction front end portion of the blade rubber 14. The effect of reducing the lift generated in the blade rubber 14 is enhanced as a result.

Moreover, in the wiper blade 10, the front walls 32, 64 and the rear walls 40, 72 that oppose one another in the width direction, and the upper walls 30, 62 connecting the upper end portions of the front walls 32, 64 and the rear walls 40, 72 together in the width direction are provided to the two length direction end sides of the main lever 22 and to the movable covers 60 respectively. The front walls 32, 64 respectively include the front-inner walls 36, 68 and the front-outer walls 34, 66 disposed at the front side of the front-inner walls 36, 68. The respective yoke levers 96 are coupled so as to be capable of pivoting to the front-inner walls 36, 68 and to the rear walls 40, 72, and the first fin surfaces 46 and the second fin surfaces 84 are formed to the upper surfaces of the upper walls 30, 62 and to the front-outer walls 34, 66. Namely, the front walls 32, 64 are configured with a dual-layer structure by the front-inner walls 36, 68 that configure the pivotally coupled portions with the respective yoke levers 96, and the front-outer walls 34, 66 that form front portions of the respective fin surfaces 46, 84. The front-outer walls 34, 66 are disposed at the front side of the front-inner walls 36, 68, thus enabling the respective fin surfaces 46, 84, each having a downward gradient on progression toward the front side, to be enlarged (extended) toward the one width direction side. Thus, the respective fin surfaces 46, 84 can each be set with a gentle gradient on the one width direction side, thus enabling the aerodynamic characteristics to be improved.

Aerodynamic Analysis

Next, explanation follows regarding results of aerodynamic analysis performed for the wiper blade 10 according to the present exemplary embodiment, with reference to FIG. 33A to FIG. 38B. FIG. 33A to FIG. 33Q FIG. 34A to FIG. 34D, and FIG. 36A to FIG. 38B are diagrams illustrating aerodynamic analysis performed by a computer. Note that in FIG. 33A to FIG. 33Q reference numerals pertaining to the blade rubber 14 and the movable covers 60 are omitted. Aerodynamic analysis concerning the lift generated in the wiper blade 10 was performed while adjusting (modifying) the lengthwise rib position P, the gap width and the opening width E illustrated in FIG. 17 independently of each other. First, explanation follows regarding changes in the lift accompanying modifications to the lengthwise rib position P, with reference to FIG. 33A to FIG. 33H.

Figure 33A:
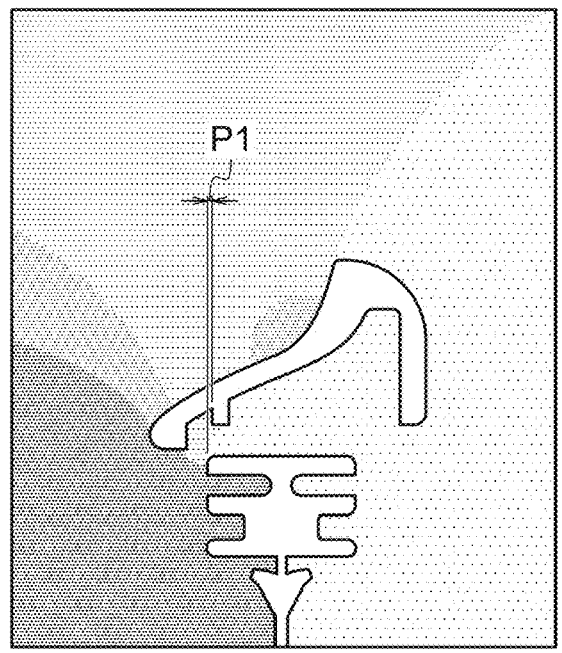
FIG. 33A is a diagram illustrating aerodynamic analysis for a wiper blade according to the first exemplary embodiment of the present disclosure, for a state in which a lengthwise rib of a movable cover is disposed above a front end portion of a blade rubber.
Figure 33B:
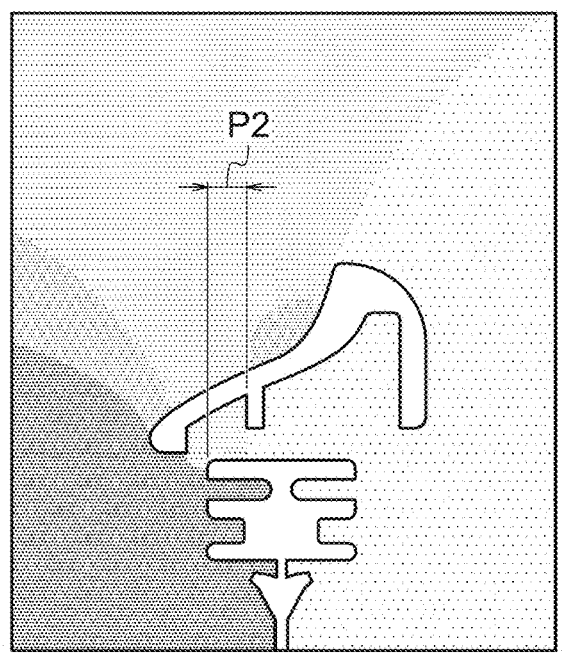
FIG. 33B is a diagram illustrating aerodynamic analysis for a wiper blade according to the first exemplary embodiment of the present disclosure, for a state in which a lengthwise rib of a movable cover is disposed further toward a rear side than the position illustrated in FIG. 33A.
Figure 33C:
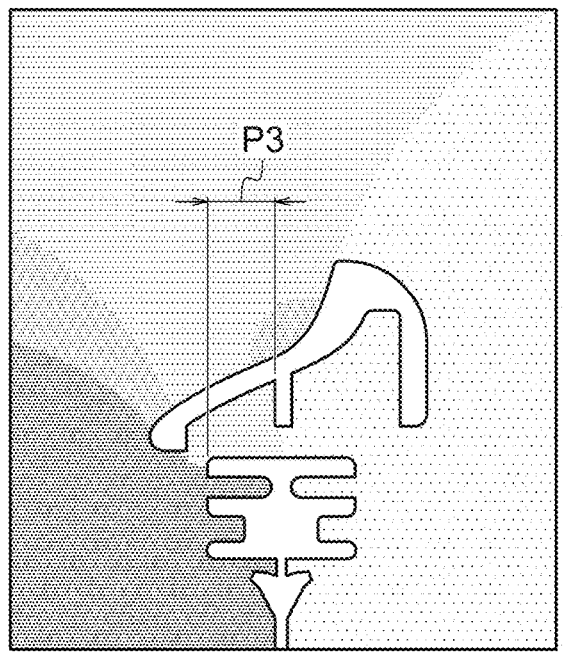
FIG. 33C is a diagram illustrating aerodynamic analysis for a wiper blade according to the first exemplary embodiment of the present disclosure, for a state in which a lengthwise rib of a movable cover is disposed further toward a rear side than the position illustrated in FIG. 33B.
Figure 33D:
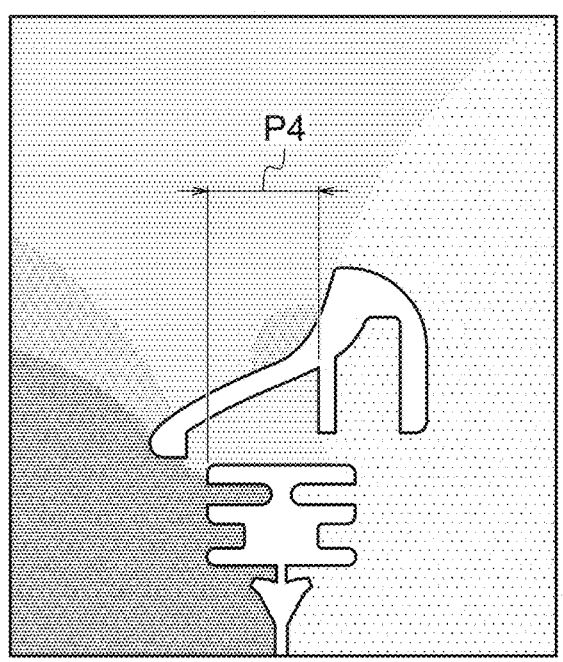
FIG. 33D is a diagram illustrating aerodynamic analysis for a wiper blade according to the first exemplary embodiment of the present disclosure, for a state in which a lengthwise rib of a movable cover is disposed further toward a rear side than the position illustrated in FIG. 33C.
Figure 33G:
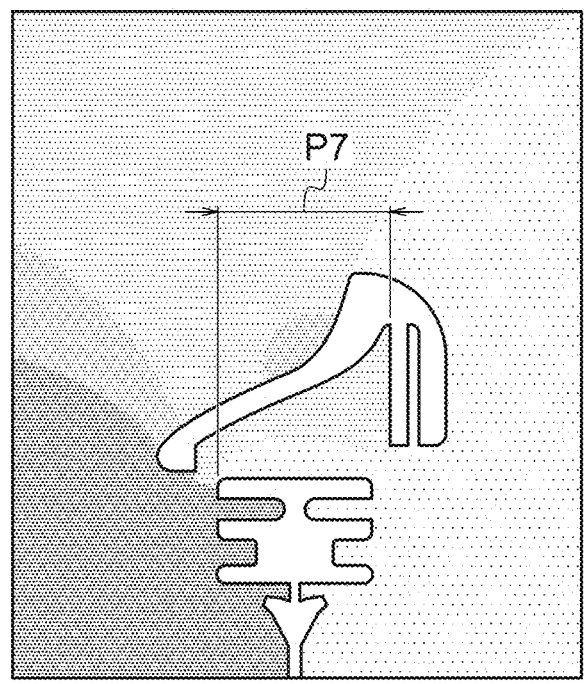
FIG. 33G is a diagram illustrating aerodynamic analysis for a wiper blade according to the first exemplary embodiment of the present disclosure, for a state in which a lengthwise rib of a movable cover is disposed further toward a rear side than the position illustrated in FIG. 33F.
Figure 33H:
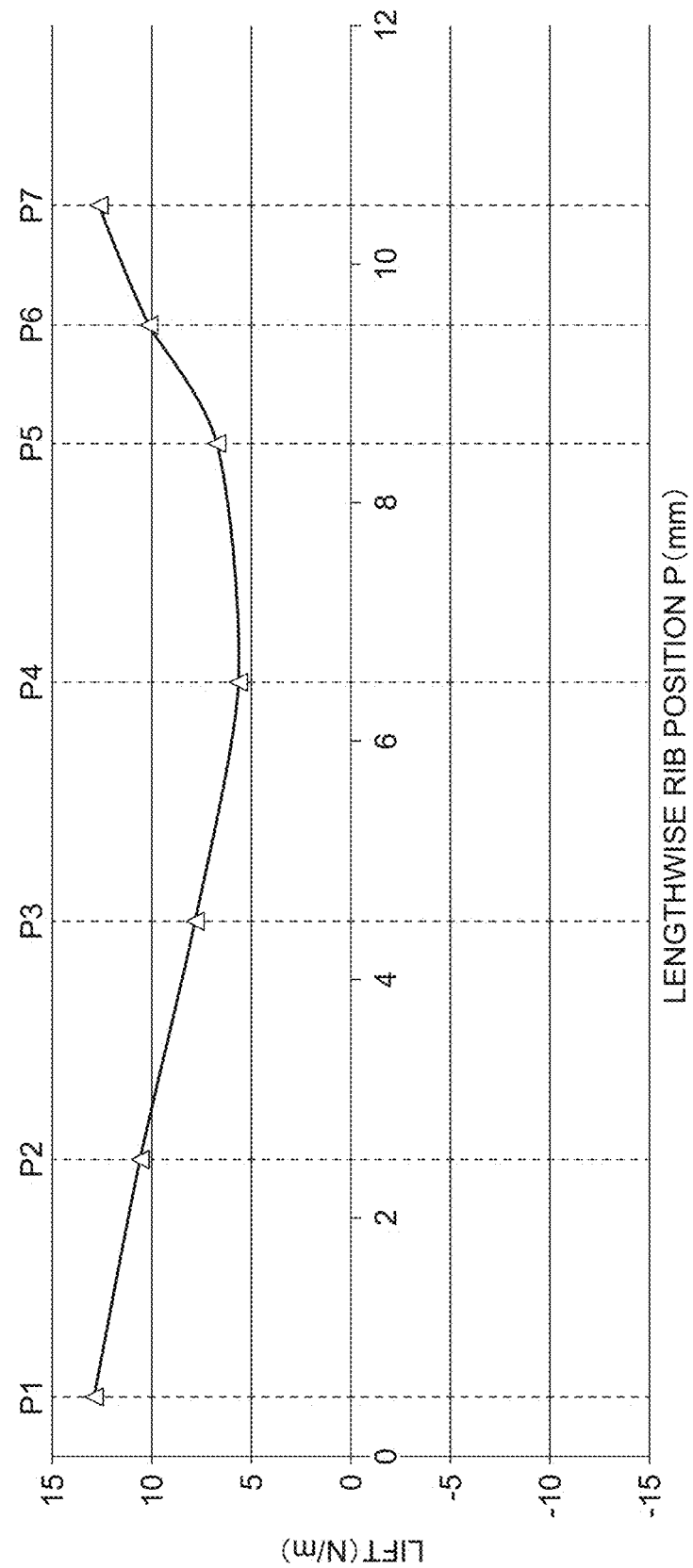
FIG. 33H is a line graph illustrating a relationship between the position of a lengthwise rib and lift in a wiper blade according to the first exemplary embodiment of the present disclosure.

In FIG. 33A to FIG. 33G the lengthwise rib position P is modified between a position P1 and a position P7, with the gap width G and the opening width E being kept constant. The lengthwise rib positions P1 to P7 are set in the relationship P1<P2<P3<P4<P5<P6<P7. FIG. 33H is a line graph illustrating a relationship between the modifications to the lengthwise rib position P and the lift generated in the blade rubber 14. In FIG. 33H, the lift generated in the blade rubber 14 is illustrated by a hollow triangle for each of the lengthwise rib positions P1 to P7. Similar annotation is also employed in FIG. 34E to FIG. 35D.

From FIG. 33A to FIG. 33G it can be seen that the pressure in the space 61 is higher at the width direction front side of the lengthwise rib 75, and the pressure in the space 61 is lower at the width direction rear side of the lengthwise rib 75. From FIG. 33A to FIG. 33H it can also be seen that the lift reduction effect on the blade rubber 14 is enhanced when the lengthwise rib 75 is disposed above the width direction rear end portion of the blade rubber 14.

Figure 34A:
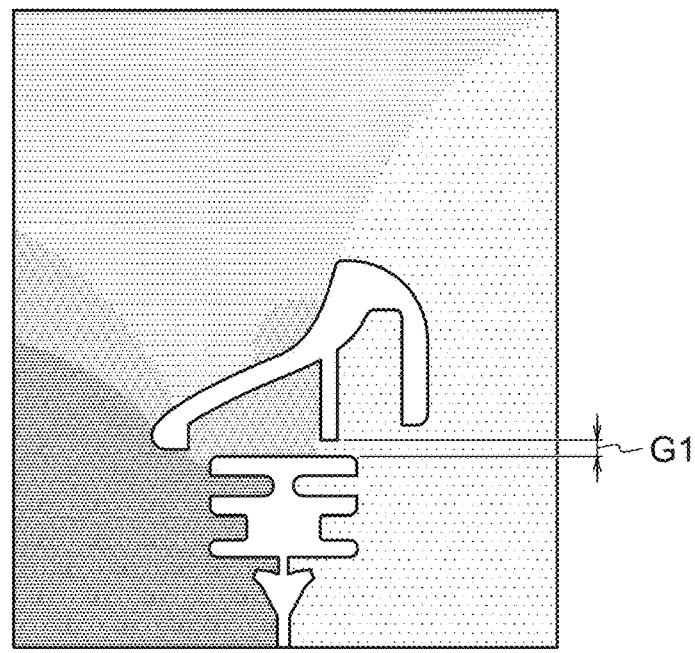
FIG. 34A is a diagram illustrating aerodynamic analysis for a wiper blade according to the first exemplary embodiment of the present disclosure, for a state in which a gap between a lengthwise rib of a movable cover and a blade rubber has been set small.
Figure 34B:
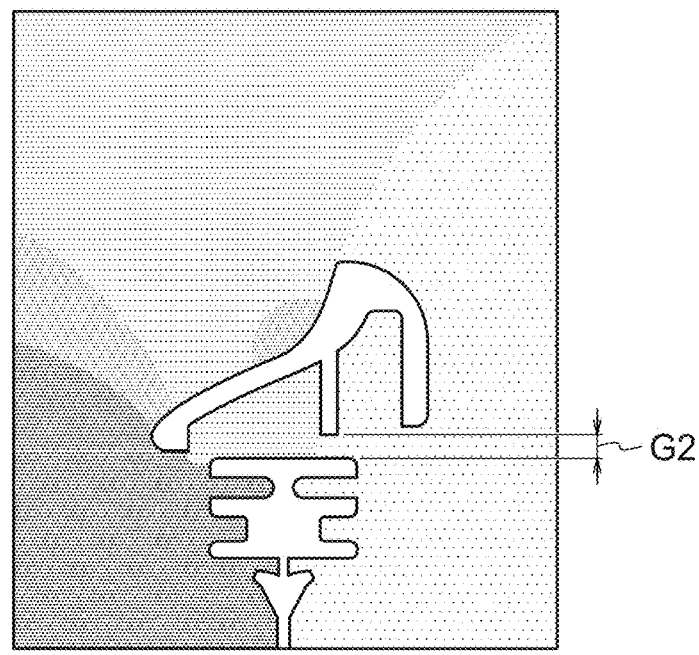
FIG. 34B is a diagram illustrating aerodynamic analysis for a wiper blade according to the first exemplary embodiment of the present disclosure, for a state in which a gap between a lengthwise rib of a movable cover and a blade rubber has been set larger than that of the state illustrated in FIG. 34A.
Figure 34C:
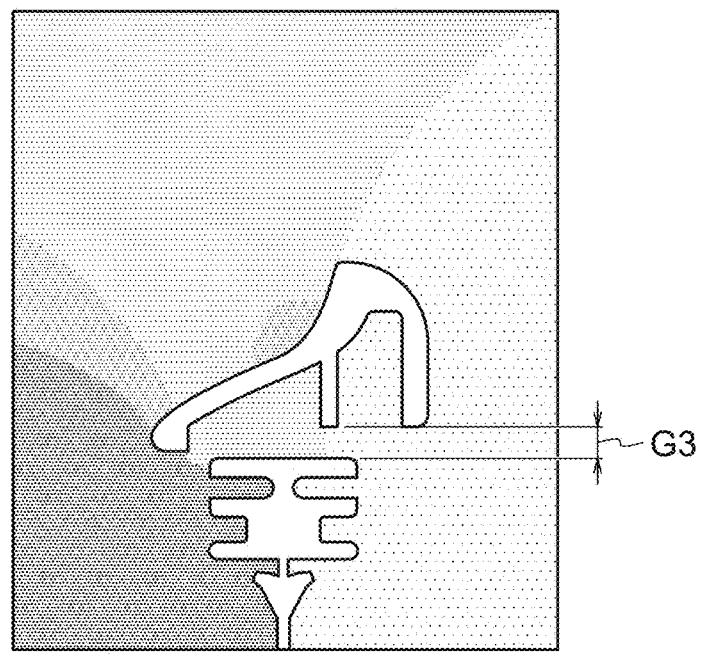
FIG. 34C is a diagram illustrating aerodynamic analysis for a wiper blade according to the first exemplary embodiment of the present disclosure, for a state in which a gap between a lengthwise rib of a movable cover and a blade rubber has been set larger than that of the state illustrated in FIG. 34B.
Figure 34D:
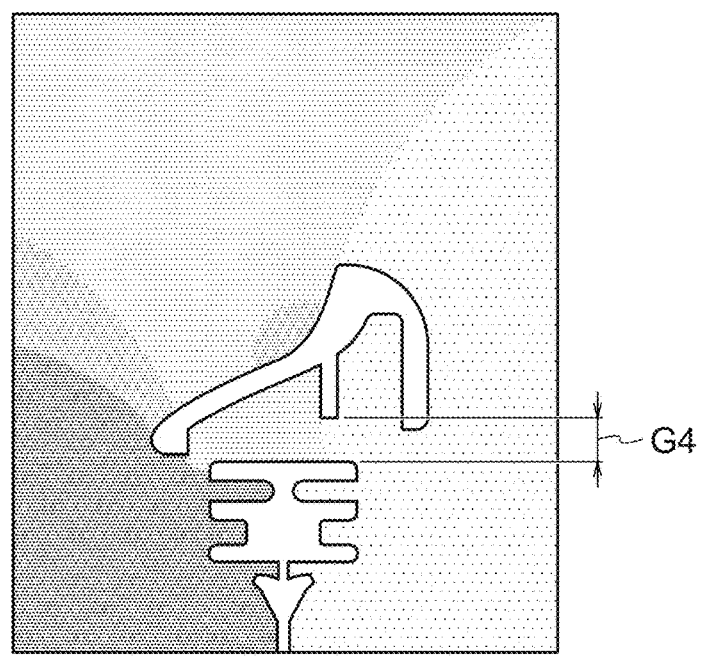
FIG. 34D is a diagram illustrating aerodynamic analysis for a wiper blade according to the first exemplary embodiment of the present disclosure, for a state in which a gap between a lengthwise rib of a movable cover and a blade rubber has been set larger than that of the state illustrated in FIG. 34C.
Figure 34E:
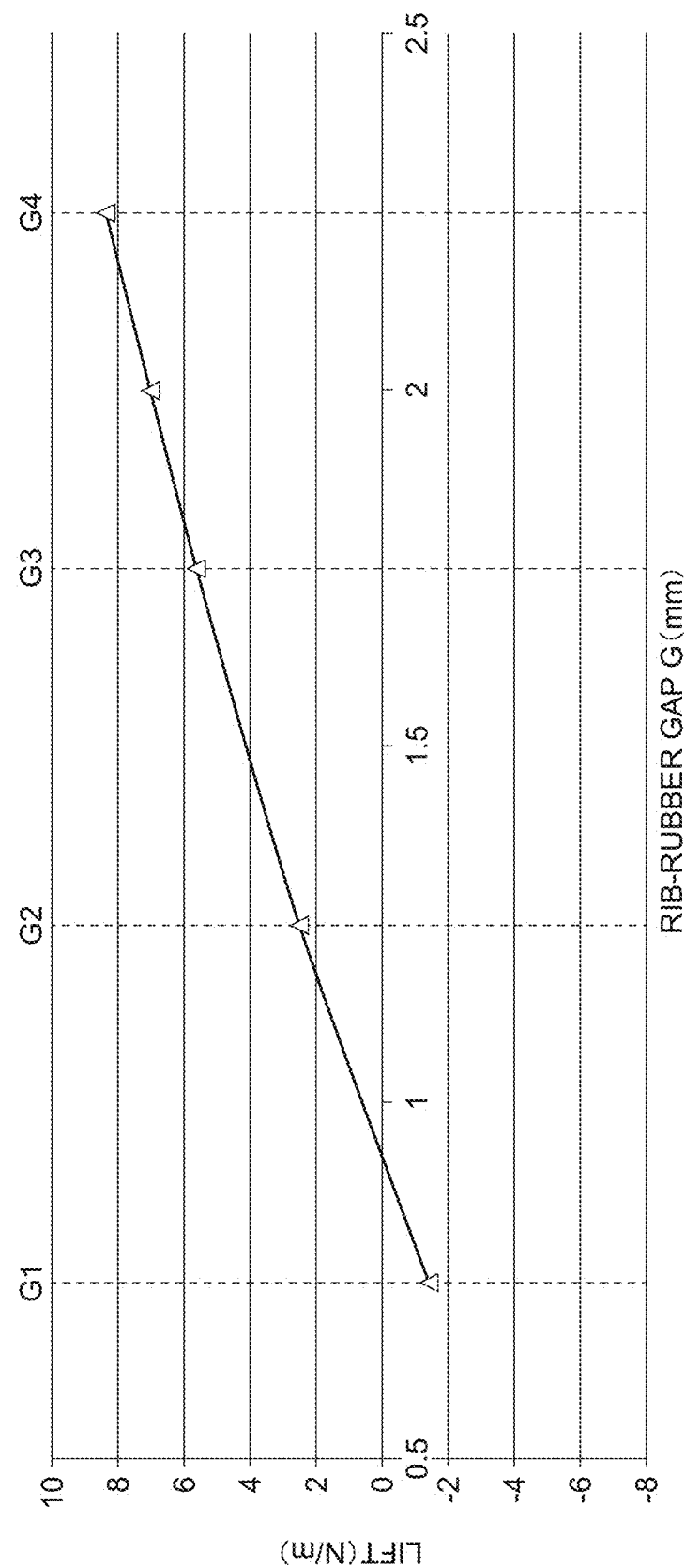
FIG. 34E is a line graph illustrating a relationship between the size of a gap between a lengthwise rib of a movable cover and a blade rubber and lift in a wiper blade according to the first exemplary embodiment of the present disclosure.

Next, explanation follows regarding changes in the lift on the blade rubber 14 accompanying modifications to the gap width with reference to FIG. 34A to FIG. 34E. In FIG. 34A to FIG. 34D, the gap width G is modified between a gap width G1 and a gap width G4, while the settings of the lengthwise rib position P and the opening width E are constant. The gap widths G1 to G4 are set in the relationship G1<G2<G3<G4. FIG. 34E is a line graph illustrating a relationship between the modifications to the gap width G and the lift generated in the blade rubber 14.

From FIG. 34A to FIG. 34E, it can be seen that the pressure inside the space 61 increases at the width direction front side of the lengthwise rib 75 and the lift generated in the blade rubber 14 is reduced as the gap width G is reduced.

Figure 35A:
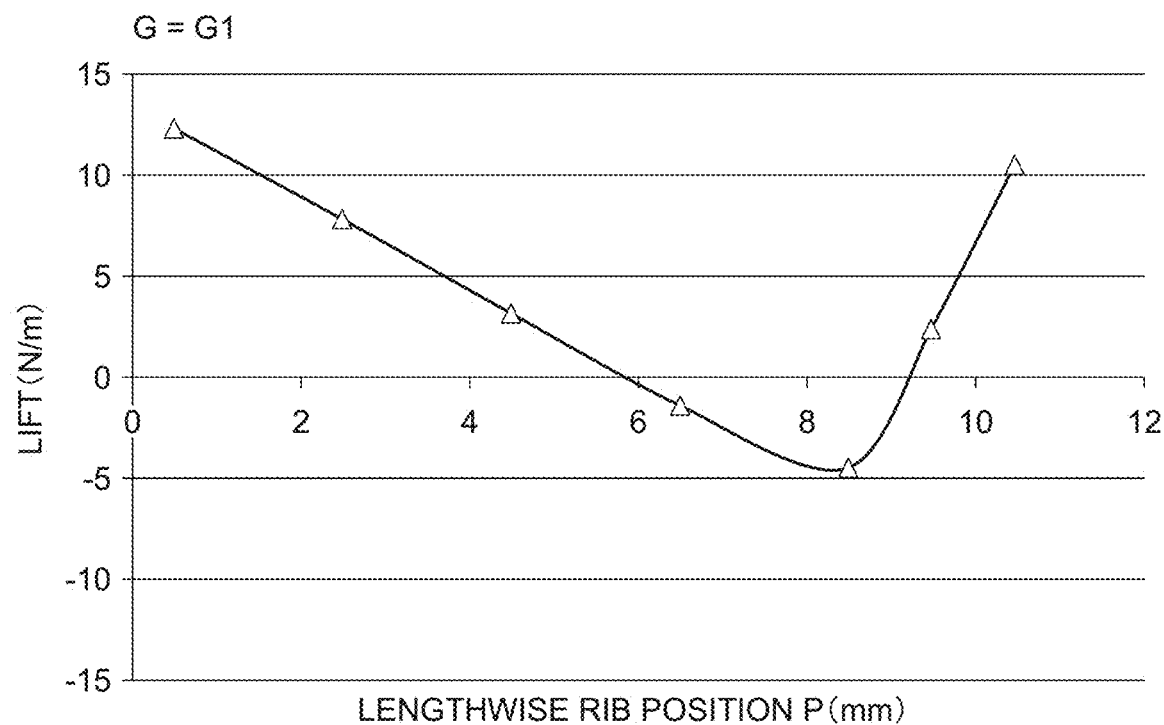
FIG. 35A is a line graph illustrating a relationship between the position of a lengthwise rib of a movable cover and lift in a wiper blade according to the first exemplary embodiment of the present disclosure for a state in which a gap between the lengthwise rib and a blade rubber has been set as illustrated in FIG. 34A.
Figure 35B:
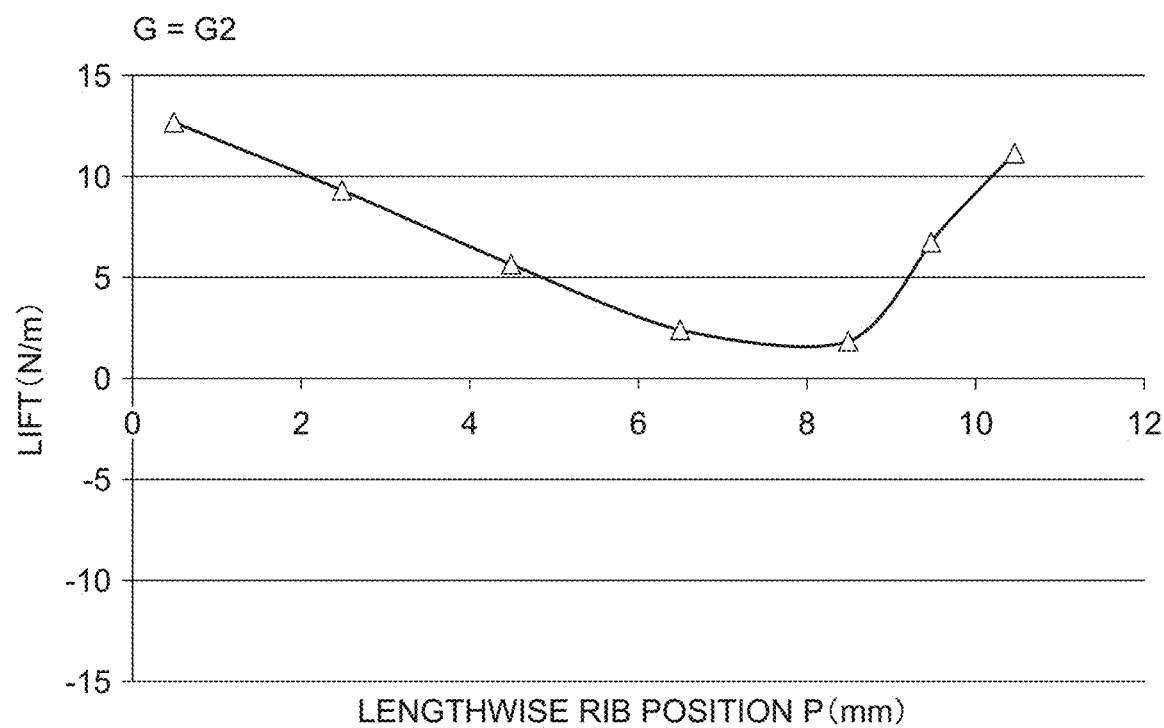
FIG. 35B is a line graph illustrating a relationship between the position of a lengthwise rib of a movable cover and lift in a wiper blade according to the first exemplary embodiment of the present disclosure for a state in which a gap between the lengthwise rib and a blade rubber has been set as illustrated in FIG. 34B.
Figure 35C:
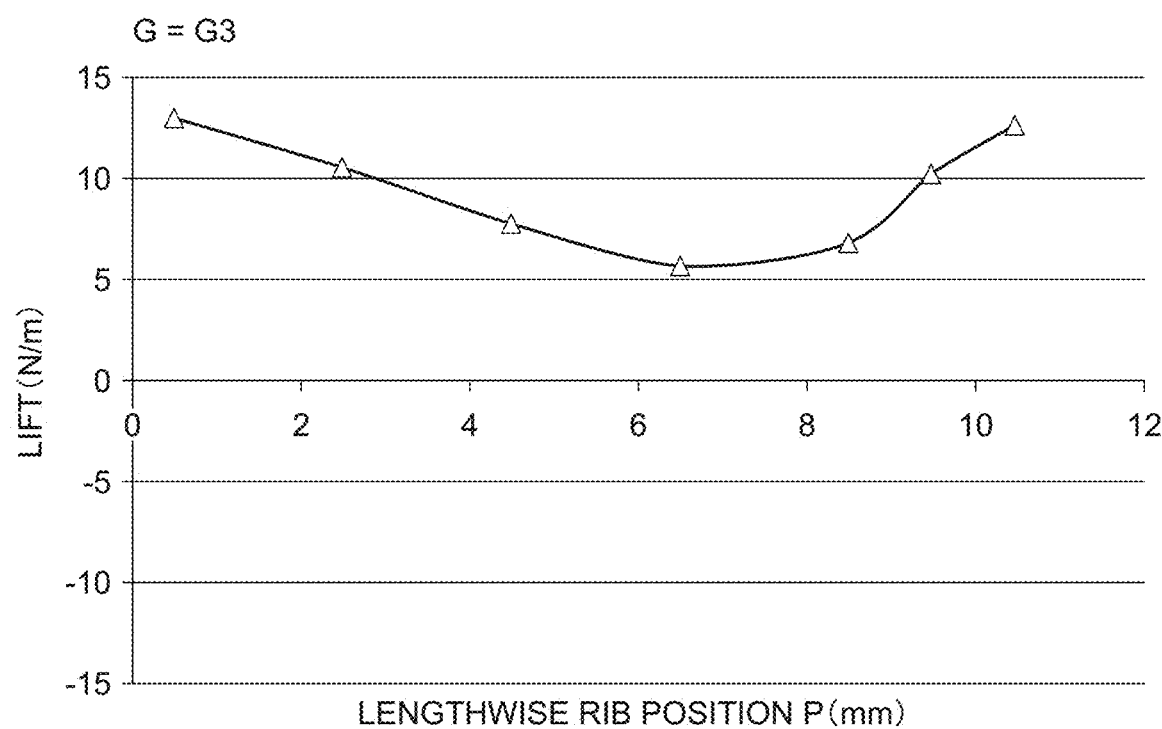
FIG. 35C is a line graph illustrating a relationship between the position of a lengthwise rib of a movable cover and lift in a wiper blade according to the first exemplary embodiment of the present disclosure for a state in which a gap between the lengthwise rib and a blade rubber has been set as illustrated in FIG. 34C.
Figure 35D:
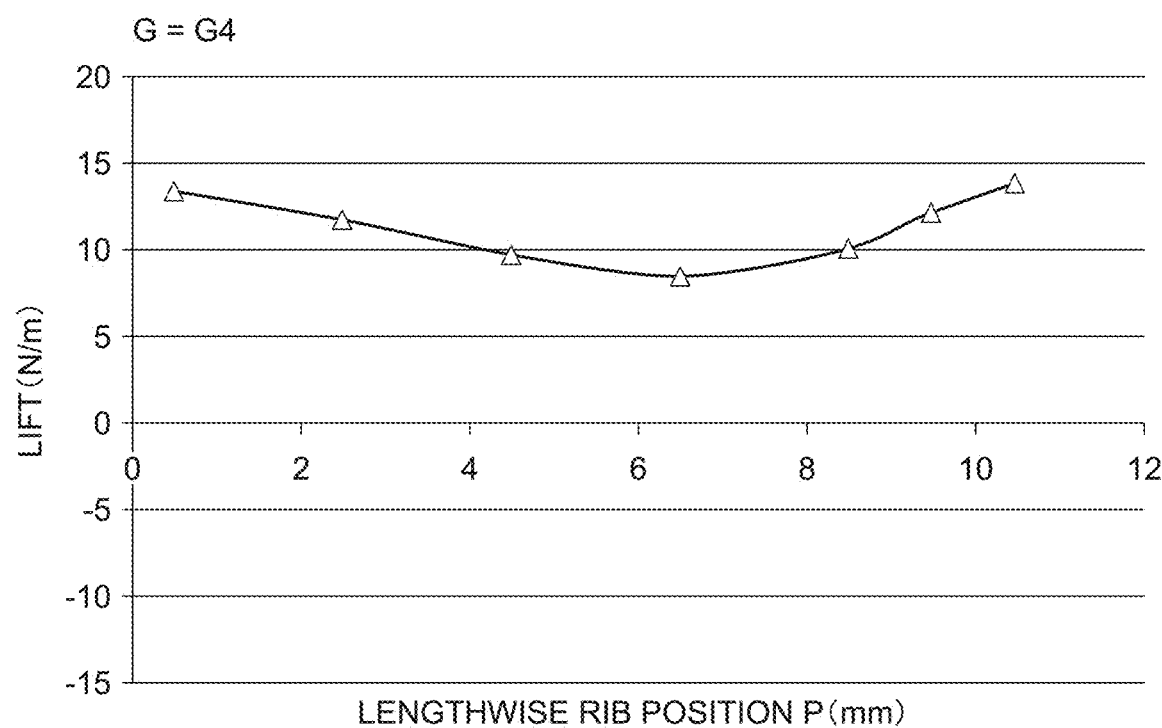
FIG. 35D is a line graph illustrating a relationship between the position of a lengthwise rib of a movable cover and lift in a wiper blade according to the first exemplary embodiment of the present disclosure for a state in which a gap between the lengthwise rib and a blade rubber has been set as illustrated in FIG. 34D.

Next, explanation follows regarding changes in the lift on the blade rubber 14 accompanying modifications to both the lengthwise rib position P and the gap width with reference to FIG. 35A to FIG. 35D. In FIG. 35A to FIG. 35D, the setting of the opening width E is constant. In FIG. 35A, the gap width G is set to G1 and the lengthwise rib position P is modified. Similarly, in FIG. 35B the gap width G is set to G2, in FIG. 35C the gap width G is set to G3, and in FIG. 35D the gap width G is set to G4, and the lengthwise rib position P is modified.

From FIG. 35A to FIG. 35D, it can be seen that the lift generated in the blade rubber 14 changes when the lengthwise rib position P and the gap width G are modified.

The aerodynamic analysis described above demonstrates the following. Namely, it has been demonstrated that the lift generated in the blade rubber 14 can be regulated by modifying the internal pressure inside the spaces 61 (inside the movable covers 60), and also that the pressure inside the spaces 61 can be regulated by modifying the rate at which the travel-induced wind (airflow rate) flows into the space 61 and the rate at which the travel-induced wind flows out of the space 61.

Figure 36A:
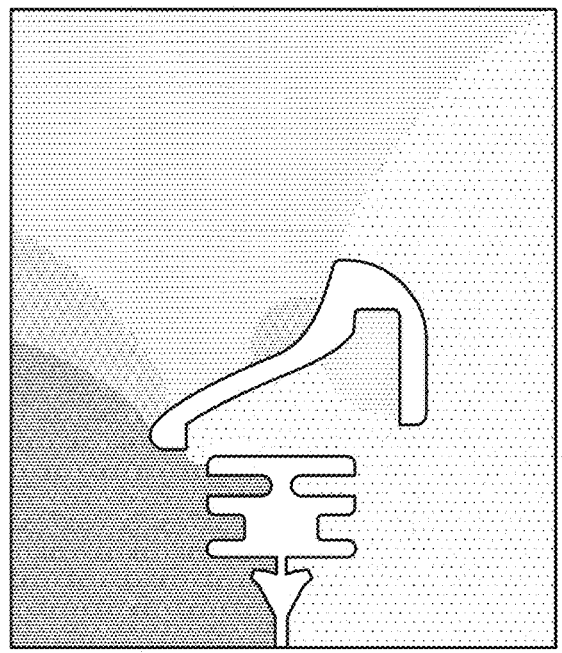
FIG. 36A is a diagram illustrating aerodynamic analysis for a wiper blade according to the first exemplary embodiment of the present disclosure, for a case in which a movable cover is not provided with a lengthwise rib.
Figure 36B:
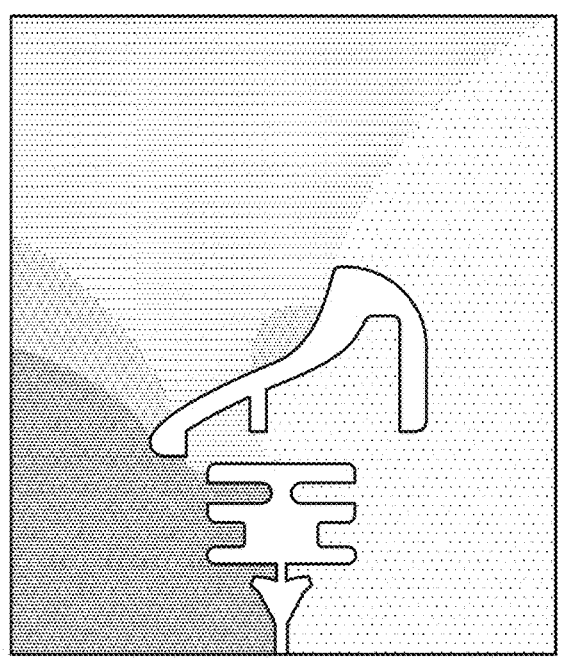
FIG. 36B is a diagram illustrating aerodynamic analysis for a wiper blade according to the first exemplary embodiment of the present disclosure, for a state in which a lengthwise rib of a movable cover is disposed at a front side.
Figure 36C:
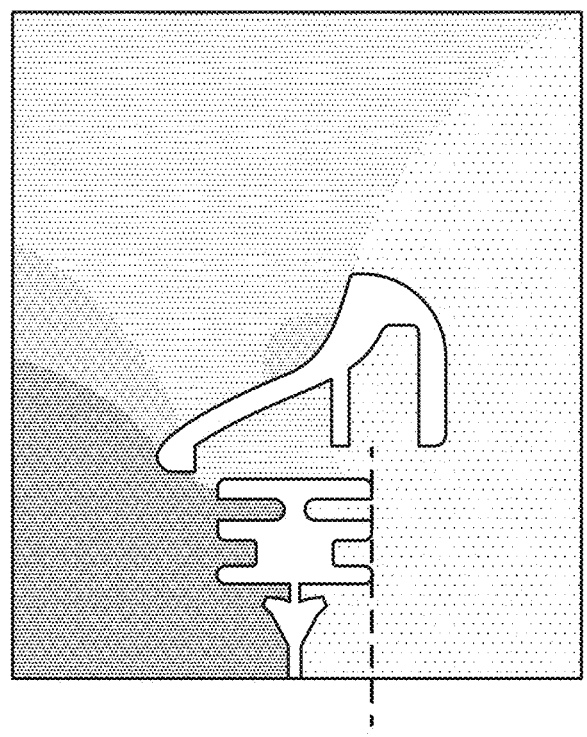
FIG. 36C is a diagram illustrating aerodynamic analysis for a wiper blade according to the first exemplary embodiment of the present disclosure, for a state in which a lengthwise rib of a movable cover is disposed above a rear end portion of a blade rubber.

Moreover, it has been demonstrated that higher pressure can be generated inside the movable covers 60 above the blade rubber 14 in configurations in which the movable covers 60 are provided with the lengthwise ribs 75 (see FIG. 36B and FIG. 36C) than in configurations in which the movable covers 60 are not provided with the lengthwise ribs 75 (see FIG. 36A). Moreover, it has been demonstrated that disposing the lengthwise ribs 75 closely above the width direction rear end portion of the blade rubber 14 is effective in creating high pressure over the entire width direction region of the upper surface of the blade rubber 14 since the pressure is higher at the width direction front side than at the width direction rear side of the lengthwise ribs 75.

Figure 37A:
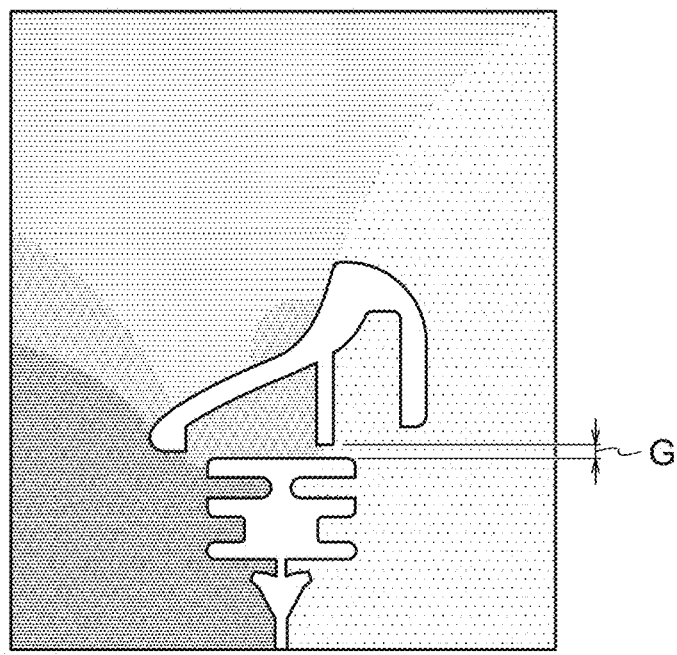
FIG. 37A is a diagram illustrating aerodynamic analysis for a wiper blade according to the first exemplary embodiment of the present disclosure, for a state in which a gap between a lengthwise rib of a movable cover and a blade rubber has been set small.
Figure 37B:
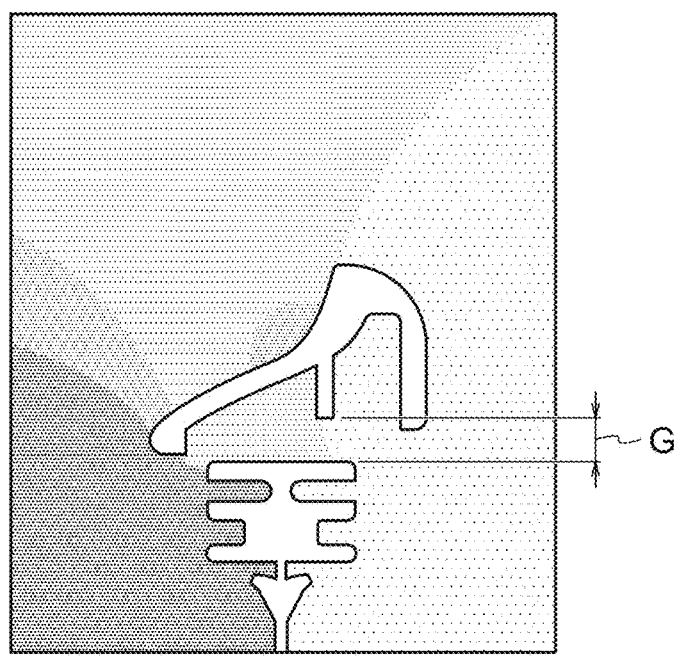
FIG. 37B is a diagram illustrating aerodynamic analysis for a wiper blade according to the first exemplary embodiment of the present disclosure, for a state in which a gap between a lengthwise rib of a movable cover and a blade rubber has been set large.
Figure 38A:
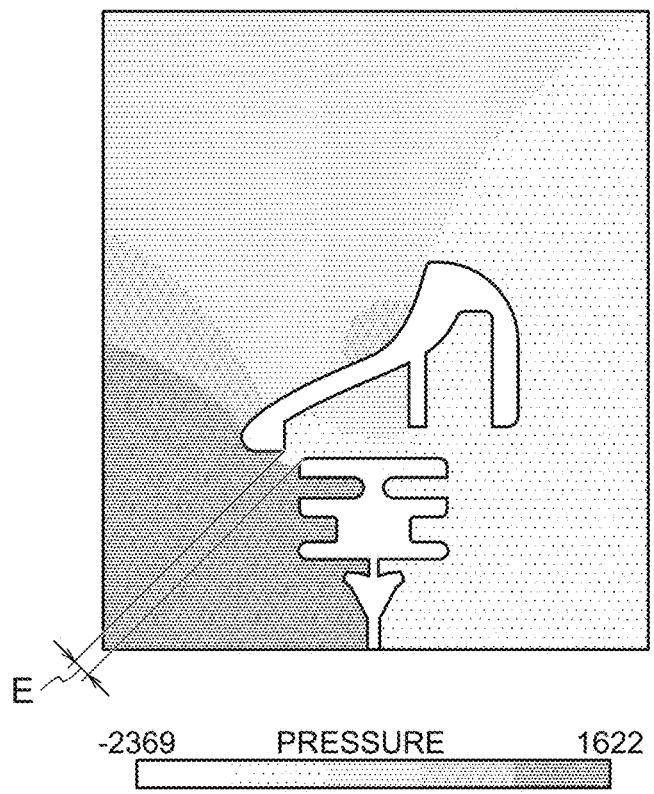
FIG. 38A is a diagram illustrating aerodynamic analysis for a wiper blade according to the first exemplary embodiment of the present disclosure, for a state in which a gap between a front wall of a movable cover and a blade rubber has been set small.
Figure 38B:
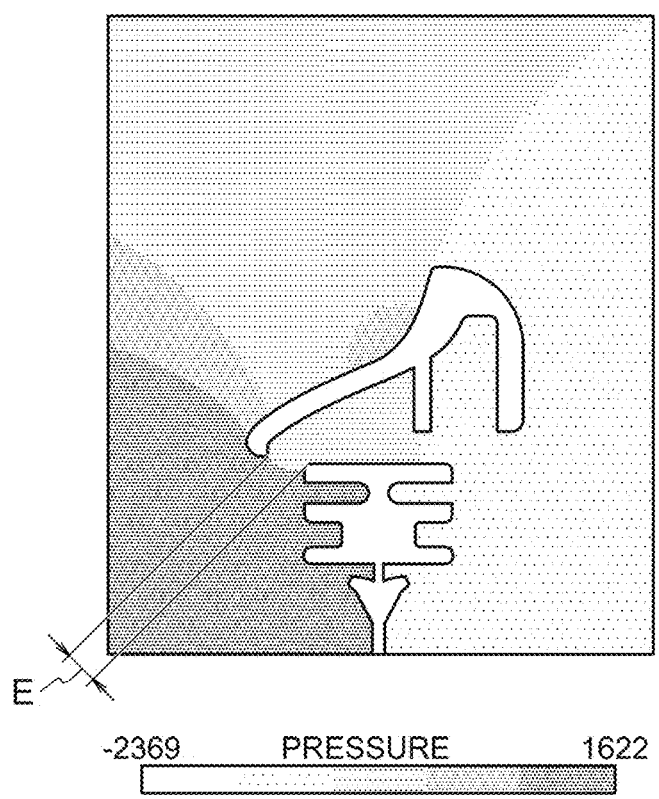
FIG. 38B is a diagram illustrating aerodynamic analysis for a wiper blade according to the first exemplary embodiment of the present disclosure, for a state in which a gap between a front wall of a movable cover and a blade rubber has been set large.
Figure 39:
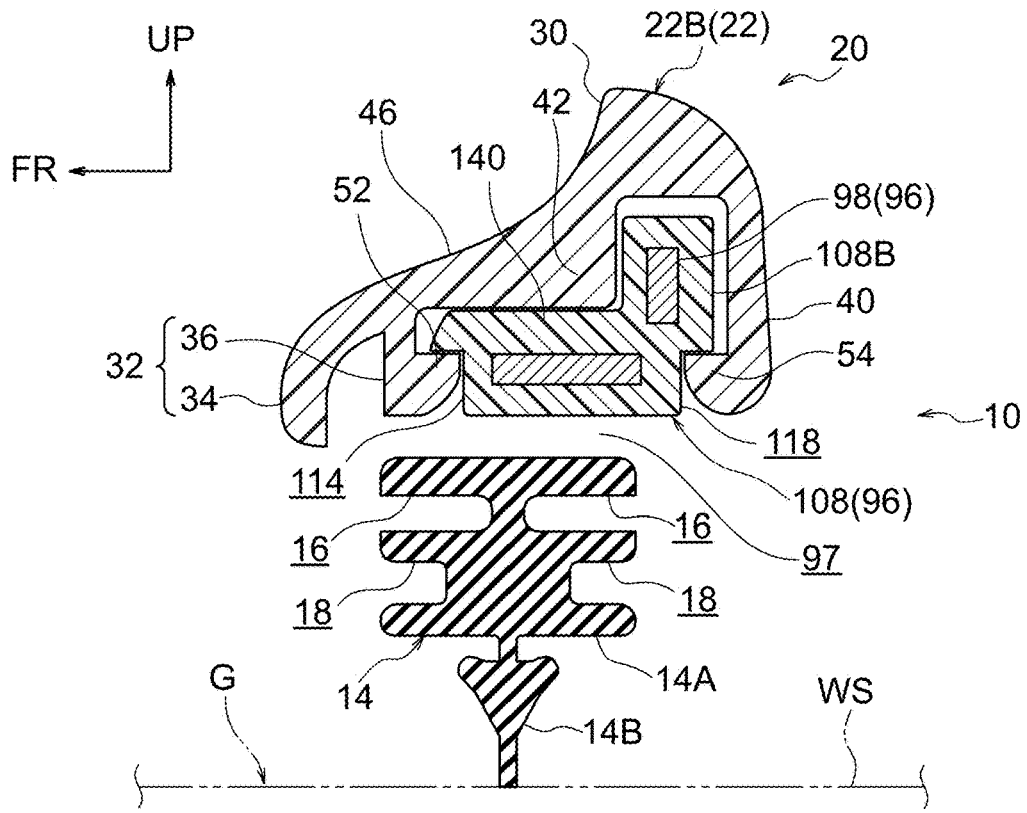
FIG. 39 is a cross-section corresponding to FIG. 13, illustrating a modified example of a wiper blade according to the first exemplary embodiment of the present disclosure.
Figure 40:
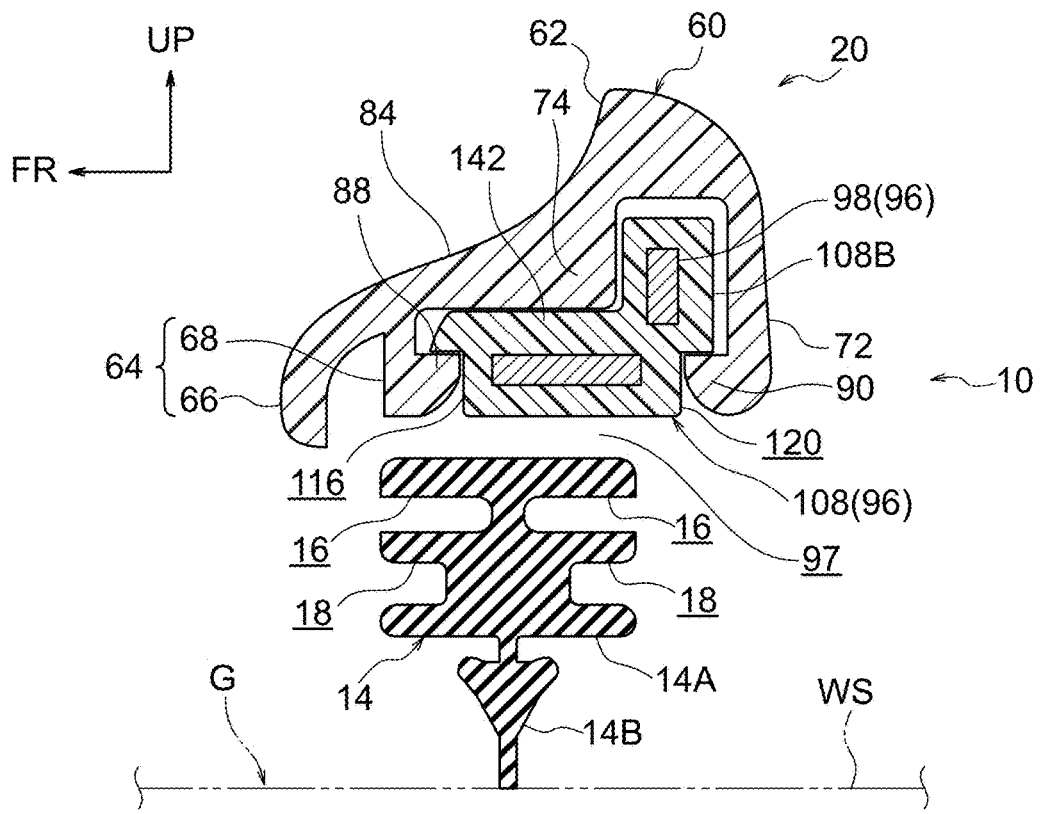
FIG. 40 is a cross-section corresponding to FIG. 15, illustrating a modified example of a wiper blade according to the first exemplary embodiment of the present disclosure.

It has also been demonstrated that setting a small gap width G (see FIG. 37A) creates higher pressure at the width direction front side of the lengthwise ribs 75 than when a large gap width G is set (see FIG. 37B). Moreover, it has been demonstrated that setting a large opening width E (see FIG. 38B) creates higher pressure at the width direction front side of the lengthwise ribs 75 than when a small opening width E is set (see FIG. 38A), despite changing (increasing) the inflow rate of the travel-induced wind into the spaces 61. It can thus be seen that the lift generated in the blade rubber 14 (internal pressure of the spaces 61) can be regulated.

Supplementary Explanation of the First Exemplary Embodiment

In the first exemplary embodiment described above, the pair of rear side pressing portions 132, 134 are each provided to an upper surface on the rear side of each of the yoke levers 96 (an upper surface of the upright wall portion 98B) so as to contact an upper surface on the rear side of the main housing compartment 48 and an upper surface on the rear side of the movable housing compartment 86 respectively. However, there is no limitation thereto. Namely, as in a modified example illustrated in FIG. 39 and FIG. 40, a pair of front side pressing portions 140, 142 may be provided to an upper surface on a front side of the each of the yoke levers 96 (upper surface of the plate-shaped portion 108A) so as to contact an upper surface on the front side of the corresponding main housing compartment 48 and an upper surface on the front side of the corresponding movable housing compartment 86. The pair of front side pressing portions 140, 142 correspond to pressing portions.

In this modified example, pressing force from the wiper arm 12, reaction force from the wiping surface WS, and so on are transmitted between the yoke lever 96 and the main lever 22 and between the yoke lever 96 and the corresponding movable cover 60 through the pair of front side pressing portions 140, 142, thereby preventing or suppressing these forces from being applied to the respective pivotally coupled portions between the yoke lever 96 and the main lever 22 and between the yoke lever 96 and the movable cover 60. This enables these pivotally coupled portions to be reduced in size in the height direction of the yoke levers 96. Similarly to in the exemplary embodiment described above, this enables the projection height of the wiper lever assembly 20 (wiper blade 10) from the wiping surface WS to be kept even lower. Moreover, since the front side pressing portions 140, 142 described above are disposed above the blade rubber 14, the pressing force from the wiper arm 12 can be applied to the blade rubber 14 from above (without any front-rear offset).

Next, explanation follows regarding other exemplary embodiments of the present disclosure. Note that configurations and operation that are basically the same as those of the first exemplary embodiment are allocated the same reference numerals as in the first exemplary embodiment, and explanation thereof is omitted.

Second Exemplary Embodiment

Figure 41:
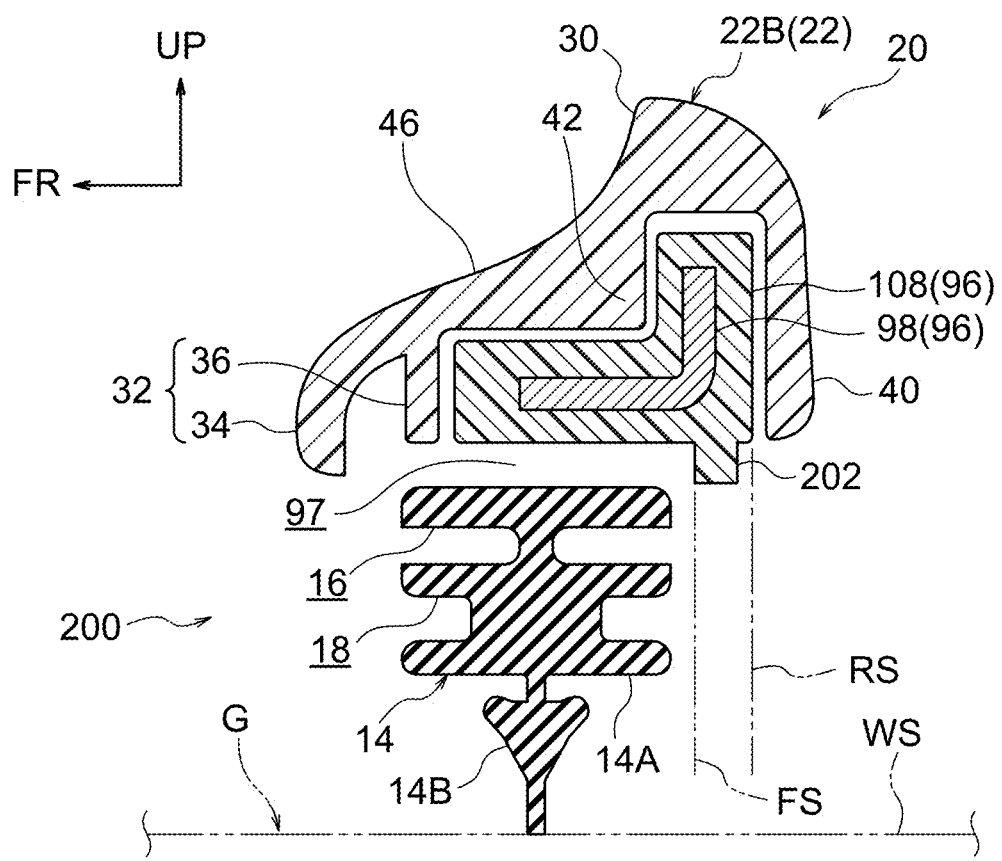
FIG. 41 is a cross-section corresponding to FIG. 13, illustrating a wiper blade according to a second exemplary embodiment of the present disclosure.
Figure 42:
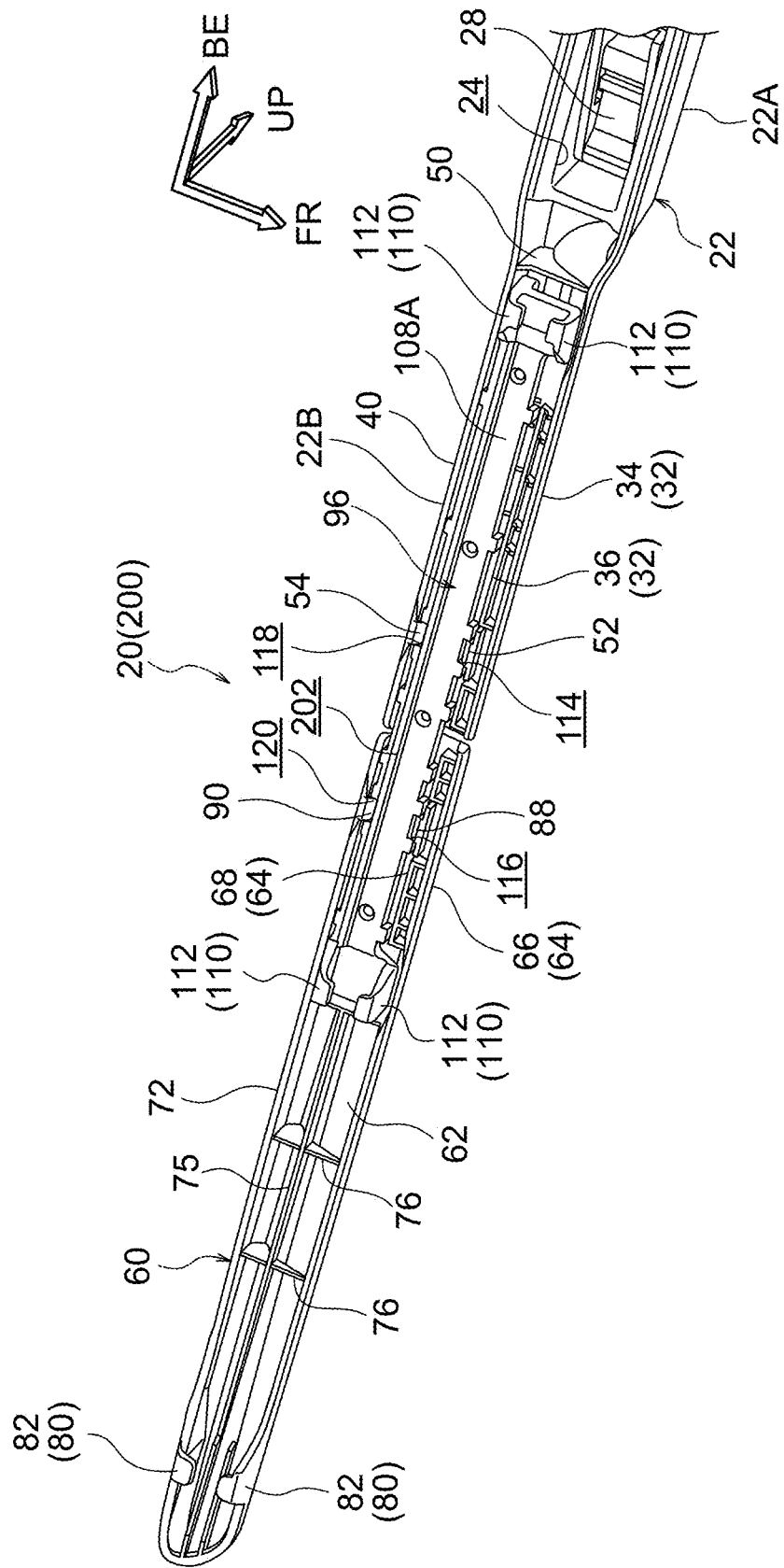
FIG. 42 is a perspective view corresponding to FIG. 18, illustrating a leading end side portion of a wiper lever assembly according to the second exemplary embodiment of the present disclosure.

FIG. 41 is a cross-section corresponding to FIG. 14, illustrating a wiper blade 200 according to a second exemplary embodiment of the present disclosure. FIG. 42 is a perspective view corresponding to FIG. 18, illustrating configuration at a leading end side portion of a wiper lever assembly 20 of the wiper blade 200 according to the second exemplary embodiment. Although the wiper blade 200 according to the second exemplary embodiment has basically the same configuration as the wiper blade 10 according to the first exemplary embodiment, a lever ridge 202 serving as an obstruction portion is formed projecting from a lower surface of each of the yoke levers 96. Note that in the second exemplary embodiment, the wiper lever assembly 20 is configured similarly to in the modified example of the first exemplary embodiment described above.

The lever ridge 202 is integrally molded to each of the yoke lever bodies 108, extends along the length direction of the blade rubber 14, and projects from a width direction rear end portion of a lower surface of the yoke lever body 108. The lever ridge 202 is disposed further toward the front-rear direction rear side than the blade rubber 14, and opposes the gap 97 between the blade rubber 14 and the yoke lever 96 from the width direction rear side. A width direction front end surface of the lever ridge 202 is disposed further toward the width direction rear side than a width direction rear end surface of the blade rubber 14 (see the double-dotted dashed line FS in FIG. 41). The yoke lever 96 is reinforced by the lever ridge 202 so as to raise the bending strength of the yoke lever 96. Note that in order to enhance the reinforcing effect of the lever ridge 202 on the yoke lever 96, the width of the lever ridge 202 is preferably increased as far as a width direction rear end surface of the yoke lever 96 (see the double-dotted dashed line RS in FIG. 41)

Other configuration of the present exemplary embodiment is similar to that of the first exemplary embodiment. Accordingly, the present exemplary embodiment obtains similar operation and advantageous effects to those of the first exemplary embodiment. Moreover, in the present exemplary embodiment, the lever ridge 202 that projects from a width direction rear end portion of the lower surface of each of the yoke levers 96 extends along the length direction of the blade rubber 14. The lever ridge 202 obstructs the travel-induced wind flowing into the gap 97 between the blade rubber 14 and the yoke lever 96 inside the gap 97. Accordingly, even where the presence of the yoke levers 96 makes it difficult to form a lengthwise rib 75 at the lower surfaces of the movable covers 60 and the main lever 22, the pressure in the gap 97 can still be raised, thereby enabling the blade rubber 14 to be suppressed from lifting up below the yoke levers 96.

Moreover, since the pressure is raised due to travel-induced wind being obstructed by the lever ridge 202 further toward the width direction front side than the lever ridge 202, namely further toward the front side than the width direction rear end portion of the yoke lever 96, the raised pressure can be made to act over a wider range of the upper surface of the blade rubber 14 than in cases in which the lever ridge 202 is formed at the width direction front side of the yoke lever 96. The reduction effect on lift generated in the blade rubber 14 is thereby enhanced as a result.

Moreover, in the present exemplary embodiment, the lever ridge 202 is disposed further toward the width direction rear side than the blade rubber 14. Accordingly, when the blade rubber 14 moves up and down following the curvature of the wiping surface WS, this up-and-down movement is not hindered by the lever ridge 202 contacting the blade rubber 14.

Moreover, in the present exemplary embodiment, each of the yoke levers 96 is reinforced by the lever ridge 202. This for example enables the yoke levers 96 to be configured solely from resin (enables the metal portion 98 to be omitted).

Figure 43A:
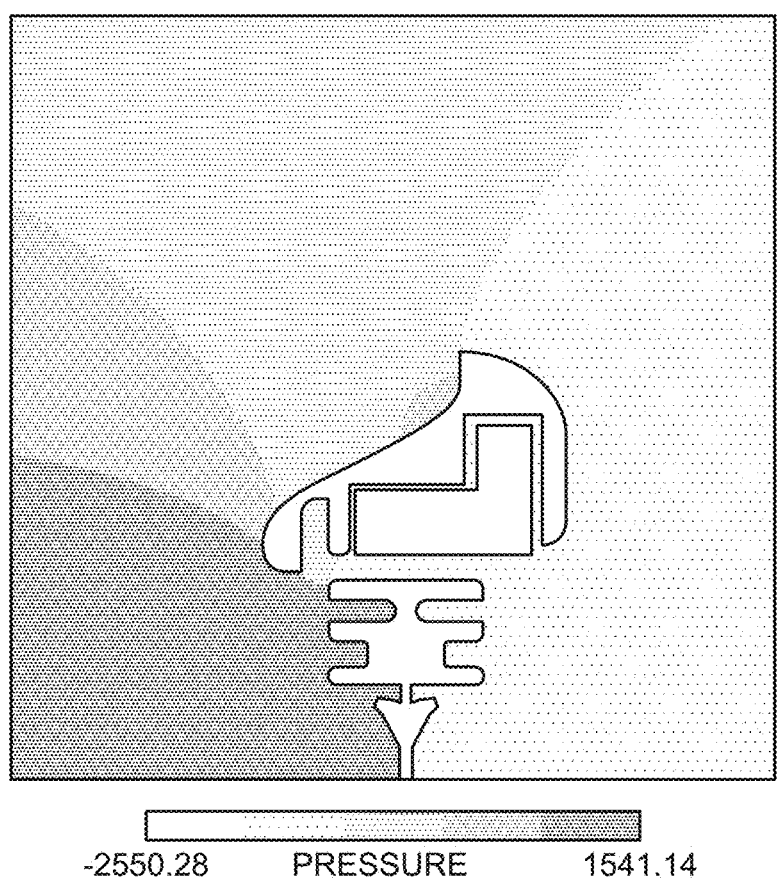
FIG. 43A is a diagram illustrating aerodynamic analysis for a wiper blade according to a comparative example.
Figure 43B:
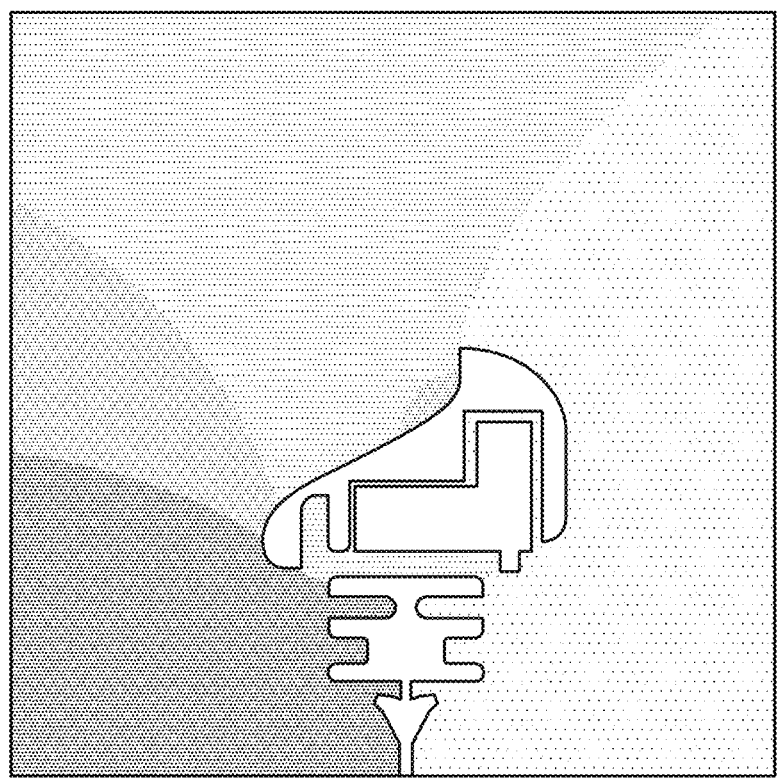
FIG. 43B is a diagram illustrating aerodynamic analysis for a wiper blade according to the second exemplary embodiment of the present disclosure.
Figure 43C:
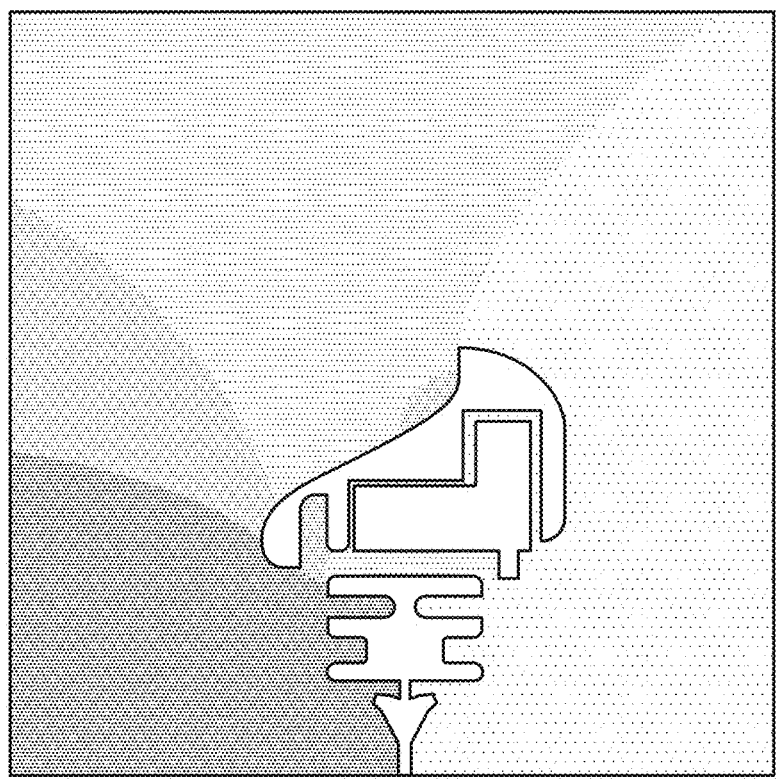
FIG. 43C is a diagram illustrating aerodynamic analysis for a wiper blade according to the second exemplary embodiment of the present disclosure, for a state in which a lever ridge has been set with a large projection amount.

Next, explanation follows regarding the results of aerodynamic analysis performed for the wiper blade 200 according to the second exemplary embodiment, with reference to FIG. 43A to FIG. 43C. FIG. 43A is a diagram illustrating aerodynamic analysis for a comparative example in which the yoke levers 96 are not provided with the lever ridge 202, FIG. 43B is a diagram illustrating aerodynamic analysis for the wiper blade 200 according to the second exemplary embodiment, and FIG. 43C is a diagram illustrating aerodynamic analysis for the wiper blade 200 according to the second exemplary embodiment in which the lever ridge 202 has been set with a greater projection amount (up-down direction dimension). FIG. 43A to FIG. 43C demonstrate that providing the lever ridge 202 to the yoke lever 96 enables the pressure in the gap 97 between the blade rubber 14 and the yoke lever 96 to be raised, and that setting the lever ridge 202 with a greater projection amount further enables the lift generated in the blade rubber 14 to be further reduced.

Third Exemplary Embodiment

Figure 44:
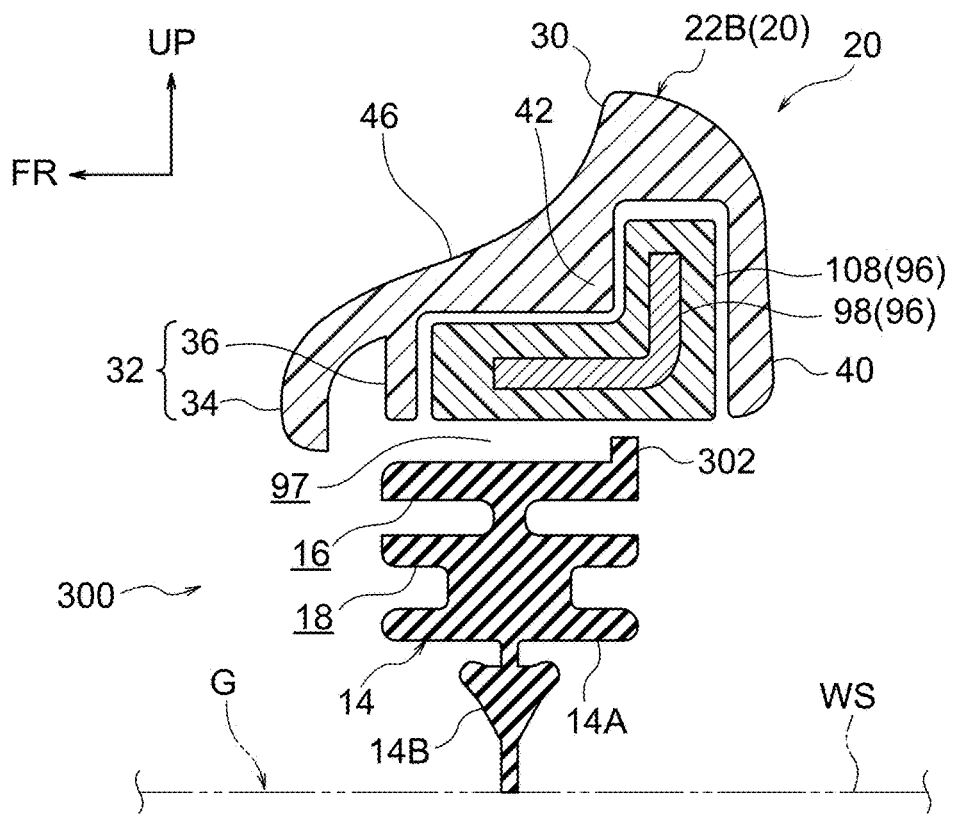
FIG. 44 is a cross-section corresponding to FIG. 14, illustrating a wiper blade according to a third exemplary embodiment of the present disclosure.
Figure 45:
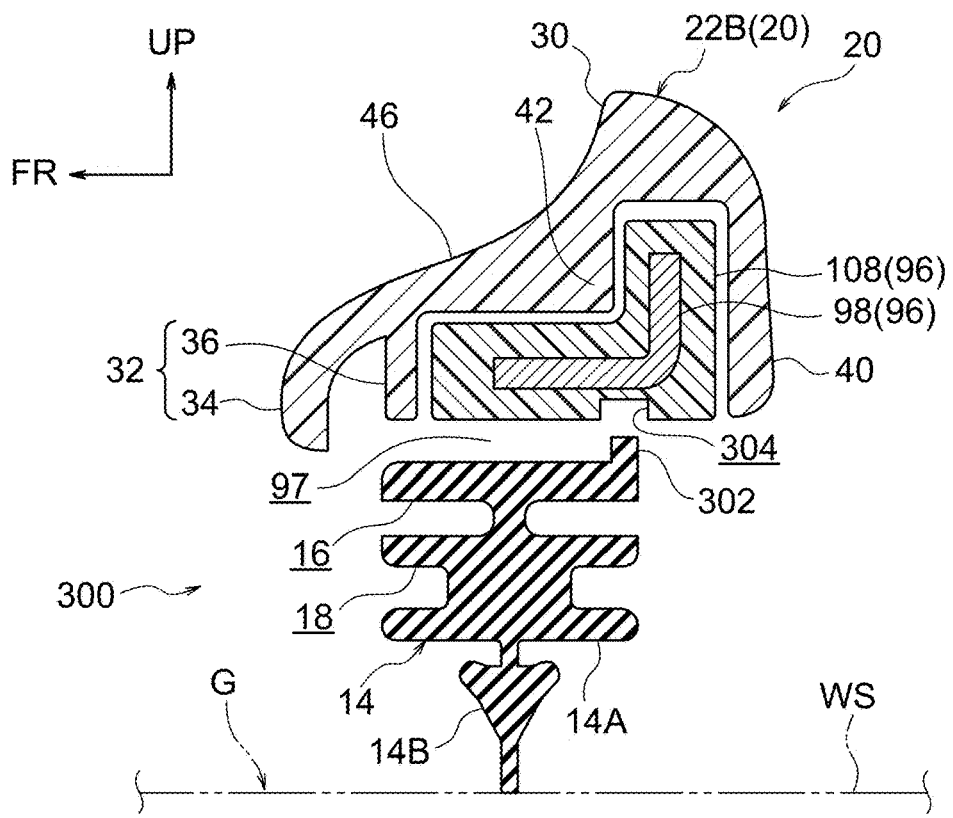
FIG. 45 is a cross-section corresponding to FIG. 44, illustrating an example in which a wiper blade according to the third exemplary embodiment of the present disclosure is formed with a recess in a lower surface of a yoke lever.

FIG. 44 is a cross-section corresponding to FIG. 14, illustrating a wiper blade 300 according to a third exemplary embodiment of the present disclosure. FIG. 45 is a cross-section corresponding to FIG. 44, illustrating an example in which the wiper blade 300 according to the third exemplary embodiment is formed with a recess 304 in the lower surface of each of the yoke levers 96. Although the wiper blade 300 according to the third exemplary embodiment has basically the same configuration as the wiper blade 10 according to the first exemplary embodiment, a rubber ridge 302 serving as an obstruction portion is formed projecting from the upper surface of the blade rubber 14. Note that in the third exemplary embodiment, the wiper lever assembly 20 is configured similarly to in the modified example of the first exemplary embodiment described above.

The rubber ridge 302 is integrally molded to the blade rubber 14, and projects from a width direction rear end portion of the upper surface of the blade rubber 14. The rubber ridge 302 spans along the entire length direction range of the blade rubber 14, and is disposed in the gap 97 between each of the yoke levers 96 and the blade rubber 14. In the example illustrated in FIG. 45, at a position corresponding to the rubber ridge 302, the lower surface of the yoke lever 96 is formed with the recess 304 capable of housing the rubber ridge 302.

Other configuration of the present exemplary embodiment is similar to that of the first exemplary embodiment. Accordingly, the present exemplary embodiment is capable of obtaining similar operation and advantageous effects to those of the first exemplary embodiment. Moreover, in the present exemplary embodiment, the rubber ridge 302 that projects from the width direction rear end portion of the upper surface of the blade rubber 14 extends along the length direction of the blade rubber 14, and is disposed in the gap 97 between each of the yoke levers 96 and the blade rubber 14. Accordingly, the travel-induced wind flowing into the gap 97 can be obstructed by the rubber ridge 302, enabling the pressure inside the gap 97 to be raised. This enables the blade rubber 14 to be suppressed from lifting up below the yoke levers 96.

Moreover, since the pressure is raised due to the travel-induced wind being obstructed by the rubber ridge 302 further toward the width direction front side than the rubber ridge 302, namely further toward the front side than the width direction rear end portion of the upper surface of the blade rubber 14, the raised pressure can be made to act over a wider range of the upper surface of the blade rubber 14 than in cases in which the rubber ridge 302 is formed at the width direction front side of the upper surface of the blade rubber 14. The reduction effect on lift generated in the blade rubber 14 is thereby enhanced as a result.

Moreover, in the example illustrated in FIG. 45, the recess 304 is formed in the lower surface of each of the yoke levers 96 at a position corresponding to the rubber ridge 302 so as to be capable of housing the rubber ridge 302. Accordingly, when the blade rubber 14 moves up and down following the curvature of the wiping surface WS, this up-and-down movement is not hindered by the rubber ridge 302 contacting the yoke levers 96.

Next, explanation follows regarding the results of aerodynamic analysis performed for the wiper blade 300 according to the third exemplary embodiment, with reference to FIG. 46A and FIG. 46B. Note that a diagram illustrating aerodynamic analysis for a comparative example in which the blade rubber 14 is not provided with the rubber ridge 302 is the same as that illustrated in FIG. 43A in the second exemplary embodiment. FIG. 46A is a diagram illustrating aerodynamic analysis for the wiper blade 300 according to the third exemplary embodiment, and FIG. 46B is a diagram illustrating aerodynamic analysis for the wiper blade 300 according to the third exemplary embodiment in a case in which the recess 304 is formed to the lower surface of the yoke lever 96. FIG. 46A and FIG. 46B demonstrate that providing the rubber ridge 302 to the upper surface of the blade rubber 14 enables pressure to be raised in the gap 97 between the blade rubber 14 and each of the yoke levers 96.

FIG. 46B also demonstrates that the recess 304 does not affect the lift generated in the blade rubber 14.

Figure 49:
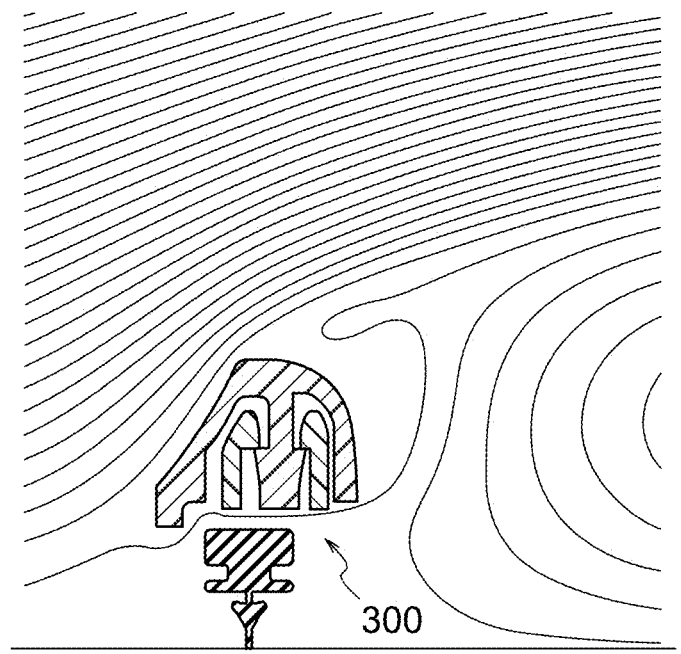
FIG. 49 is a diagram illustrating aerodynamic analysis for a wiper blade according to a second comparative example.

Next, explanation follows regarding aerodynamic characteristics of the wiper blade 10 according to the first exemplary embodiment, with reference to FIG. 47 to FIG. 49. FIG. 47 is a diagram illustrating aerodynamic analysis for the wiper blade 10 according to the first exemplary embodiment, FIG. 48 is a diagram illustrating aerodynamic analysis for a wiper blade 200 according to a first comparative example, and FIG. 49 is a diagram illustrating aerodynamic analysis for a wiper blade 300 according to a second comparative example. The wiper blades 200, 300 are wiper blades employing an existing tournament structure. Yoke levers (not allocated reference numerals) provided to the wiper blades 200, 300 have greater height dimensions than the yoke levers 96 provided to the wiper blade 10. In this aerodynamic analysis, the respective height dimensions were set such that the height dimension of the wiper blade 10<the height dimension of the wiper blade 200<the height dimension of the wiper blade 300.

The respective wiper blades 10, 200, 300 were analyzed for the lift and drag acting on the respective wiper blades when set to a vehicle travel speed of 200 km/h. The results showed a relationship of wiper blade 10<wiper blade 200<wiper blade 300 for both lift and drag. In particular, lift on the wiper blade 10 was much smaller, at around $\frac{1}{7}$ of that acting on the wiper blade 200. This aerodynamic analysis demonstrates that the wiper blade 10 according to the present exemplary embodiment attains a marked improvement in aerodynamic characteristics.

Although the present disclosure has been described using a number of exemplary embodiments, various modifications may be implemented within a range not departing from the spirit of the present disclosure. Obviously, the scope of rights encompassed by the present disclosure is not limited by the respective exemplary embodiments described above.

The disclosure of Japanese Patent Application No. 2018-173730, filed on Sep. 18, 2018, the disclosure of Japanese Patent Application No. 2018-176479, filed on Sep. 20, 2018, the disclosure of Japanese Patent Application No. 2018-176480, filed on Sep. 20, 2018, the disclosure of Japanese Patent Application No. 2018-179440, filed on Sep. 25, 2018, and the disclosure of Japanese Patent Application No. 2018-182682, filed on Sep. 27, 2018 are incorporated in their entirety by reference herein. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A wiper lever assembly that grips a blade rubber for wiping a wiping surface of a vehicle, the wiper lever assembly comprising:
   a main lever (i) that is coupled to a leading end portion of a wiper arm at a length direction central portion of the main lever, (ii) that includes a first fin surface that has a downward gradient on progression toward a width direction front side, which faces toward a front side of the vehicle, and is formed on upper surfaces on both length direction sides of the main lever, and (iii) that includes main housing compartments formed on two length direction sides of the main lever, an inner wall extending downward into each of the main housing compartments from an upper wall of the main lever, and each of the main housing compartments being open toward a wiping surface and having a greatest height dimension at a width direction rear side that is rearward of the inner wall;

a pair of movable covers that have their lengths in a length direction of the main lever and that are disposed contiguously to the main lever on the two length direction sides of the main lever, each of the movable covers including (i) a grip portion for gripping the blade rubber at an opposite side of the movable cover from the main lever, (ii) a second fin surface having a downward gradient on progression toward the width direction front side and formed on an upper surface of the movable cover, and (iii) a movable housing compartment open toward the wiping surface and having a greater height dimension at the width direction rear side than at the width direction front side; and a pair of yoke levers, each of the yoke levers (i) having its length in the length direction of the main lever and of the movable covers, (ii) being housed spanning inside a corresponding main housing compartment and inside a corresponding movable housing compartment, (iii) being coupled to the main lever and to the corresponding movable cover so as to be capable of pivoting about an axis extending in a width direction, (iv) including a grip portion for gripping the blade rubber at both length direction end portions of the yoke lever, and (v) having a greater height dimension at the width direction rear side than at the width direction front side, wherein each of the yoke levers includes a plate-shaped portion, which is configured in a plate shape with a plate thickness direction running in an up-down direction, and an upright wall portion projecting upward from a width direction rear side of the plate-shaped portion, and wherein each of the yoke levers has, at a portion housed in the corresponding main housing compartment, a greatest height rearward of the inner wall that exceeds a greatest height of the yoke lever forward of the inner wall.

2. The wiper lever assembly of claim 1, wherein each of the yoke levers includes a metal portion that is made from metal and a resin portion that is made from resin and that is provided outside the metal portion.

3. The wiper lever assembly of claim 2, wherein:
the main lever and the movable covers are made from resin; and
the resin portion of each of the yoke levers is coupled so as to be capable of pivoting to the main lever and to the corresponding movable cover.

4. The wiper lever assembly of claim 2, wherein the grip portions of the yoke levers are formed at the resin portions.

5. The wiper lever assembly of claim 1, wherein each of the yoke levers is coupled so as to be capable of pivoting to the main lever and to the corresponding movable cover at a lower side of the yoke lever that has a broader front-rear direction width than an upper side of the yoke lever.

6. The wiper lever assembly of claim 1, wherein
the main lever and each of the movable covers include a pair of opposing walls that oppose each other at a front and rear of the upright wall portion, and
wherein one of the pair of opposing walls included in the main lever is the inner wall.

7. The wiper lever assembly of claim 1, wherein:
each of the yoke levers includes a metal portion that is made from metal and a resin portion that is made from resin and that is provided outside the metal portion; and
the metal portion includes:

a plate-shaped portion configured in a plate shape with a plate thickness direction running in the up-down direction and embedded in the resin portion at a location corresponding to the plate-shaped portion of a corresponding yoke lever; and an upright wall portion projecting upward from a width direction rear side of the plate-shaped portion and embedded in the resin portion at a location corresponding to the upright wall portion of the corresponding yoke lever.

8. The wiper lever assembly of claim 1, wherein:
respective protrusions formed to both width direction front and rear surfaces of each of the main housing compartments and each of the movable housing compartments are respectively fitted into four recesses formed in both width direction front and rear surfaces of a corresponding yoke lever; and
each of the yoke levers is coupled so as to be capable of pivoting to the main lever and to the corresponding movable cover.

9. The wiper lever assembly of claim 1, wherein:
each of the main housing compartments of the main lever includes a first opening that is open toward the wiping surface;
each of the movable housing compartments of the pair of movable covers includes a second opening that is open toward the wiping surface; and
the plate-shaped portions of the pair of yoke levers close off the first openings and the second openings.

10. The wiper lever assembly of claim 1, wherein the main lever includes a pair of center side blocking walls that block off the main housing compartments in a length direction at a length direction center side of the main lever.

11. The wiper lever assembly of claim 1, wherein each of the movable covers includes an outside blocking wall that blocks off a corresponding movable housing compartment in a length direction at an opposite side of the corresponding yoke lever from the main lever.

12. The wiper lever assembly of claim 1, further comprising a load transmission section provided as a separate body to respective pivotally coupled portions where the respective yoke lever is coupled, so as to be capable of pivoting the main lever and the corresponding movable cover; wherein
the load transmission section is configured by an engagement portion provided at the main lever and a corresponding movable cover and an engaging portion provided at a corresponding yoke lever, such that load acting along a length direction between the yoke lever and the main lever and between the yoke lever and a corresponding movable cover is borne by engagement between the engagement portion and the engaging portion.

13. A wiper blade comprising:
a blade rubber for wiping a wiping surface of a vehicle; and
the wiper lever assembly of claim 1, the blade rubber being gripped by the respective grip portions provided at the pair of movable covers and at the pair of yoke levers.

14. The wiper blade of claim 13, wherein:
the blade rubber is disposed below the wiper lever assembly, is gripped by the yoke levers and the movable covers, is pressed against the wiping surface, and is disposed such that respective gaps are formed between the blade rubber and the yoke levers and between the blade rubber and the movable covers; and the wiper blade further comprises an obstruction portion that is formed projecting from at least one of a lower surface of each of the movable covers, a lower surface of each of the yoke levers, or an upper surface of the blade rubber, that extends along a length direction of the blade rubber in an internal space of the wiper lever assembly, and that obstructs outflow of a travel-induced wind that has flowed into at least one gap out of the respective gaps.

15. The wiper blade of claim 14, wherein the obstruction portion is configured by lengthwise ribs projecting downward from lower surfaces of the respective movable covers that are recessed toward an upper side as viewed along a length direction of the blade rubber.

16. The wiper blade of claim 15, wherein the lengthwise ribs are disposed above a width direction rear end portion of the blade rubber.

17. A wiper lever assembly that grips a blade rubber for wiping a wiping surface, the wiper lever assembly comprising:
   a main lever (i) that is coupled to a leading end portion of a wiper arm at a length direction central portion of the main lever, (ii) that includes a first fin surface having a downward gradient on progression toward a width direction front side and formed on upper surfaces on both length direction sides of the main lever, and (iii) that includes main housing compartments formed on two length direction sides of the main lever, each of the main housing compartments being open toward a wiping surface and having a greater height dimension at a width direction rear side than at the width direction front side;
   a pair of movable covers that have their length in a length direction of the main lever and that are disposed contiguously to the main lever on the two length direction sides of the main lever, each of the movable covers including (i) a grip portion for gripping the blade rubber at an opposite side of the movable cover from the main lever, (ii) a second fin surface having a downward gradient on progression toward the width direction front side and formed on an upper surface of the movable cover, and (iii) a movable housing compartment open toward the wiping surface and having a greater height dimension at the width direction rear side than at the width direction front side; and
   a pair of yoke levers, each of the yoke levers having its length in the length direction of the main lever and of the movable covers, (i) being housed spanning inside a corresponding main housing compartment and inside a corresponding movable housing compartment, (ii) being coupled to the main lever and to the corresponding movable cover so as to be capable of pivoting about an axis extending in a width direction, (iii) including a grip portion for gripping the blade rubber at both length direction end portions of the yoke lever, and (iv) having a greater height dimension at the width direction rear side than at the width direction front side,
   wherein an upper surface of each of the yoke levers is formed with a pair of pressing portions projecting upward so as to respectively contact an upper surface of a corresponding main housing compartment and an upper surface of a corresponding movable housing compartment.

18. A wiper lever assembly that grips a blade rubber for wiping a wiping surface, the wiper lever assembly comprising:
   a main lever (i) that is coupled to a leading end portion of a wiper arm at a length direction central portion of the main lever, (ii) that includes a first fin surface having a downward gradient on progression toward a width direction front side and formed on upper surfaces on both length direction sides of the main lever, and (iii) that includes main housing compartments formed on two length direction sides of the main lever, each of the main housing compartments being open toward a wiping surface and having a greater height dimension at a width direction rear side than at the width direction front side;
   a pair of movable covers that have their length in a length direction of the main lever and that are disposed contiguously to the main lever on the two length direction sides of the main lever, each of the movable covers including (i) a grip portion for gripping the blade rubber at an opposite side of the movable cover from the main lever, (ii) a second fin surface having a downward gradient on progression toward the width direction front side and formed on an upper surface of the movable cover, and (iii) a movable housing compartment open toward the wiping surface and having a greater height dimension at the width direction rear side than at the width direction front side; and
   a pair of yoke levers, each of the yoke levers having its length in the length direction of the main lever and of the movable covers, (i) being housed spanning inside a corresponding main housing compartment and inside a corresponding movable housing compartment, (ii) being coupled to the main lever and to the corresponding movable cover so as to be capable of pivoting about an axis extending in a width direction, (iii) including a grip portion for gripping the blade rubber at both length direction end portions of the yoke lever, and (iv) having a greater height dimension at the width direction rear side than at the width direction front side, wherein:
   the main lever and each of the movable covers includes a front wall and a rear wall, which oppose each other in the width direction, and an upper wall connecting upper end portions of the front wall and the rear wall together in the width direction;
   each of the front walls includes a front-inner wall and includes a front-outer wall extending from the front-inner wall toward one width direction side as to be continuous to the upper wall;
   each of the yoke levers is coupled so as to be capable of pivoting to a corresponding front-inner wall and to a corresponding rear wall;
   the first fin surface and a corresponding second fin surface are formed contiguously to each other, the first fin surface being formed on the upper wall and on an upper surface of the front-outer wall of the main lever; and
   each of the second fin surfaces is formed on the upper wall and on an upper surface of the front-outer wall of a corresponding movable cover.

19. The wiper lever assembly of claim 18, wherein:
   one of a recess or a protrusion formed at each of the front-inner walls and each of the rear walls is fitted together with four of the other of a recess or a protrusion formed at both width direction front and rear surfaces of a corresponding yoke lever so as to couple the respective yoke levers so as to be capable of pivoting to the main lever and to a corresponding movable cover;

each of the front-inner walls includes a flexible portion formed with the one of a recess or a protrusion, and a reinforced portion that is reinforced more than the flexible portion; and each of the yoke levers is formed with a front side projection projecting from a location corresponding to a corresponding reinforced portion so as to be capable of abutting the corresponding reinforced portion.

20. A wiper blade comprising:

a blade rubber for wiping a wiping surface of a vehicle; and the wiper lever assembly of claim 18, the blade rubber being gripped by the respective grip portions provided at the pair of movable covers and at the pair of yoke levers.

* * * * *